US010451790B2

(12) United States Patent
Gotou

(10) Patent No.: US 10,451,790 B2
(45) Date of Patent: Oct. 22, 2019

(54) LIGHTING DEVICE, DISPLAY DEVICE, AND TELEVISION DEVICE THAT REDUCE UNEVENNESS IN DISPLAYED COLOR

(71) Applicant: Sharp Kabushiki Kaisha, Sakai, Osaka (JP)

(72) Inventor: Akira Gotou, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 37 days.

(21) Appl. No.: 15/554,465

(22) PCT Filed: Mar. 15, 2016

(86) PCT No.: PCT/JP2016/058084
§ 371 (c)(1),
(2) Date: Aug. 30, 2017

(87) PCT Pub. No.: WO2016/158370
PCT Pub. Date: Oct. 6, 2016

(65) Prior Publication Data
US 2018/0039006 A1 Feb. 8, 2018

(30) Foreign Application Priority Data

Apr. 1, 2015 (JP) ................. 2015-074961

(51) Int. Cl.
F21V 8/00 (2006.01)
F21V 9/30 (2018.01)
(Continued)

(52) U.S. Cl.
CPC ............... G02B 6/005 (2013.01); F21S 2/00 (2013.01); F21V 5/00 (2013.01); F21V 9/30 (2018.02);
(Continued)

(58) Field of Classification Search
CPC .... G02B 6/005; G02B 6/0053; G02B 6/0055; G02B 6/0056; G02B 6/0088; G02B 6/009;
(Continued)

(56) References Cited

U.S. PATENT DOCUMENTS

2010/0167011 A1   7/2010   Dubrow
2010/0315320 A1   12/2010  Yoshida
(Continued)

FOREIGN PATENT DOCUMENTS

JP   2007-316421 A   12/2007
JP   2009-158462 A   7/2009
(Continued)

OTHER PUBLICATIONS

Official Communication issued in International Patent Application No. PCT/JP2016/058084, dated Jun. 21, 2016.

Primary Examiner — Anh T Mai
Assistant Examiner — Hana S Featherly
(74) Attorney, Agent, or Firm — Keating & Bennett, LLP

(57) ABSTRACT

A backlight device (a lighting device) 12 includes LEDs (a light source) 17, a light guide plate 19 having a light entering end surface 19b that is a part of peripheral edge surfaces and through which light from the LEDs 17 enters and a light exiting plate surface 19a that is one of a pair of plate surfaces and through which light exits, a wavelength conversion sheet (a wavelength conversion member) 20 overlapping the light exiting plate surface 19a of the light guide plate 19 and containing phosphors that convert the light from the LEDs 17 to light with other wavelengths, and a color exhibit member 30 disposed on at least a part of a peripheral portion of the wavelength conversion sheet 20 and exhibiting a color same as or similar to a color of the light converted with
(Continued)

wavelength conversion by the phosphors contained in the wavelength conversion sheet 20.

23 Claims, 23 Drawing Sheets

(51) Int. Cl.
*F21S 2/00* (2016.01)
*F21V 5/00* (2018.01)
*G02F 1/1335* (2006.01)

(52) U.S. Cl.
CPC .......... *G02B 6/0053* (2013.01); *G02B 6/0055* (2013.01); *G02B 6/0056* (2013.01); *G02B 6/0088* (2013.01); *G02F 1/133603* (2013.01); *G02F 1/133609* (2013.01); *G02F 1/133621* (2013.01); *G02B 6/009* (2013.01); *G02F 2001/133614* (2013.01); *G02F 2202/36* (2013.01)

(58) Field of Classification Search
CPC ...... F21V 9/30; F21V 5/00; F21S 2/00; G02F 1/133603; G02F 1/133609; G02F 1/133621; G02F 2001/133614; G02F 2202/36
USPC .......................................................... 362/606
See application file for complete search history.

(56) References Cited

U.S. PATENT DOCUMENTS

| | | | |
|---|---|---|---|
| 2011/0298696 A1* | 12/2011 | Gu | G02B 6/0018 345/102 |
| 2012/0113672 A1 | 5/2012 | Dubrow et al. | |
| 2013/0075014 A1 | 3/2013 | Dubrow | |
| 2014/0178648 A1 | 6/2014 | Dubrow | |
| 2015/0009454 A1 | 1/2015 | Nagatani et al. | |
| 2015/0260908 A1 | 9/2015 | Kiguchi | |
| 2015/0277029 A1 | 10/2015 | Watanabe et al. | |
| 2015/0300600 A1 | 10/2015 | Dubrow et al. | |
| 2016/0009988 A1 | 1/2016 | Dubrow | |
| 2016/0137918 A1 | 5/2016 | Hori et al. | |
| 2016/0349428 A1 | 12/2016 | Dubrow et al. | |
| 2016/0363713 A1 | 12/2016 | Dubrow et al. | |
| 2018/0039006 A1 | 2/2018 | Gotou | |

FOREIGN PATENT DOCUMENTS

| | | |
|---|---|---|
| JP | 2013-544018 A | 12/2013 |
| JP | 2014-082202 A | 5/2014 |
| JP | 2015-000967 A | 1/2015 |
| JP | 2015-015105 A | 1/2015 |
| WO | 2013/077568 A1 | 5/2013 |
| WO | 2014/065063 A1 | 5/2014 |
| WO | 2015/030036 A1 | 3/2015 |
| WO | 2016/158370 A1 | 10/2016 |

* cited by examiner

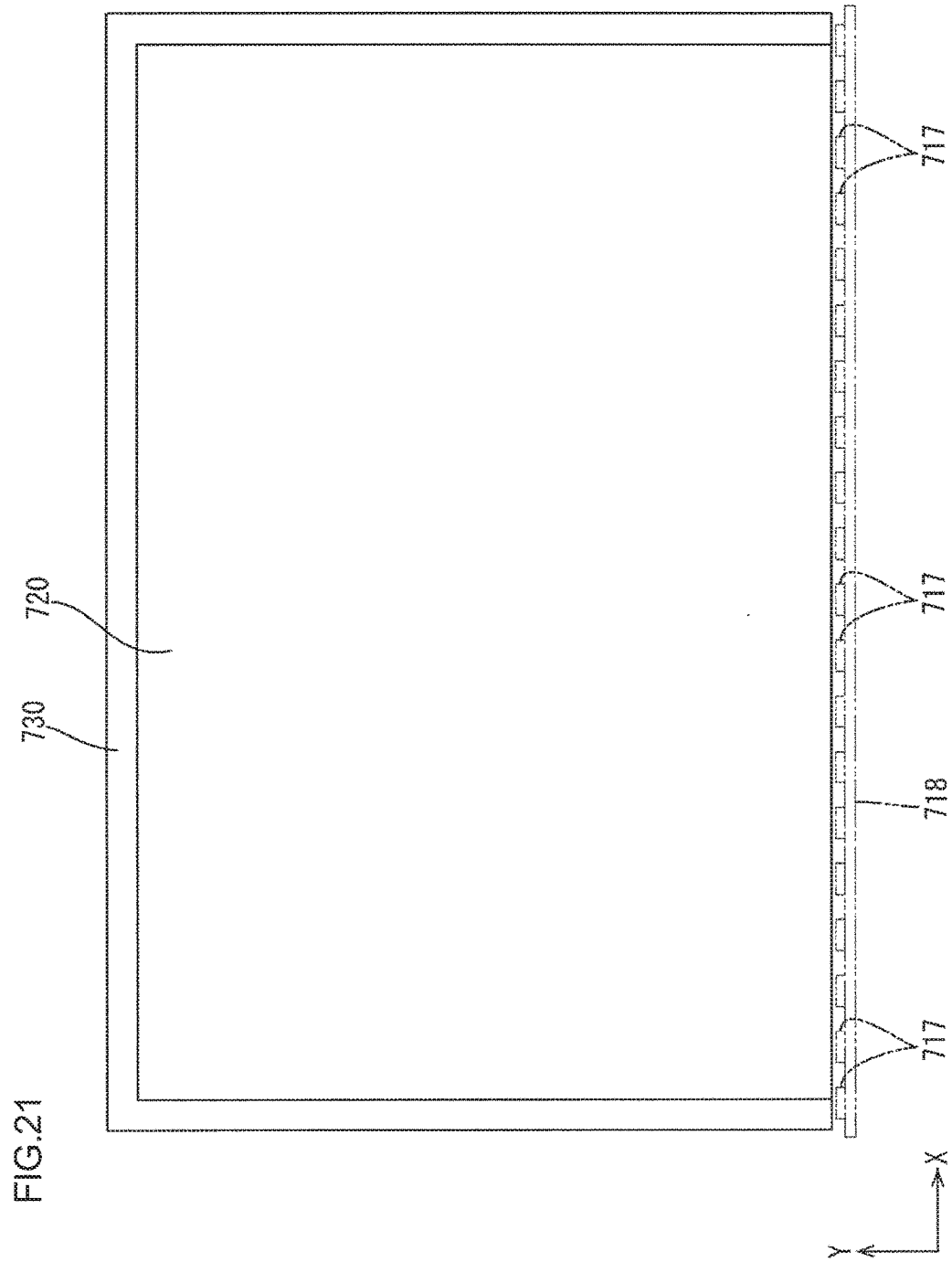

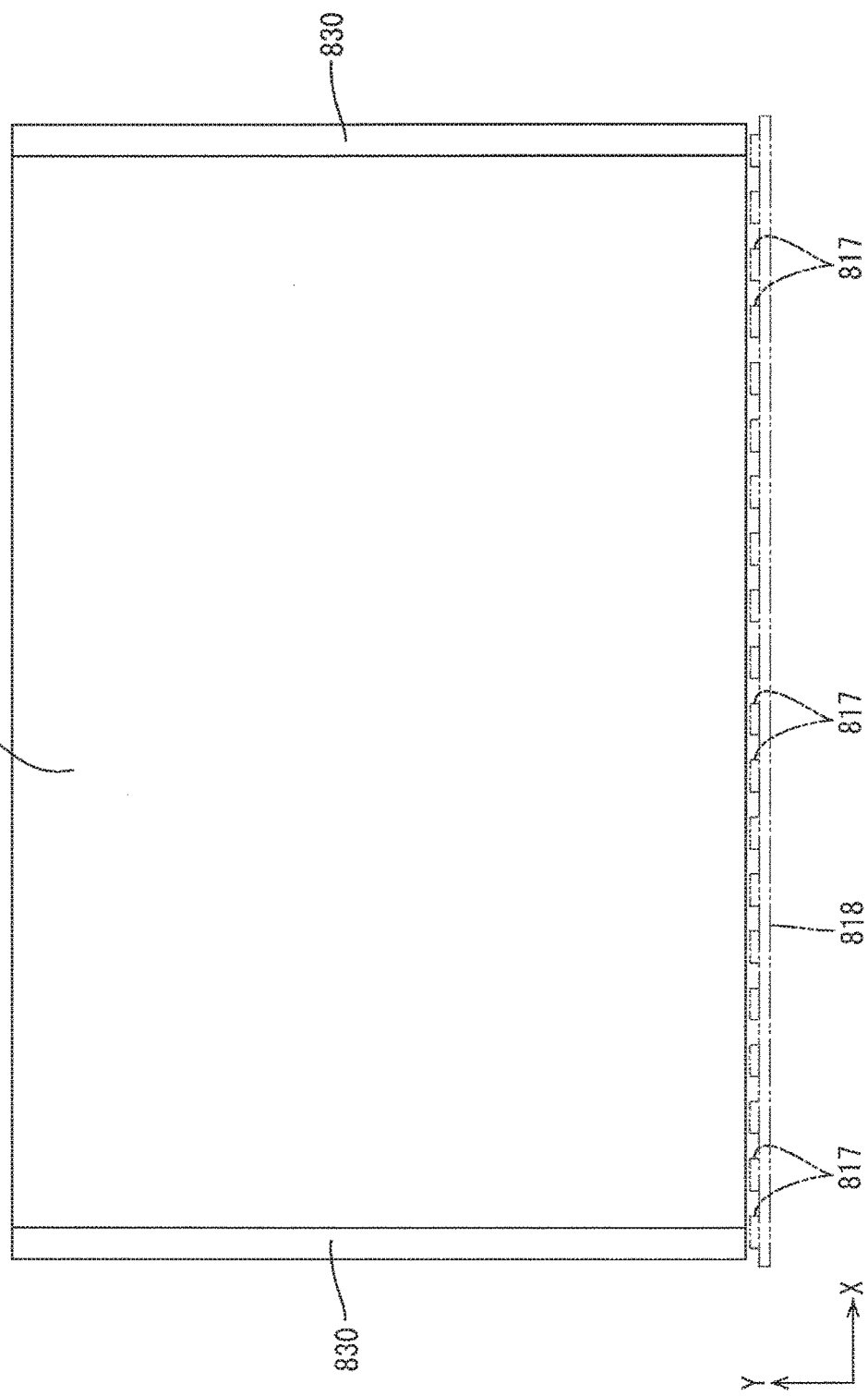

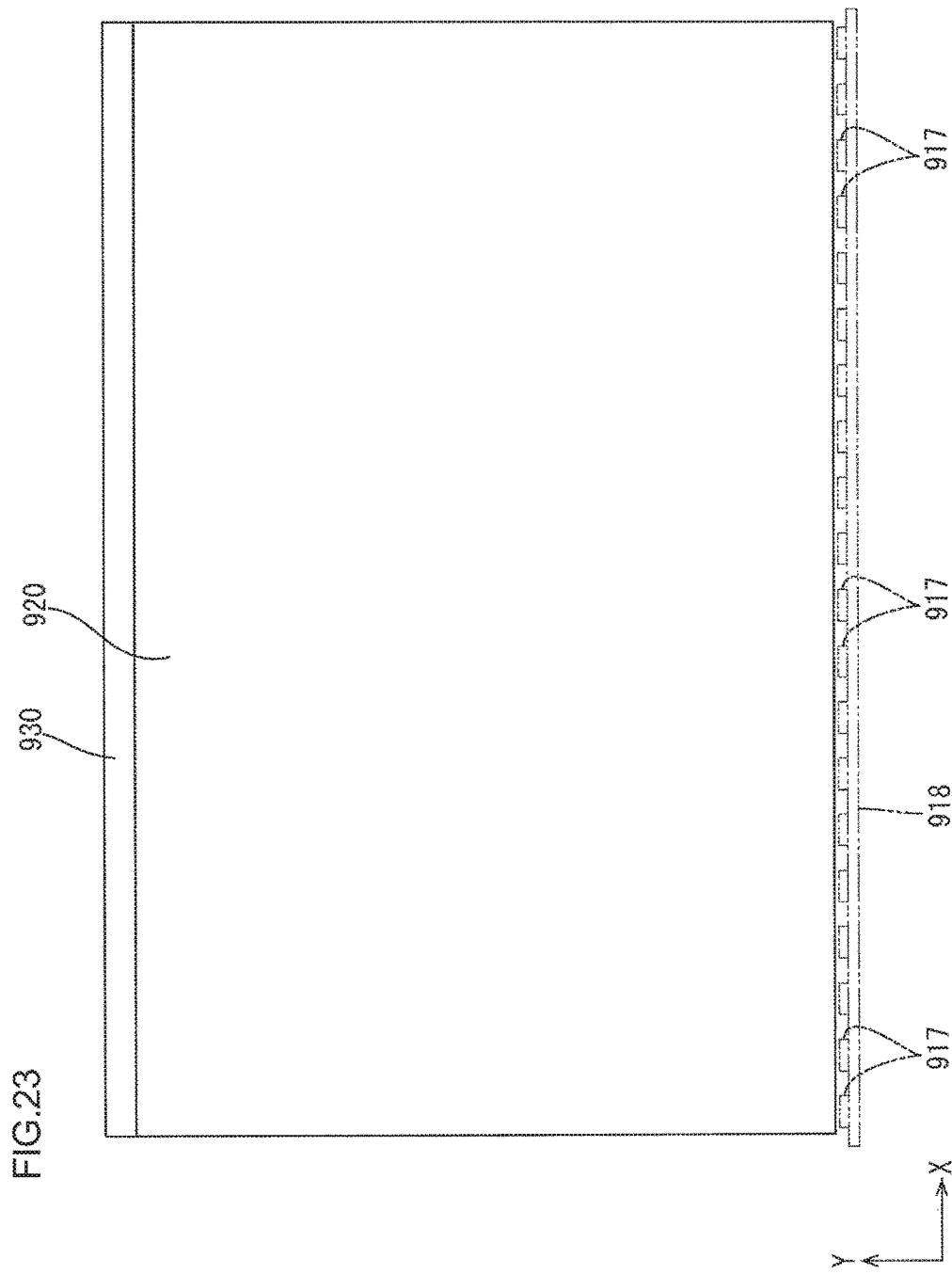

LIGHTING DEVICE, DISPLAY DEVICE, AND TELEVISION DEVICE THAT REDUCE UNEVENNESS IN DISPLAYED COLOR

TECHNICAL FIELD

The present invention relates to a lighting device, a display device, and a television device.

BACKGROUND ART

An example of a liquid crystal display device is disclosed in Patent Document 1. The liquid crystal display device disclosed in Patent Document 1 includes a liquid crystal panel, and a display backlight unit that supplies light to the liquid crystal panel. The display backlight unit includes a primary light source, a light guide plate that guides primary light emitted by the primary light source, and a remote phosphor film containing QD phosphor material that is excited by the primary light traveling through a light guide plate and outputs secondary light.

RELATED ART DOCUMENT

Patent Document
Patent Document 1: Japanese Translation of PCT International Application Publication No. 2013-544018

Problem to be Solved by the Invention

If the remote phosphor film described in Patent Document 1 may be used in an edge light type backlight device, following problems may occur. The edge light type backlight includes a light source and a light guide plate that is configured to direct the light from the light source. The light guide plate includes a light entering end surface, a non-light-entering end surface, and a light exiting plate surface. The light from the light source directly enters the light entering end surface but the light from the light source does not directly enter the non-light-entering end surface. The light exits through the light exiting plate surface. Some of the light rays exiting through the light exiting plate surface of the light guide plate are not converted to light rays with other wavelengths. Such light rays may not be included in light exiting from a display backlight unit. Such light rays may be retroreflected and returned to the light guide plate and included in the light exiting from the display backlight unit. The number of reflection tends to be smaller in the peripheral portion of the display backlight unit than the center portion of the display backlight unit and thus the number of times that the retroreflected rays of light pass through the remote phosphor film is decreased. Namely, the retroreflected rays of light are less likely to be converted to light rays with other wavelengths. Accordingly, the exit light rays exiting the peripheral portion of the edge light type backlight device is likely to have a color same as or a similar to the color of the light from the light source compared to the exit light rays exiting the center portion.

If the remote phosphor film described in Patent Document 1 may be used in a direct type backlight device, following problems may occur. The direct type backlight device includes multiple light sources that are arranged directly below a liquid crystal panel, and a reflection sheet that has a shallow bowl shape and is configured to reflect light rays form the light sources. Some of the light rays reflecting off the reflection sheet may not be included in light exiting from a display backlight unit. Such light rays may be retroreflected and returned to the reflection sheet and included in the light exiting from the display backlight unit. A light path of the retroreflected rays of light is short in the peripheral portion of the reflection sheet having a shallow bowl shape. Therefore, the number of reflection is greater in the peripheral portion of the display backlight unit than the center portion of the display backlight unit and thus the number of times that the retroreflected rays of light pass through the remote phosphor film is increased. Namely, the retroreflected rays of light are likely to be converted to light rays with other wavelengths. An amount of light rays emitted from the light source (primary light) within the backlight device is likely to be greater in the center portion of the backlight device and smaller in the peripheral portion thereof. Therefore, the exit light rays exiting the peripheral portion of the direct type backlight device are likely to have a color same as or similar to the color of the light converted by the phosphors contained in the remote phosphor film than the exit light rays exiting the center portion of the direct type backlight device.

As described before, in the backlight device including the remote phosphor film, unevenness in color may be caused and a color of exit light exiting a center portion of the backlight device may differ from a color of exit light exiting a peripheral portion thereof.

DISCLOSURE OF THE PRESENT INVENTION

An object of the present invention is to reduce occurrence of unevenness in color.

Means for Solving the Problem

To solve the above problem, a first lighting device according to the present invention includes a light source, a light guide plate having a light entering end surface that is a part of peripheral edge surfaces and through which light from the light source enters and a light exiting plate surface that is one of a pair of plate surfaces and through which light exits, a wavelength conversion member overlapping the light exiting plate surface of the light guide plate and containing phosphors that convert the light from the light source to light with other wavelengths, and a color exhibit member disposed on at least a part of a peripheral portion of the wavelength conversion member and exhibiting a color same as or similar to a color of the light converted by the phosphors contained in the wavelength conversion member.

According to such a configuration, the light rays emitted by the light source enter the light guide plate through the light entering end surface of the peripheral edge surfaces of the light guide plate and transmit through the light guide plate and exit through the light exiting plate surface. The light rays exiting through the light exiting plate surface are converted to light rays with other wavelengths by the phosphors contained in the wavelength conversion member overlapping the light exiting plate surface. Some of light rays exiting from the light guide plate through the light exiting plate surface are not converted to light rays with other wavelengths by the wavelength conversion member and such light rays may not be included in exiting light from the lighting device. The light rays may be retroreflected and returned to the light guide plate, and then included in the exiting light from the lighting device. The number of times at which the retroreflected light rays are reflected tends to be smaller in the outer area than the center portion of the lighting device and the number of times at which the retroreflected light rays pass through the wavelength conversion member tends to be smaller. Therefore, the retroreflected light rays are less likely to be converted to light rays with other wavelengths by the wavelength conversion member. Some light rays transmitting through the light guide plate may not exit through the light exiting plate surface. Some light rays may exit through the peripheral edge surface of the light guide plate.

The color exhibit member is disposed on at least a part of the peripheral portion of the wavelength conversion member, and the color exhibit member exhibits the color same as or similar to the color of light rays converted by the phosphors contained in the wavelength conversion member with wavelength conversion. Therefore, the color exhibiting effects are exerted by the color exhibit member on the retroreflected light rays at a smaller number of times of retrorefelction and the light rays exiting from the peripheral edge of the light guide plate that are in the peripheral portion of the lighting device to have the color same as or similar to the color of the light rays converted by the phosphors contained in the wavelength conversion member. Accordingly, the difference in color (tint) between the light exiting from the center portion of the lighting device and the light exiting from the peripheral portion of the lighting device is less likely to occur and the color unevenness in the exit light rays is less likely to be caused.

Following configurations may be preferable for embodiments of the first lighting device.

(1) the color exhibit member may have a higher absorption rate of light having a color same as or similar to a color that makes a complementary color pair with the color of the light that is converted by the phosphors through the wavelength conversion member than an absorption rate of the light having a color same as or similar to the color of the light that is converted by the phosphors through the wavelength conversion member. According to such a configuration, among the retroreflected light rays at a smaller number of times of retrorefelction and the light rays exiting from the peripheral edge of the light guide plate in the peripheral portion of the lighting device, a greater amount of the light rays having a color same as or similar to the color that makes a complementary color pair with a color of the light rays that are converted by the phosphors through the wavelength conversion member is absorbed by the color exhibit member than that of the light rays having a color same as or similar to the light rays that are converted by the phosphors through the wavelength conversion member. Therefore, the color exhibiting effects are exerted by the color exhibit member on the retroreflected light rays at a smaller number of times of retrorefelction and the light rays exiting from the peripheral edge of the light guide plate in the peripheral portion of the lighting device to have the color same as or similar to the color of the light rays converted by the phosphors contained in the wavelength conversion member.

(2) The light source may be configured to emit blue light. The wavelength conversion member may at least include green phosphors and red phosphors, or yellow phosphors as the phosphors, and the green phosphors may convert the blue light into green light with wavelength conversion and the red phosphors may convert the blue light into red light with wavelength conversion, and the yellow phosphors may convert the blue light into yellow light with wavelength conversion. The color exhibit member may be configured to exhibit yellow or a similar color to yellow. According to such a configuration, the blue light emitted by the light source is converted into the green light and the red light through the wavelength conversion member containing the green phosphors and the red phosphors, or converted into the yellow light through the wavelength conversion member containing the yellow phosphors with wavelength conversion. The retroreflected light rays at a smaller number of times of retrorefelction and the light rays exiting from the peripheral edge of the light guide plate in the peripheral portion of the lighting device include a great amount of the light rays having a color same as or similar to the blue light rays emitted by the light source. Therefore, if the great amount of such light rays is included in the exit light rays exiting the lighting device, the exit light rays may be more bluish in the peripheral portion than in the center portion. The color exhibiting effects are exerted by the color exhibit member on the retroreflected light rays at a smaller number of times of retrorefelction and the light rays exiting from the peripheral edge of the light guide plate that are in the peripheral portion of the lighting device to have the color same as or similar to the color of the light rays converted by the phosphors contained in the wavelength conversion member, that is yellow or a similar color to yellow. Therefore, the ratio of the amount of the blue light rays or the light rays of a similar color to blue to the amount of the exit light rays exiting the peripheral portion of the lighting device is reduced and the color unevenness is preferably reduced.

(3) The lighting device may further include a frame including a frame portion that supports peripheral portions of the light guide plate and the wavelength conversion member, and the color exhibit member may be disposed such that an inner edge thereof is on an inner side than an inner edge of the frame portion. According to such a configuration, the respective peripheral edge portions of the light guide plate and the wavelength conversion member are supported by the frame portion of the frame. The color exhibit member is disposed on at least a part of the peripheral portion of the wavelength conversion member such that the inner edge thereof is on an inner side than the inner edge of the frame portion and therefore, the light rays on which the color exhibiting effects are exerted or to be exerted by the color exhibit member are less likely to be obstructed by the frame portion of the frame. Therefore, this configuration is more preferable for reducing the color unevenness.

A second lighting device according to the present invention includes a light source, a chassis in which the light source is arranged and that includes a bottom portion on an opposite side from a light emission surface side of the light source, a wavelength conversion member disposed opposite the light emission surface of the light guide plate and away from the light emission surface on a light exit side and containing phosphors that convert light from the light source to light with other wavelengths, a reflecting member configured to reflect the light from the light source toward the wavelength conversion member and at least including a bottom reflection portion disposed along the bottom portion and an extended reflection portion extending from the bottom reflection portion toward the wavelength conversion member, and a color exhibit member disposed on at least a part of a peripheral portion of the wavelength conversion member and exhibiting a color same as or similar to a color that makes a complementary color pair with a color of the light that is converted by the phosphors through the wavelength conversion member.

According to such a configuration, the light rays emitted by the light source are reflected by the bottom reflection portion and the extended reflection portion included in the reflecting member and converted by the phosphors with wavelength conversion through the wavelength conversion member that is disposed opposite the light emission surface of the light source and away from the light emission surface on the light exit side. Some of the light rays transmitting through the wavelength conversion member may not be included in exiting light from the lighting device. The light rays may be retroreflected and returned to the reflecting member, and then included in the exiting light from the lighting device. The number of times at which the retroreflected light rays are reflected tends to be greater in the peripheral portion of the lighting device including the extended reflection portion than in the center portion thereof including the bottom reflection portion of the reflecting member, namely, the number of times at which the retroreflected light rays pass through the wavelength conversion member tends to be greater. Therefore, the retroreflected light rays are likely to transmit through the wavelength conversion member and also likely to be converted to light rays with other wavelengths by the wavelength conversion member. The amount of rays of light that are emitted by the light source and within the chassis tends to be greater in the center portion and smaller in the peripheral portion.

Specifically, the color exhibit member is disposed on at least a part of the peripheral portion of the wavelength conversion member. The color exhibit member exhibits a color that makes a complementary color pair with a color that is converted to light rays with another wavelengths by the phosphors contained in the wavelength conversion member or a similar color to the complementary color pair. Therefore, the color exhibiting effects are exerted by the color exhibit member on the retroreflected light rays at a greater number of retroreflection times that are in the peripheral portion of the lighting device to be tinged with a color or similar color that makes a complementary color pair with a color of the light rays that are converted by the phosphors through the wavelength conversion member. Accordingly, the difference in color is less likely to be caused between the center portion of the lighting device and the peripheral portion thereof, even if the amount of light rays emitted by the light source is smaller in the peripheral portion of the lighting device than in the center portion thereof. Therefore, the color unevenness is preferably reduced.

Following configurations may be preferable for embodiments of the second lighting device.

(1) The color exhibit member may have a higher absorption rate of light having a color same as or similar to the color of the light converted by the phosphors through the wavelength conversion member than an absorption rate of light having a color same as or similar to a color that makes a complementary color pair with the color of the light converted by the phosphors through the wavelength conversion member. According to such a configuration, among the retroreflected light rays at a greater number of times of retrorefelction that are in the peripheral portion of the lighting device, a relatively greater amount of light rays having a color same as or similar to the color of the light that is converted by the phosphors through the wavelength conversion member is absorbed by the color exhibit member than that of the light rays of a color or similar color that makes a complementary color pair with a color of the light rays that are converted by the phosphors through the wavelength conversion member. Therefore, the color exhibiting effects are exerted by the color exhibit member on the retroreflected light rays at a greater number of times of retrorefelction that are in the peripheral portion of the lighting device to have the color or similar color that makes a complementary color pair with the color of the light rays converted by the phosphors contained in the wavelength conversion member.

(2) The light source may be configured to emit blue light. The wavelength conversion member may at least include green phosphors and red phosphors, or yellow phosphors as the phosphors, and the green phosphors may convert the blue light into green light with wavelength conversion and the red phosphors may convert the blue light into red light with wavelength conversion, and the yellow phosphors may convert the blue light into yellow light with wavelength conversion. The color exhibit member may be configured to exhibit blue or a similar color to blue. According to such a configuration, the blue light emitted by the light source is converted into the green light and the red light through the wavelength conversion member containing the green phosphors and the red phosphors, and converted into the yellow light through the wavelength conversion member containing the yellow phosphors with wavelength conversion. The retroreflected light rays at a greater number of times of retrorefelction that are in the peripheral portion of the lighting device include a great amount of the light rays having a color or similar color that makes a complementary color pair with the blue light rays emitted by the light source. Therefore, if the great amount of such light rays is included in the exit light rays exiting the lighting device, the exit light rays may be more yellowish in the peripheral portion than in the center portion. The color exhibiting effects are exerted by the color exhibit member on the retroreflected light rays at a smaller number of times of retrorefelction that are in the peripheral portion of the lighting device to have the color or similar color that makes a complementary color pair with the color of the light rays converted by the phosphors contained in the wavelength conversion member, that is, blue or similar color to blue. Therefore, the ratio of the amount of the yellow light rays or the light rays of a similar color to yellow to the amount of the exit light rays exiting the peripheral portion of the lighting device is reduced and the color unevenness is preferably reduced.

(3) The color exhibit member may be disposed to overlap the extended reflection portion. According to such a configuration, the color exhibit member that is disposed at least a part of the peripheral portion of the wavelength conversion member is overlapped with the extended reflection portion of the reflecting member. Therefore, the color exhibiting effects are exerted on the light rays reflecting off the extended reflection portion toward the wavelength conversion member effectively by the color exhibit member. This configuration is preferable for reducing the color unevenness.

Following configurations may be preferable for embodiments of the first lighting device or the second lighting device.

(1) The color exhibit member may extend along an entire periphery of the peripheral portion of the wavelength conversion member. According to such a configuration, the color exhibit member extending along an entire periphery of the peripheral portion of the wavelength conversion member and the color exhibiting effects can be exerted evenly on the light rays in the peripheral portion of the lighting device by such a color exhibit member. Therefore, this configuration is preferable for reducing the color unevenness.

(2) The wavelength conversion member may include a wavelength conversion layer containing the phosphors, and a pair of protection layers having the wavelength conversion layer therebetween and protecting the wavelength conversion layer, and the color exhibit member may be configured to collectively hold peripheral portions of the wavelength conversion layer and the protection layers. According to such a configuration, the wavelength conversion layer is closed at an entire periphery of the wavelength conversion member and the phosphors contained in the wavelength conversion layer are less likely to be deteriorated due to the moisture absorption.

(3) The lighting device may further include a support member supporting the wavelength conversion member and having a positioning member positioning the wavelength conversion member. The color exhibit member may include a positioning projection that partially projects from the peripheral portion of the wavelength conversion member and is in contact with the positioning member. According to such a configuration, the wavelength conversion member is supported by the support member and the positioning projection of the color exhibit member partially projecting from the peripheral edge of the wavelength conversion member is in contact with the positioning member of the support member. Thus, the wavelength conversion member is correctly positioned. Namely, the wavelength conversion member is positioned by using the color exhibit member that is mounted on at least a part of the peripheral portion of the wavelength conversion member and therefore, the wavelength conversion member does not necessarily include a specific positioning structure. Therefore, a general wavelength conversion member can be used and this configuration is preferable for reducing a cost.

(4) The wavelength conversion member may contain quantum dot phosphors as the phosphors. According to such a configuration, the wavelength conversion efficiency of light rays through the wavelength conversion member is increased and the purity of the light converted through with wavelength conversion is higher.

Next, to solve the above problem, a display device includes the above lighting device and a display panel displaying images using light from the lighting device. According to the display device having such a configuration, unevenness in color of the exit light from the lighting device is less likely to be caused and display with good display quality can be achieved.

Further, to solve the above problem, a television device includes the above display device. The television device includes the display device that improves display quality and television images of good display quality can be displayed.

Advantageous Effect of the Invention

According to the present invention, unevenness in color is less likely to occur.

BRIEF DESCRIPTION OF THE DRAWINGS

FIG. 21 is a plan view of a wavelength conversion sheet according to an eighth embodiment of the present invention.

FIG. 22 is a plan view of a wavelength conversion sheet according to a ninth embodiment of the present invention.

FIG. 23 is a plan view of a wavelength conversion sheet according to a tenth embodiment of the present invention.

MODES FOR CARRYING OUT THE INVENTION

First Embodiment

Figure 1:
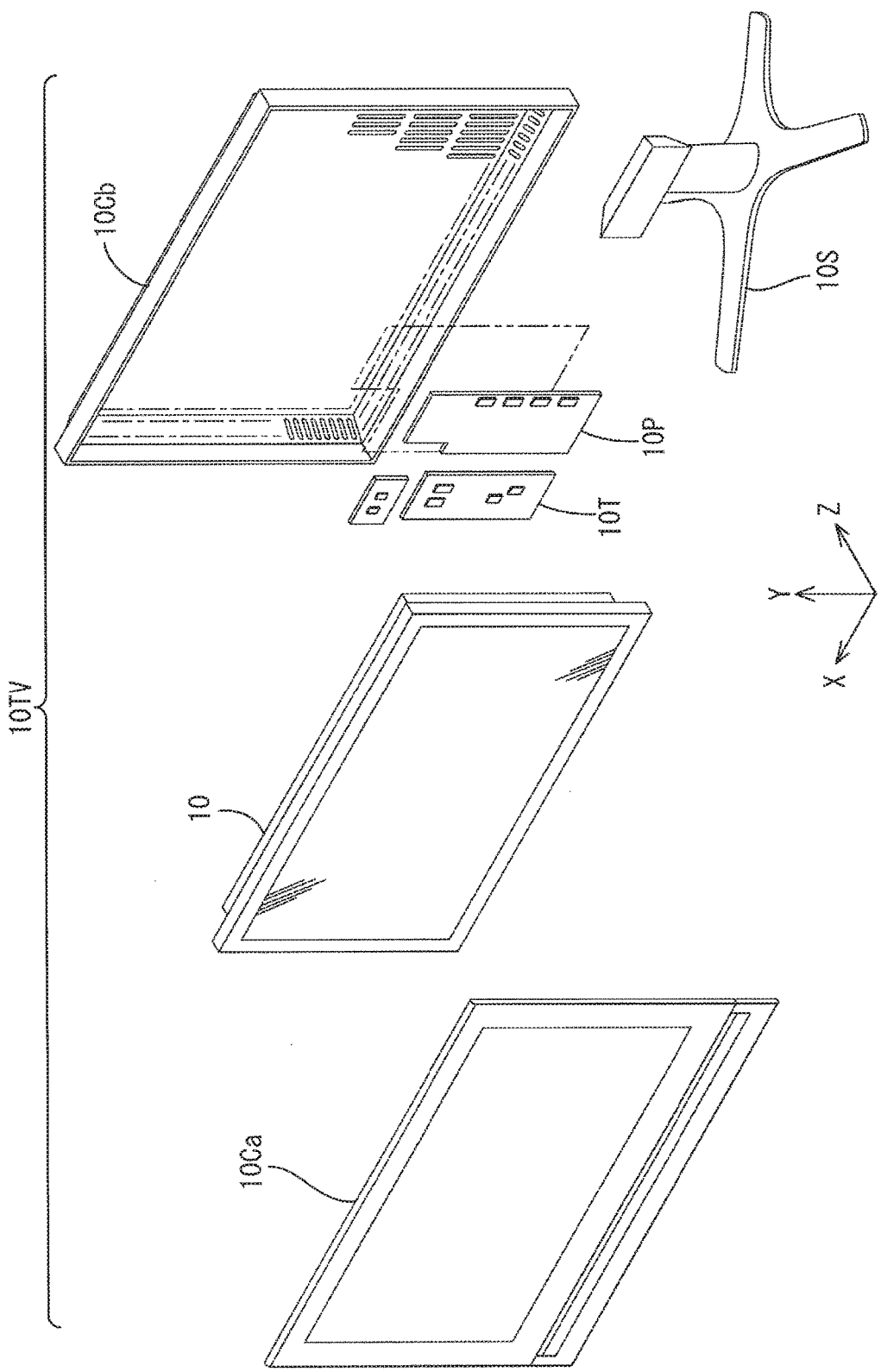
FIG. 1 is an exploded perspective view illustrating a general configuration of a television device according to a first embodiment of the present invention.

A first embodiment of the present invention will be described with reference to FIGS. 1 to 8. In this embodiment, a backlight device 12 and a liquid crystal display device 10 including the backlight device 12 will be described as an example. X-axis, Y-axis and Z-axis may be present in the drawings and each of the axial directions represents a direction represented in each drawing. An upper side and a lower side in FIGS. 4 and 5 correspond to a front side and a back side, respectively.

Figure 2:
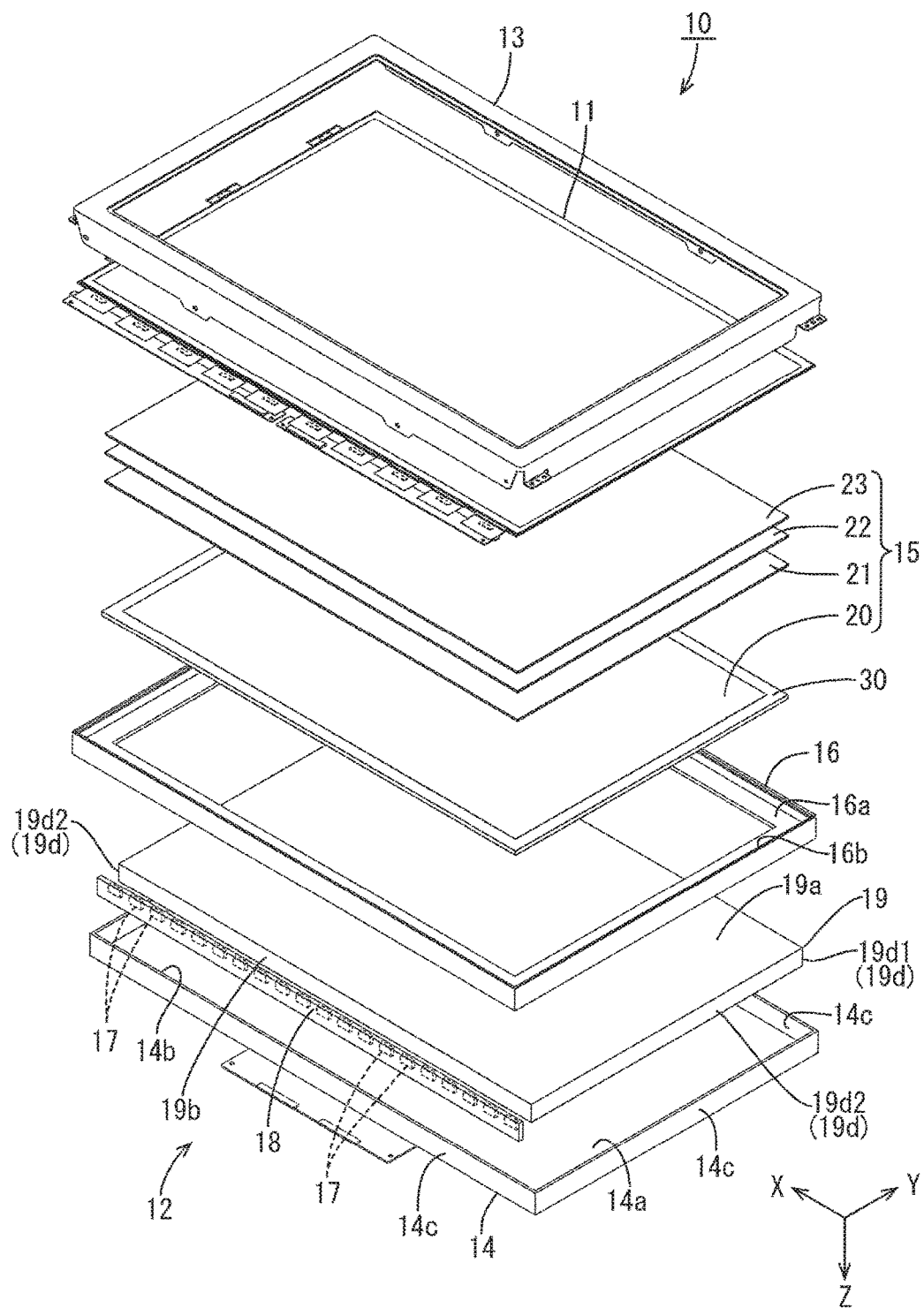
FIG. 2 is an exploded perspective view illustrating a general configuration of a liquid crystal display device included in the television device.

As illustrated in FIG. 1, a television device 10TV according to this embodiment includes a liquid crystal display device 10, front and rear cabinets 10Ca, 10Cb that sandwich and hold the liquid crystal display device 10 therebetween, a power supply 10P, a tuner (a receiving portion) 10T that receives television signals, and a stand 10S. The liquid crystal display device (a display device) 10 has a horizontal (longitudinal) square (rectangular) shape as a whole and is arranged in a vertical position. As illustrated in FIG. 2, the liquid crystal display device 10 includes a liquid crystal panel 11 that is a display panel displaying images thereon, and a backlight device (a lighting device) 12 that is an external light source supplying light to the liquid crystal panel 11 for display. The liquid crystal panel 11 and the backlight device 12 are integrally held by a frame-shaped bezel 13.

Next, the liquid crystal panel 11 and the backlight device 12 included in the liquid crystal display device 10 will be described. The liquid crystal panel (a display panel) 11 has a horizontally elongated rectangular shape in a plan view. The liquid crystal panel 11 includes a pair of glass substrates that are bonded with a predetermined gap therebetween and a liquid crystal layer (not illustrated) containing liquid crystal molecules are enclosed in the space between the glass substrates. Optical properties of the liquid crystal molecules are altered according to application of electric field. On an inner surface of one of the glass substrates (an array substrate, an active matrix substrate), switching components (such as TFTs) that are connected to source lines and gate lines that are perpendicular to each other, pixel electrodes that are connected to the switching components and arranged in square areas defined by the source lines and the gate lines, and alignment films are disposed. The switching components and the pixel electrodes are planarly arranged in a matrix. On an inner surface of another one of the glass substrates (a counter substrate, a CF substrate), a color filter including color portions of red (R), green (G), blue (B) arranged in a matrix with certain arrangement, a light blocking layer (a black matrix) disposed between the coloring portions and formed in a matrix, counter electrodes in a solid state to be opposite the pixel electrodes, and alignment films are disposed. Polarizing plates are attached to the outer surfaces of the respective glass substrates. In the liquid crystal panel 11, the long-side direction and the short-side direction match the X-axis direction and the Y-axis direction, respectively, and the thickness direction matches the Z-axis direction.

As illustrated in FIG. 2, the backlight device 12 includes a chassis 14 having a substantially box-shape and a light exit portion 14b that is open toward the front side (a liquid crystal panel 11 side), and an optical member (optical sheets) 15 that is disposed to cover the light exit portion 14b of the chassis 14. Within the chassis 14, the backlight device 12 further includes LEDs 17 that are a light source, an LED board 18 on which the LEDs 17 are mounted, a light guide plate 19 that guides the light from the LEDs 17 toward the optical member 15 (the liquid crystal panel 11), and a frame (a support member) 16 that presses the light guide plate 19 from the front side. The backlight device 12 includes the LED board 18 at one of long edges (at a front side in FIGS. 2 and 3, at a left side in FIG. 4) and the LEDs 17 mounted on the LED board 18 are locally arranged at one long edge section of the liquid crystal panel 11. Thus, the backlight device 12 of this embodiment is an edge light type (a side-light type) backlight device of one-side light entering type in which light from the LEDs 17 enter the light guide plate 19 through only one side. Next, components included in the backlight device 12 will be described in detail.

Figure 3:
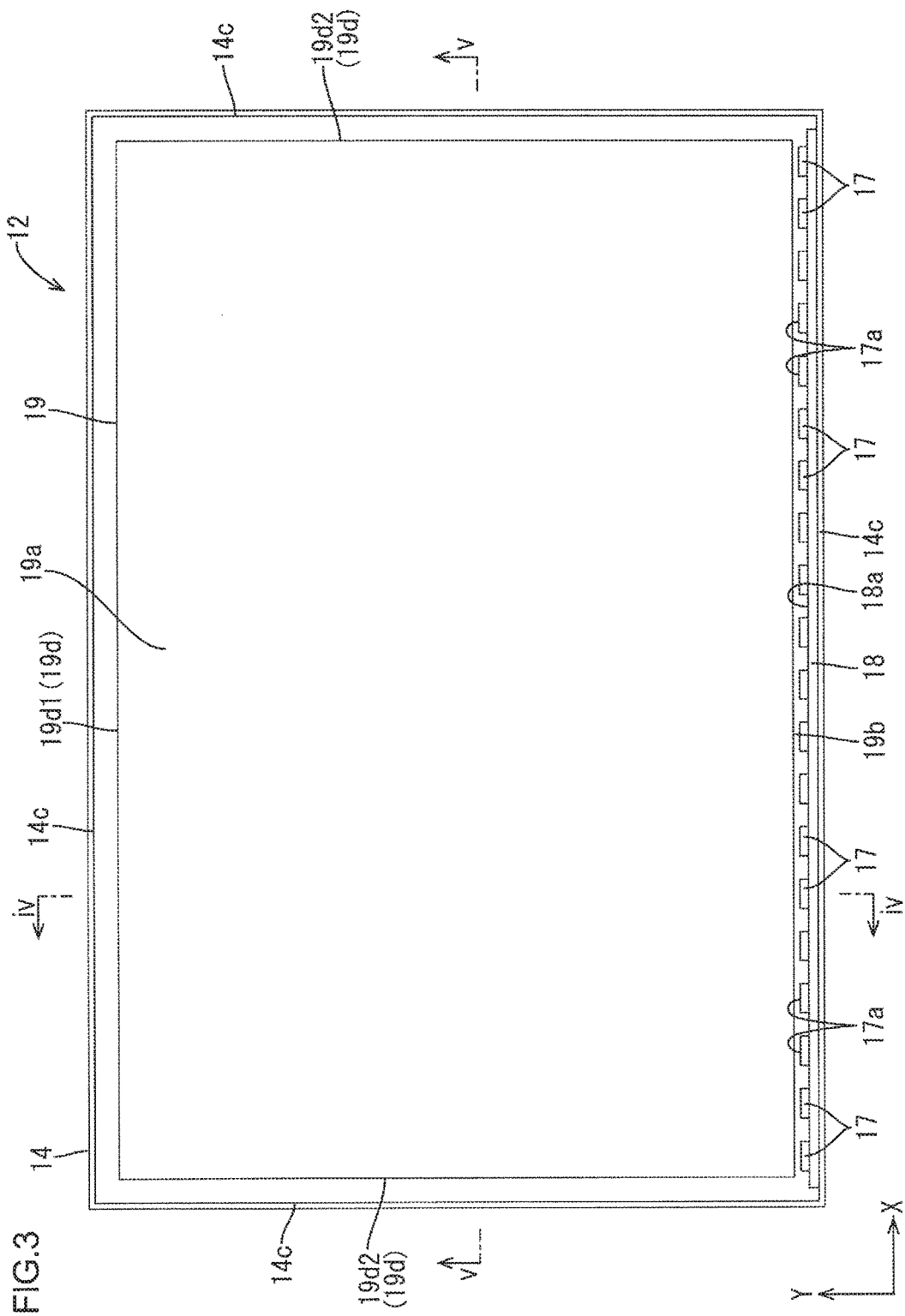
FIG. 3 is a plan view illustrating a backlight device included in the liquid crystal display device.

The chassis 14 is made of metal and as illustrated in FIGS. 2 and 3, the chassis 14 includes a bottom portion 14a that has an elongated rectangular plan view shape similar to that of the liquid crystal panel 11, and side plates 14c each of which extends from an outer edge of each side of the bottom portion 14a toward the front side. The chassis 14 has substantially a shallow box shape that opens frontward. In the chassis 14 (the bottom portion 14a), a long-side direction matches the X-axis direction (the horizontal direction) and a short-side direction matches the Y-axis direction (the vertical direction). The frame 16 and a bezel 13 are fixed on each of the side plates 14c.

Figure 4:
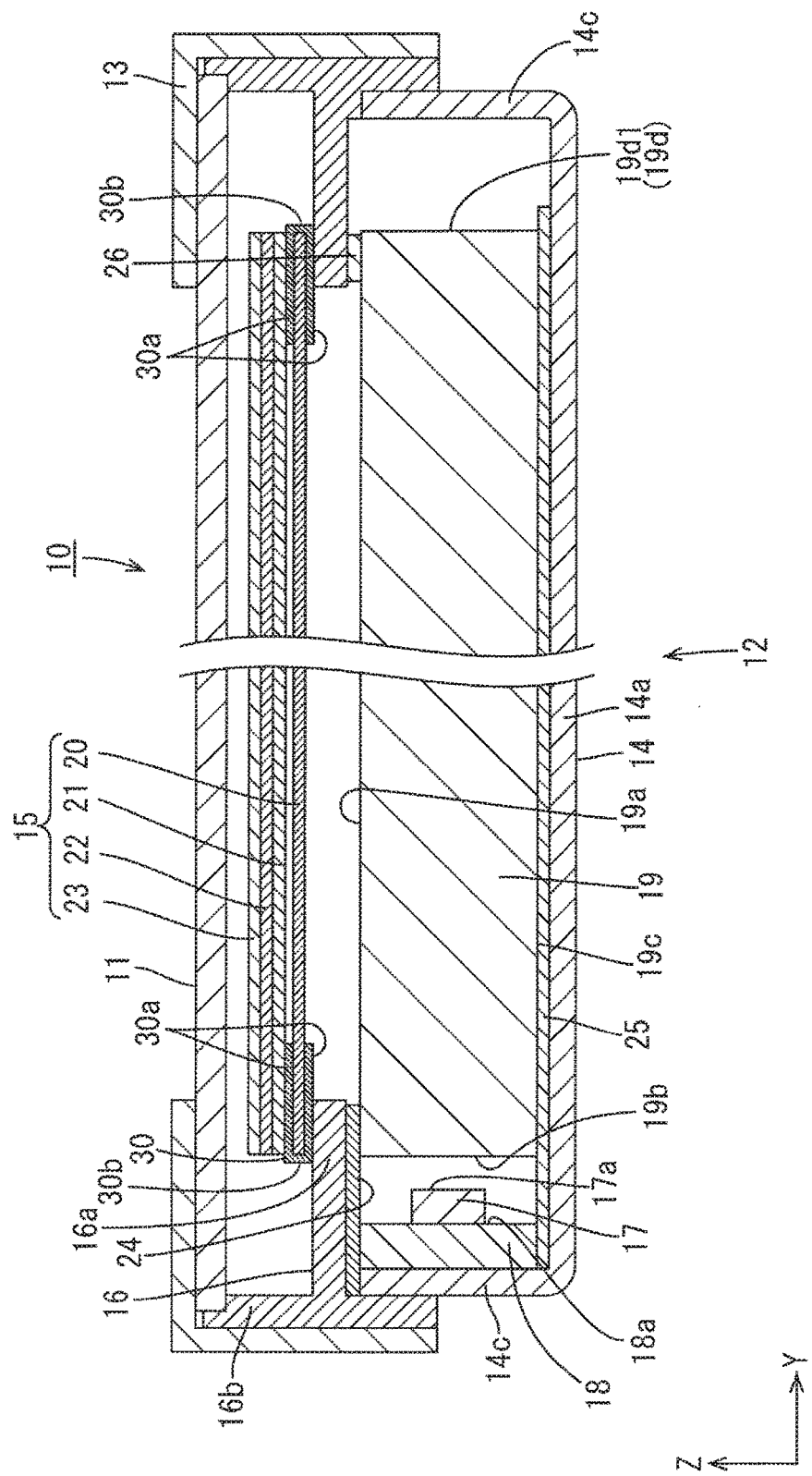
FIG. 4 is a cross-sectional view taken along iv-iv line in FIG. 3.
Figure 5:
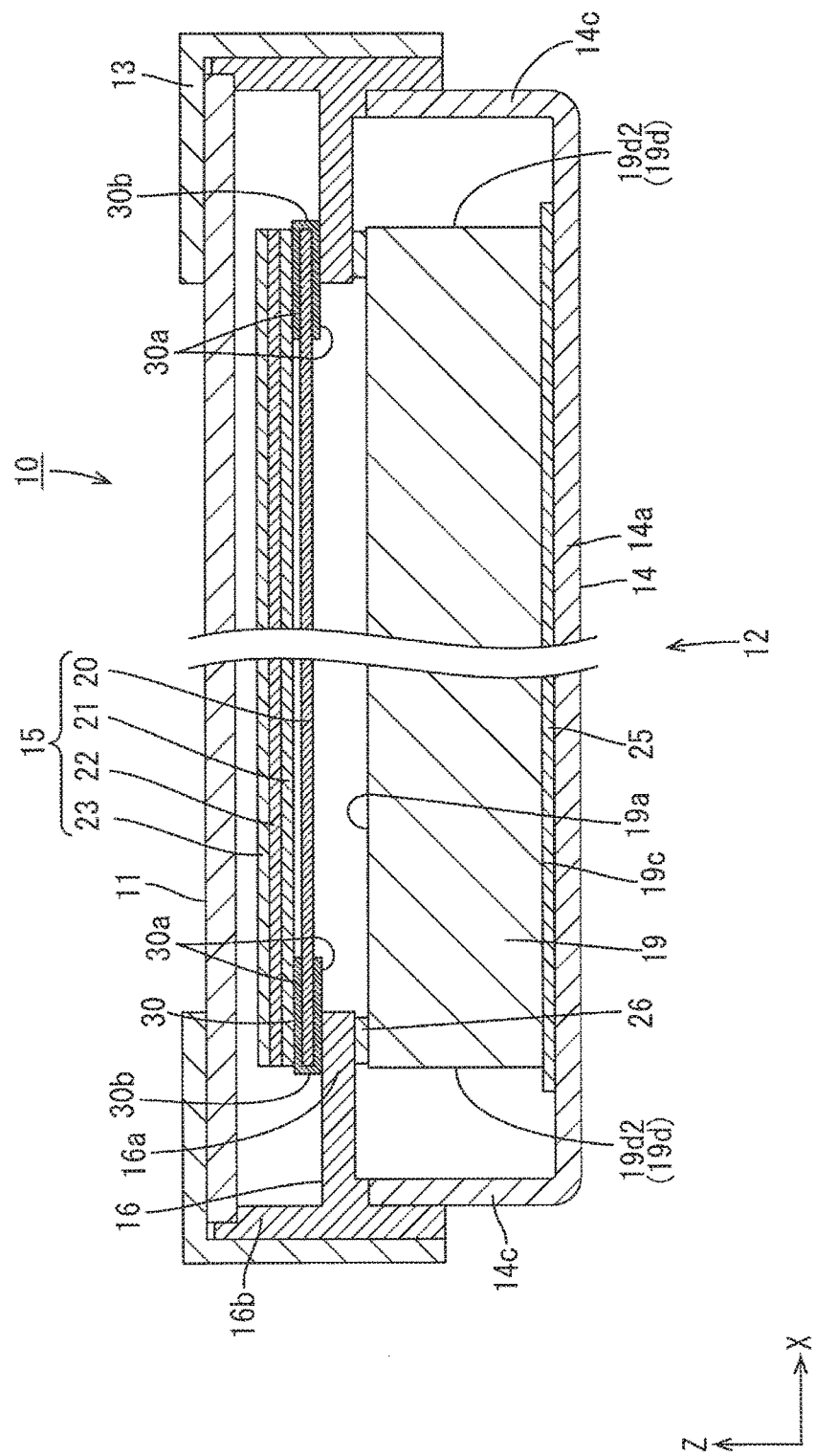
FIG. 5 is a cross-sectional view taken along v-v line in FIG. 3.

As illustrated in FIG. 2, the optical member 15 has a horizontally elongated rectangular plan view shape similar to the liquid crystal panel 11 and the chassis 14. The optical member 15 covers the light exit portion 14b of the chassis 14 and is between the liquid crystal panel 11 and the light guide plate 19. The optical member 15 is formed of a sheet and includes four sheets. Specifically, the optical member 15 includes a wavelength conversion sheet (a wavelength conversion member) 20, a micro lens sheet 21, a prism sheet 22, and a reflective-type polarizing sheet 23. The wavelength conversion sheet 20 converts light emitted by the LEDs 17 (primary light) into light having other wavelengths (secondary light). The micro lens sheet 21 exerts isotropic light collecting effects on the light. The prism sheet 22 exerts anisotropic light collecting effects on the light. The reflective-type polarizing sheet 23 reflects light with polarizing. As illustrated in FIGS. 4 and 5, the wavelength conversion sheet 20, the micro lens sheet 21, the prism sheet 22, and the reflective-type polarizing sheet 23 included in the optical member 15 are layered on each other from the rear side in this order and outer edge portions thereof are placed on the frame 16 on the front side. Namely, the wavelength conversion sheet 20, the micro lens sheet 21, the prism sheet 22, and the reflective-type polarizing sheet 23 included in the optical member 15 are opposite the light guide plate 19 on the front side, that is, on the light exit side with having a clearance of a dimension of the frame 16 (specifically, a frame portion 16a that will be described later) therebetween. A specific structure of the wavelength conversion sheet 20 will be described in detail later.

The micro lens sheet 21 includes a substrate and a micro lens portion included on a front-side plate surface of the substrate. The micro lens portion includes unit micro lenses that are planarly arranged in the X-axis direction and in the Y-axis direction in a matrix (in rows and columns). Each of the unit micro lenses has a substantially circular plan view shape and is a convex lens of a semispherical shape as a whole. According to such a configuration, the micro lens sheet 21 exerts light collecting effects on the light with respect to the X-axis direction and the Y-axis direction isotropically (anisotropic light collecting effects). The prism sheet 21 includes a substrate and a prism portion included on a front-side plate surface of the substrate. The prism portion includes unit prisms each of which extends in the X-axis direction and that are arranged in the Y-axis direction. Each of the unit prisms is formed in a rail (a linear shape) parallel to the X-axis direction in a plan view and has a substantially isosceles triangular cross-sectional shape taken in the Y-axis direction. With such a configuration, light collecting effects are selectively exerted on the light rays with respect to the Y-axis direction (a direction in which the unit prisms are arranged, a direction perpendicular to an extending direction of the unit prism) by the prism sheet 22 (anisotropic light collecting effects). The reflective-type polarizing sheet 23 includes a reflective-type polarizing film that reflects and polarizes light rays, and a pair of diffuser films that sandwich the reflective-type polarizing film from the front and rear sides. The reflective-type polarizing film has a multi-layer structure including layers having different refractive index layered on each other. Among the light rays, p-wave is passed through the reflective-type polarizing film and s-wave is reflected by the reflective-type polarizing film to the rear side. The s-wave reflected by the reflective-type polarizing film reflects off a second reflection sheet 25, which will be described later, again to the front side and separated into s-wave and p-wave. Thus, the reflective-type polarizing sheet 23 includes the reflective-type polarizing film and reflects the s-wave that is to be absorbed by the polarizing plate of the liquid crystal panel 11 if not including the reflective-type polarizing film. The reflective-type polarizing sheet 23 reflects the s-wave to the rear side (toward the second reflection sheet 25) and the reflected s-wave can be reused and light use efficiency (brightness) can be improved. The pair of diffuser films are made of synthetic resin such as polycarbonate and are subjected to embossing processing on plate surfaces thereof opposite from the surfaces facing the reflective-type polarizing film. Diffusing effects are exerted on the light by the embossed surfaces.

As illustrated in FIG. 2, the frame 16 includes a horizontally elongated frame portion (a frame portion, a frame support portion) extending along peripheral edges of the light guide plate 19 and the optical member 15. The frame portion 16a presses the peripheral edge portion of the light guide plate 19 from the front side and supports it over substantially an entire periphery thereof. As illustrated in FIG. 4, a first reflection sheet (a frame-side reflection sheet) 24 reflecting light rays is disposed on a back side surface of one of the long edge sections of the frame portion 16a, that is, on a surface of one of the long edge sections opposite the light guide plate 19 and the LED board 18 (the LEDs 17). The first reflection sheet 24 has a white surface having good light reflectivity and has a size that extends substantially an entire length of one of the long edge sections of the frame portion 16a and is directly in contact with an edge portion of the light guide plate 19 close to the LEDs 17. Thus, the edge portion of the light guide plate 19 and the LED board 18 are collectively covered with the first reflection sheet 24 from the front side. The frame portion 16a of the frame 16 is between the optical member 15 (the wavelength conversion sheet 20) and the light guide plate 19 and receives and supports the peripheral edge portion of the optical member 15 from the rear side to maintain the optical member 15 away from the light guide plate 19 by a space of a thickness of the frame portion 16a. Cushioning members 26 are disposed on back surfaces of three other edge sections of the frame portion 16a of the frame 16 other than the long edge section on which the first reflection sheet 24 is disposed (on the light guide plate 19 side). The cushioning members 26 are made of PORON (registered trademark), for example. The frame 16 includes a liquid crystal panel supporting portion 16b that projects from the frame portion 16a toward the front side and supports the peripheral portion of the liquid crystal panel 11 from the rear side.

Next, the LEDs 17 and the LED board 18 where the LEDs 17 are mounted will be described. Each LED 17 is a so-called top-surface-emitting type LED. As illustrated in FIGS. 3 and 4, the LEDs 17 are surface-mounted on the LED board 18 such that the light emission surfaces 17a faces a side opposite from the LED board 18 side. Each of the LEDs 17 is a blue LED that emits light rays of a single color of blue. A part of the blue light rays emitted by the LED 17 is converted into green light rays or red light rays having different wavelengths through the wavelength conversion sheet 20, which will be described later in detail. The green light rays and red light rays having converted wavelengths (secondary light rays) and blue light rays emitted by the LED 17 (primary light rays) are mixed with additive color mixture such that substantially white light exits the backlight device 12.

Figure 6:
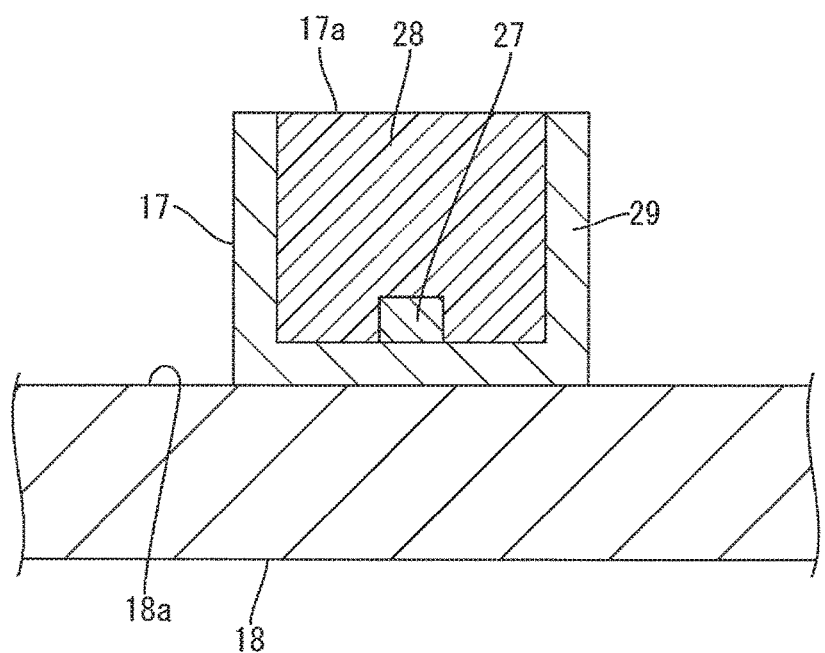
FIG. 6 is a cross-sectional view of an LED and an LED board.

As illustrated in FIG. 6, each LED 17 includes a blue LED component (a blue light emitting component, a blue LED chip) 27 that is a light emitting source, a sealing member 28, and a case (a storing member, a casing) 29. The sealing member 28 seals the blue LED component 27. The case 29 holds the blue LED component 27 and the sealing member 28 therein. The blue LED component 27 is a semiconductor made of InGaN, for example. When a forward bias is applied, the blue LED component 27 emits light rays in a wavelength range of blue light (about 420 nm to about 500 nm), that is, blue light rays. The light emitted by the LED 17 is light of a single color that is same color as that of light emitted by the blue LED component 27. The blue LED components 27 are connected to tracing patterns via a lead frame, which is not illustrated, and the tracing patterns are mounted on the LED board 18 that is arranged outside the case 29. In a process of manufacturing the LEDs 17, the case 29 having the blue LED component 27 therein is filled with the sealing member 28 to enclose and protect the blue LED component 27 and the lead frame. The sealing member 28 is made of substantially transparent thermosetting resin material (for example, epoxy resin and silicone resin) and the blue light rays emitted by the blue LED component 27 are through the sealing member 28 as the light rays emitted from the LED 17. The case 29 is made of synthetic resin (for example, polyamide resin material) or ceramic material having a white surface with good light reflectivity. The case 29 has a bottomed cylindrical shape that is open at the light emission surface 17a side. The blue LED component 27 is disposed on a bottom surface of the case 29 and the lead frame is through a peripheral wall of the case 29 such that the blue LED 27 is connected to the tracing patterns on the LED board 18.

As illustrated in FIGS. 3 and 4, the LED board 18 has an elongated plate shape extending along the long side of the chassis 14 (X-axis direction, an elongated direction of a light entering end surface 19b of the light guide plate 19). The LED board 18 is arranged in the chassis 14 such that a plate surface is parallel to an X-Z plane and is vertical to plate surfaces of the liquid crystal panel 11 and the light guide plate 19 (the optical member 15). The LED board 18 is arranged such that a long-side direction of the plate surface thereof (a longitudinal direction) matches the X-axis direction and a short-side direction thereof (a width direction) matches the Z-axis direction and a thickness direction that is perpendicular to the plate surface thereof matches the Y-axis direction. The LED board 18 is between the light guide plate 19 and one of the long side plates 14c of the chassis 14 and is arranged in the chassis 14 from the front side in the Z-axis direction. The LED board 18 is mounted on the long side plate 14c such that a plate surface thereof opposite from the mounting surface 18a where the LEDs 17 are mounted is in contact with an inner surface of the long side plate 14c. Accordingly, the light emission surfaces 17a of the LEDs 17 mounted on the LED board 18 are opposite a long side edge surface of the light guide plate (a light entering end surface 19b), which will be described later, and an optical axis of each LED 17, that is a traveling direction of light rays having greatest light emission intensity (a direction parallel to a plate surface of the liquid crystal panel 11, a direction in which the LEDs 17 and the light guide plate 19 are arranged, a normal line direction to the light entering end surface 19b) substantially matches the Y-axis direction.

As illustrated in FIGS. 3 and 4, the LED board 18 has the mounting surface 18a on which the above-structured LEDs 17 are surface-mounted on an inner plate surface thereof that faces the light guide plate 19 (an opposing surface opposite the light guide plate 19). The LEDs 17 are arranged at predetermined intervals on the mounting surface 18a of the LED board 18 in a line (linearly) along the longitudinal direction (the X-axis direction) of the LED board 18. Namely, the LEDs 17 are arranged at intervals in the long-side direction at one of the long side edges of the backlight device 12. Therefore, the arrangement direction in which the LEDs 17 are arranged matches the longitudinal direction (the X-axis direction) of the LED board 18. The intervals between the LEDs 17 adjacent to each other in the X-axis direction are equal. That is, arrangement intervals between the LEDs 17 (an arrangement pitch) are equal. Namely, The LEDs 17 are arranged at equal intervals. Tracing patterns (not illustrated) made of a metal film (such as a copper foil) is formed on the mounting surface 18a of the LED board 18 and the tracing patterns extend in the X-axis direction and cross the LEDs 17 to connect the adjacent LEDs 17 in series. The tracing patterns include a terminal at an end thereof and the terminal is electrically connected to an LED driving circuit board (not illustrated) via a tracing member (not illustrated) such that driving power is supplied to each of the LEDs 17. The LED board 18 is a one-surface mounting type in which only one of the plate surfaces is the mounting surface 18a. The LED board 18 includes a substrate that is made of metal such as aluminum material and the tracing patterns (not illustrated) are formed on a surface of the substrate via an insulation layer therebetween. Insulation material such as synthetic resin or ceramics may be used as material for the substrate of the LED board 18.

The light guide plate 19 is made of substantially transparent synthetic resin (having high light transmissivity) having a refraction index sufficiently higher than that of air (e.g., acrylic resin such as PMMA). As illustrated in FIGS. 2 and 3, the light guide plate 19 has a horizontally-elongated rectangular shape similar to the liquid crystal panel 11 and the chassis 14 in the plan view and is a plate thicker than the optical member 15. In the plate surface of the light guide plate 19, the long-side direction matches the X-axis direction and the short-side direction matches the Y-axis direction and a thickness direction perpendicular to the plate surface matches the Z-axis direction. As illustrated in FIGS. 4 and 5, the light guide plate 19 is arranged directly below the liquid crystal panel 11 and the optical member 15 within the chassis 14 and one of the long side edge surfaces of the peripheral edge surfaces of the light guide plate 19 (a front side one in FIGS. 2 and 3, a left one in FIG. 4) is opposite the LEDs 17 on the LED board that is arranged at one of the long side edge sections of the chassis 14. Therefore, the LEDs 17 (the LED board 18) and the light guide plate 19 are arranged in the Y-axis direction and the optical member 15 (the liquid crystal panel 11) and the light guide plate 19 are arranged in the Z-axis direction. The arrangement directions are perpendicular to each other. The light rays emitted by the LEDs 17 in the Y-axis direction enter the light guide plate 19 and the light rays travel within the light guide plate 19 toward the optical member 15 (toward the front side) and exits the light guide plate 19.

As illustrated in FIGS. 4 and 5, the front plate surface of the light guide plate 19 is configured as a light exiting plate surface (a light exiting surface) 19a through which the light rays traveling through the light guide plate 19 exit toward the optical member 15 and the liquid crystal panel 11. The long end surfaces of the peripheral surfaces of the light guide plate 19 adjacent to the plate surface have elongated shapes along the X-axis direction (a direction in which the LEDs 17 are arranged, the longitudinal direction of the LED board 18). One of the long end surfaces (on the lower side in FIGS. 2 and 3) is disposed opposite the LEDs 17 (the LED board 18) with a predefined distance therebetween and is a light entering end surface (a light entering surface) 19b through which the light rays emitted by the LEDs 17 directly enters.

Because the light entering end surface 19b is opposed to the LEDs 17, it may be referred to as "an LED opposed end surface (a light source opposed end surface)." The light entering end surface 19b is a surface parallel to the X-axis direction and the Z-axis direction and substantially perpendicular to the light exiting plate surface 19a. The peripheral surfaces of the light guide plate 19 other than the light entering end surface 19b (another long end surface and short end surfaces) are non-light-entering end surfaces 19d through which the light rays emitted by the LEDs 17 do not directly enter. Because the non-light-entering surfaces 19d are not opposed to the LEDs 17, they may be referred to as "LED non-opposed end surfaces (light source non-opposed end surfaces)." The non-light-entering end surfaces 19d include a non-light-entering opposite end surface 19d1 and a pair of non-light-entering lateral end surfaces 19d2. The non-light-entering opposite end surface 19d1 is the long end surface of the light guide plate 19 on the opposite side from the light entering end surface 19b, that is, the other long end surface of the light guide plate 19. The non-light-entering lateral end surfaces 19d2 are the short end surfaces of the light guide plate 19 adjacent to the light entering end surface 19b and the non-light-entering opposite end surface 19d1. In this embodiment, the LED non-opposed end surfaces are referred to as "the non-light-entering end surfaces 19d." However, some light rays may enter therethrough. For example, light rays that leak from the non-light-entering end surface 19d to the outside may be reflected by the side plates 14c of the chassis 14 and returned to the light guide plate 19. Such light rays may enter the light guide plate 19 through the non-light-entering end surface 19d.

A second reflection sheet 25 (a light guide plate-side reflection sheet) is disposed on an opposite plate surface 19c of the light guide plate 19 on the side opposite from the light exiting plate surface 19a to cover the opposite plate surface 19c on the rear side. The second reflection sheet 25 is made of synthetic resin (e.g., foamed PET) including a white surface having high light reflectivity. The second reflection sheet 25 reflects light rays traveling through the light guide plate 19 and reaching the opposite plate surface 19c to direct the light rays to the front side, that is, toward the light exiting plate surface 19a. The second reflection sheet 25 is disposed to cover substantially an entire area of the opposite plate surface 19c of the light guide plate 19. The second reflection sheet 25 includes an extended portion that overlaps the LED board 18 (the LEDs 17) in the plan view. The extended portion and the first reflection sheet 24 on the front side sandwich the LED board 18 (the LEDs 17). According to the configuration, the light rays from the LEDs 17 are repeatedly reflected by the reflection sheets 24 and 25 and thus the light entering end surface 19b efficiently receives the light rays. A light reflecting pattern (not illustrated) are formed on the opposite plate surface 19c of the light guide plate 19 for reflecting the light rays inside the light guide plate 19 toward the light exiting plate surface 19a to increase the light rays exiting through the light exiting plate surface 19a. The light reflecting pattern includes light reflectors. The light reflectors in the light reflecting pattern are light reflecting dots with distribution density that changes according to a distance from the light entering end surface 19b (the LEDs 17). Specifically, the distribution density of the light reflecting dots of the light reflectors becomes higher as the distance from the light entering end surface 19b in the Y-axis direction becomes larger (closer to the non-light-entering opposite end surface 19d1). The distribution density becomes lower as the distance to the light entering end surface 19b becomes smaller (farther away from the nonlight-entering opposite end surface 19d1). According to the configuration, the light rays from the light exiting plate surface 19a are evenly distributed within a plane.

Figure 8:
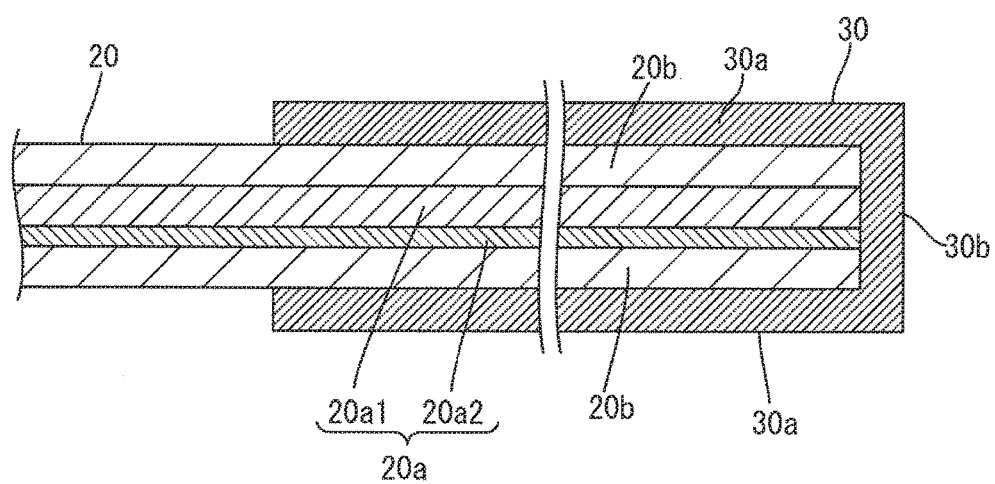
FIG. 8 is a cross-sectional view of an edge portion of the wavelength conversion sheet.

Next, the wavelength conversion sheet 20 will be described in detail. As illustrated in FIGS. 4 and 5, the wavelength conversion sheet 20 has a peripheral edge portion that is directly disposed on the frame portion 16a of the frame 16 from the front side. As illustrated in FIG. 8, the wavelength conversion sheet 20 at least includes a wavelength conversion layer (a phosphor film) 20a and a pair of protective layers (protective films) 20b. The wavelength conversion layer 20a contains phosphors (wavelength converting substances) for performing the wavelength conversion on the light rays from the LEDs 17. The protective layers 20b sandwich the wavelength conversion layer 20a in the front-rear direction to protect the wavelength conversion layer 20a. In the wavelength conversion layer 20a, red phosphors and green phosphors are dispersed. The red phosphors emit red light rays (visible light rays in a specific wavelength range to exhibit red) when exited by a single color light of blue that is excitation light. The green phosphors emit green light rays (visible light rays in a specific wavelength range to exhibit blue) when exited by single color light of blue that is excitation light. The wavelength conversion sheet 20 performs the wavelength conversion on the light rays emitted by the LEDs 17 (the blue light rays, the primary light rays) into secondary light rays (green light rays and red light rays) which exhibits color (yellow) which makes a complementary color pair with the color of light rays emitted by the LEDs 17 (blue). The wavelength conversion layer 20a is prepared by applying a phosphor layer 20a2 including the red phosphors and the green phosphors dispersed therein to a base (a phosphor base) 20a1 that is made of substantially transparent synthetic resin and in a film form. The protective layers 20b are made of substantially transparent synthetic resin and in film forms. The protective layers 20b have high moisture resistance.

In more detail, the phosphors of each color contained in the wavelength conversion layer 20a are excited by the blue light and have light emission spectrum as follows. The green phosphors are excited by the blue light and emit light having a wavelength of green (in a wavelength range from about 500 nm to about 570 nm). The green phosphors emit green light as fluorescence light. The green phosphors preferably have light emission spectrum such that a peak wavelength is about 530 nm within a wavelength range of green and a half width of the peak is less than 40 nm. The red phosphors are excited by the blue light and emit light having a wavelength of red (in a wavelength range from about 600 nm to about 780 nm). The red phosphors emit red light as fluorescence light. The red phosphors preferably have light emission spectrum such that a peak wavelength is about 610 nm within a wavelength of red and a half width of the peak is less than 40 nm.

Thus, the phosphors are down conversion type (down shifting type) phosphors, excitation wavelengths of which are shorter than fluorescence wavelengths. The down conversion type phosphors convert excitation light rays having shorter wavelengths and high energy levels into fluorescence light rays having longer wavelengths and lower energy levels. In comparison to a configuration in which up conversion type phosphors, the excitation wavelengths of which are longer than the fluorescent wavelengths (e.g., about 28% of quantum efficiency), the quantum efficiency (light conversion efficiency) is higher, which is about 30% to 50%. The phosphors of each color are quantum dot phosphors. The quantum dot phosphors include semiconductor nanocrystals (e.g., diameters in a range from 2 nm to 10 nm) which tightly confine electrons, electron holes, or excitons with respect to all direction of a three dimensional space to have discrete energy levels. A peak wavelength of emitting light (a color of emitting light) is freely selectable by changing the dot size. A light emission spectrum of the emitting light emitted by the quantum dot phosphors (fluorescence light) has a sharp peak and a half width of each peak is small, that is, purity of the color is very high and their color gamut is large. Materials used for the quantum dot phosphors include a material prepared by combining elements that could be divalent cations such as Zn, Cd, Hg, and Pb and elements that could be divalent anions such as O, S, Se, and Te (e.g., cadmium selenide (CdCe), zinc sulfide (ZnS), a material prepared by combining elements that could be trivalent cations such as Ga and In and elements that could be trivalent anions such as P, As, and Sb (e.g., indium phosphide (InP), gallium arsenide (GaAs), and chalcopyrite-type compounds (CuInSe2). In this embodiment, CdSe and ZnS are used for the material of the quantum dot phosphors. The quantum dot phosphors in this embodiment are core-shell quantum dot phosphors. Each core-shell quantum dot phosphor includes a quantum dot and a shell that is made of a semiconductor material having a relatively large bandgap and covering the quantum dot. An example of the core-shell quantum dot phosphor is Lumidot (trademark) CdSe/ZnS manufactured by Sigma-Aldrich Japan LLC.

As illustrated in FIGS. 4 and 5, in the edge-light type backlight device 12 according to this embodiment, some of light rays exiting from the light guide plate 19 through the light exiting plate surface 19a are not converted to light rays with other wavelengths by the wavelength conversion sheet 20 and such light rays may not be included in exiting light from the backlight device 12. The light rays may be retroreflected and returned to the light guide plate 19, and then included in the exiting light from the backlight device 12. The number of times at which the retroreflected light rays are reflected tends to be smaller in the outer area than the center portion of the light guide plate 19, namely, the number of times at which the retroreflected light rays pass through the wavelength conversion sheet 20 tends to be smaller. Therefore, the retroreflected light rays are less likely to be converted to light rays with other wavelengths by the wavelength conversion sheet 20. The color of the retroreflected light rays exiting from the peripheral portion of the light guide plate 19 (including the non-light-entering end surfaces 19d) is closer to the color of the light from the LEDs 17, that is, closer to blue in comparison to the color of the retroreflected light rays exiting from the center portion of the light guide plate 19. Some light rays transmitting through the light guide plate 19 may not exit through the light exiting plate surface 19a. Some light rays may exit through the non-light-entering end surfaces 19d. Especially, some of the light rays emitting by the LEDs 17 entering the light guide plate 19 through the light entering end surface 19b and transmitting through the light guide plate 19 exit through the non-light-entering surfaces 19d. Such light rays exhibit blue. The light rays exiting from the peripheral portion of the light guide plate 19 are less likely to be converted to light rays with other wavelengths by the wavelength conversion sheet 20 according to the known technology. If the light rays leak to the outside via the gap between the cushioning member 26 and the light guide plate 19, the light exiting from the backlight device 12 may be bluish only in the peripheral portion. Namely, the color of the light exiting from the peripheral portion of the backlight device 12 and the color of the light exiting from the center portion of the backlight device 12 tend to be different.

As illustrated in FIGS. 4 and 5, in the backlight device 12 according to this embodiment, a color exhibit member 30 is disposed on at least a part of a peripheral portion of the wavelength conversion sheet 20. The color exhibit member 30 exhibits a color same as or similar to a color of light rays that are converted by the phosphors contained in the wavelength conversion sheet 20. According to such a configuration, the retroreflected light rays at a smaller number of times of retrorefelction that are in the peripheral portion of the backlight device 12 and light rays leaking from a peripheral edge of the light guide plate 19 may be tinged to exhibit the color same as or similar to the color of light rays that are converted by the phosphors contained in the wavelength conversion sheet 20 by the color exhibit member 30 mounted on at least a part of the peripheral edge portion of the wavelength conversion sheet 20. Accordingly, difference in color between the light exiting from the center portion of the backlight device 12 and the light exiting from the peripheral portion of the backlight device 12 is less likely to occur. This configuration is preferable for reducing the color unevenness.

Specifically, the color exhibit member 30 preferably exhibits yellow that is a same color as yellow light rays, that are green light rays and red light rays that are obtained with wavelength conversion by the green phosphors and the red phosphors contained in the wavelength conversion sheet 20. The color exhibited by the color exhibit member 30 is not necessarily yellow but may be a similar color to yellow, for example, yellow tinged with green (yellowish green) or yellow tinged with red (orange yellow). The "similar color" in this specification is referred to as "a color that is next to or close to a specific color (yellow in this embodiment) on the color wheel". The color exhibit member 30 includes a metal thin film (such as an aluminum thin film) and coating material (including pigment or dye) that exhibits yellow or a similar color to yellow and the coating material is applied on a surface of the metal thin film with coating. The coating material contained in the color exhibit member 30 and exhibiting yellow or the similar color to yellow has an absorption rate of blue light that makes a complementary color pair with yellow light that is converted through the wavelength conversion sheet 20, that is, an absorption rate of the light rays emitted by the LEDs 17 (the primary light rays) relatively higher than an absorption rate of light of yellow or a similar color to yellow that is converted through the wavelength conversion sheet 20. The "complementary color" in this specification is referred to as "a color that is opposite from a specific color on the color wheel" and may be referred to as "an opposite color". The "yellow light" in this specification include light rays in a wavelength range of yellow light (about 570 nm to about 600 nm) and also include combined light rays of green light rays in a wavelength range of green light (green light rays exiting the green phosphors) and red light rays in a wavelength range of red (red light rays exiting the red phosphors). The color exhibit member 30 absorbs a relatively great amount of blue light rays and exits a relatively great amount of light rays of yellow or a similar color to yellow. Thus, the color exhibit member 30 has a function for selectively absorbing light rays with certain wavelength to tinge the light rays with yellow.

Figure 7:
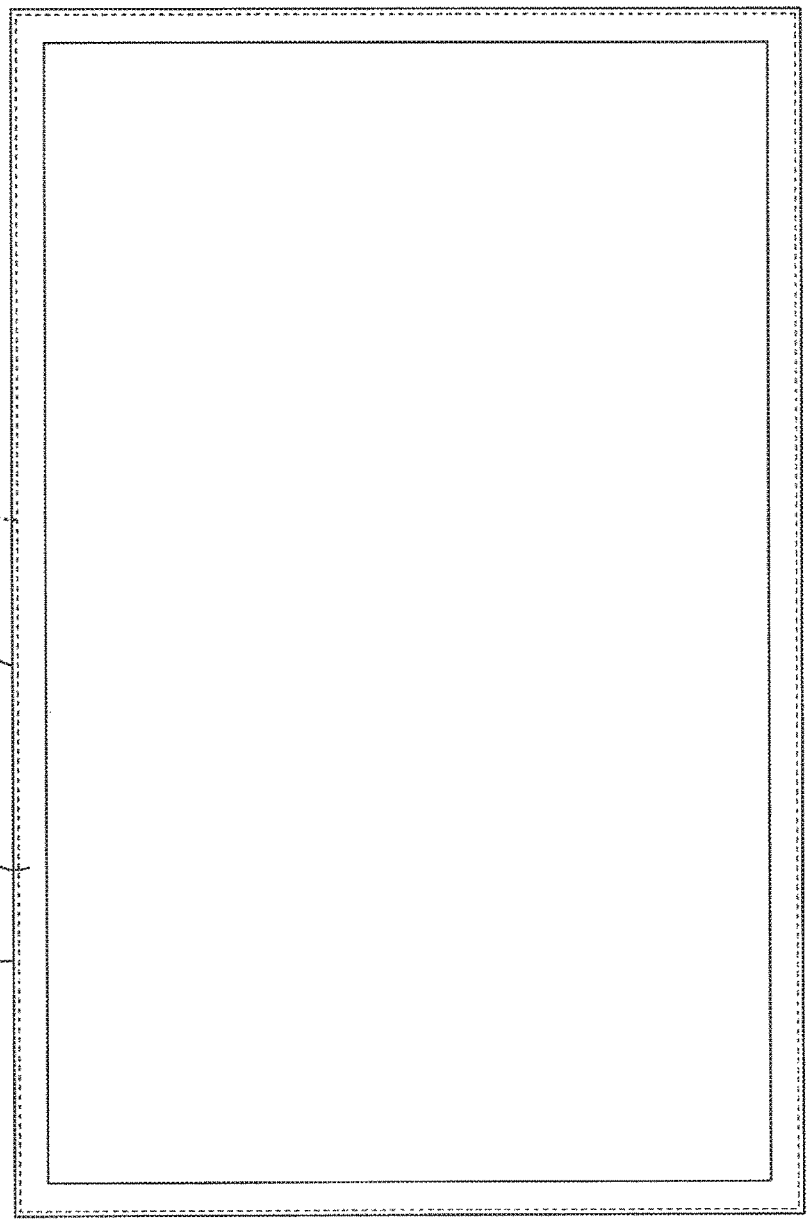
FIG. 7 is a plan view of a wavelength conversion sheet.

As illustrated in FIG. 7, the color exhibit member 30 extends along an entire periphery of the peripheral portion of the wavelength conversion sheet 20 and has a laterally elongated plan view frame shape that is similar to the wavelength conversion sheet 20. Namely, the color exhibit member 30 is mounted on the peripheral portion of the wavelength conversion sheet 20 along the non-light-entering end surfaces 19d of the light guide plate 19 (the other long side portion and a pair of short side portions) and along the light entering end surface 19b (one long side portion) of the light guide plate 19. Accordingly, the bluish light rays exiting through the non-light-entering end surfaces 19d of the peripheral edge surfaces of the light guide plate 19 and the bluish light rays exiting through the light entering end surface 19b are tinged with yellow or the similar color to yellow by the color exhibit member 30, that is, color exhibiting effects are exerted on the bluish light rays by the color exhibit member 30. Thus, the color exhibiting effects are evenly exerted on the bluish light rays in the peripheral portion of the backlight device 12 over an entire periphery thereof. Therefore, this configuration is preferable for reducing the color unevenness.

As illustrated in FIG. 8, the color exhibit member 30 is disposed to collectively hold the peripheral edge portions of the wavelength conversion layer 20a and the pair of protection layers 20b included in the wavelength conversion sheet 20. Specifically, the color exhibit member 30 includes a pair of plate surface overlapping portions 30a and an edge surface overlapping portion 30b. The plate surface overlapping portions 30a overlap outer plate surfaces of the protective layers 20b at the peripheral edge portions, respectively, on an outer side thereof. The edge surface overlapping portion 30b overlaps peripheral edge surfaces of the wavelength conversion layer 20a and the protective layers 20b on an outer side thereof. The plate surface overlapping portions 30a are continuous to the respective ends of the edge surface overlapping portion 30b. Thus, in the wavelength conversion sheet 20, the peripheral edge portion of the wavelength conversion layer 20a containing the phosphor layer 20a2 is covered with the color exhibit member 30 over an entire periphery thereof. The phosphors contained in the phosphor layer 30a2 are less likely to be directly exposed to external air. Accordingly, the properties of the phosphors contained in the phosphor layer 20a2 are less likely to be deteriorated due to the moisture absorption, and the phosphors can keep exerting the function of converting wavelengths of light rays. The plate surface overlapping portions 30a of the color exhibit member 30 overlap the peripheral portion of the wavelength conversion sheet 20 on the front side (a light entering side) and the rear side (the light exit side), respectively. Therefore, the color exhibiting effects are exerted on the light rays exiting the light guide plate toward the wavelength conversion sheet 20 and also the light rays exiting the optical member 15 other than the wavelength conversion sheet 20 toward the wavelength conversion sheet 20.

As illustrated in FIGS. 4 and 5, the color exhibit member 30 is disposed such that an inner peripheral edge of the color exhibit member 30 is on an inner side than an inner peripheral edge of the frame portion 16a of the frame 16 over an entire periphery thereof. The frame portion 16a of the frame 16 overlaps the light guide plate 19 on the front side thereof and presses and supports the peripheral edge portion of the light guide plate 19. Thus, the inner peripheral edge of the frame portion 16a defines an effective light exit area in the light exiting plate surface 19a of the light guide plate 19 through which the light rays exit. Therefore, the color exhibit member 30 is disposed such that an inner peripheral portion of the color exhibit member 30 extending inward from the frame portion 16a overlaps the effective light exit area in the light exiting plate surface 19a of the light guide plate 19, in the plan view, through which the light rays exit. According to such a configuration, the color exhibiting effects can be surely exerted on the exit light rays exiting the light guide plate 19 through the light exiting plate surface 19a and this configuration is preferable for reducing the color unevenness.

Next, functions of this embodiment having the above configuration will be described. When the liquid crystal display device 10 having the configuration described above is turned on, the driving of the liquid crystal panel 11 is controlled by the panel controller circuit on the control circuit board, which is not illustrated. The LED driver circuit on the LED driver circuit board, which is not illustrated, supplies driving power to the LEDs 17 on the LED board 18 to control the driving of the LEDs 17. The light from the LEDs 17 are guided by the light guide plate 19 to travel to the liquid crystal panel 11 via the optical member 15. With the light, a specific image is displayed on the liquid crystal panel 11. Functions of the backlight device 12 will be described in detail.

When the LEDs 17 are turned on, the light rays emitted by the LEDs 17 enter the light guide plate 19 through the light entering end surface 19b as illustrated in FIG. 4. The space provided between the LEDs 17 and the light entering end surface 19b is closed with the first reflection sheet 24 on the front side and the extended portion of the second reflection sheet 25 on the rear side. Therefore, the light rays are repeatedly reflected by portions of the reflection sheets 24 and 25 opposed to each other. The light rays enter through the light entering end surface 19b with efficiency. The light rays entering through the light entering end surface 19b may be totally reflected by the interface between the light guide plate 19 and the air layer on the outside or reflected by the second reflection sheet 25 to transmit through the light guide plate 19. The light rays transmitting through the light guide plate 19 are reflected by the light reflectors of the light reflecting pattern to different directions. The light rays enter the light exiting plate surface 19a with incidence smaller than the critical angle. More light rays exit through the light exiting plate surface 19a. The optical effects are exerted on the light rays exiting from the light guide plate 19 through the light exiting plate surface 19a and passing through the optical members 15. The light rays on which the optical effects are exerted are applied to the liquid crystal panel 11. Some of the light rays are retroreflected by the optical member 15 and returned to the light guide plate 19. The retroreflected light rays exit through the light exiting plate surface 19a and provided as the exit light of the backlight device 12.

Next, optical effects of the optical member 15 will be described in detail. The blue light rays exiting the light guide plate 19 through the light exiting plate surface 19a are converted into the green light rays and the red light rays (secondary light) by the green phosphors and the red phosphors contained in the wavelength conversion sheet 20 that is disposed on the front side relative to the light exiting plate surface 19a with the distance therebetween as illustrated in FIG. 4. With the green light rays and the red light rays obtained through the wavelength conversion, that is, the yellow light rays (secondary light) and the blue light from the LEDs 17 (primary light), light rays in substantially white are obtained. Light collecting effects are isotropically exerted on the blue light rays (primary light) from the LEDs 17 and the green light rays and the red light rays (secondary light) obtained through the wavelength conversion with respect to the X-axis direction and the Y-axis direction (isotropic light collecting effects) by the micro lens sheet 21.

Then, light collecting effects are selectively exerted on the light rays with respect to the Y-axis direction by the prism sheet 22 (anisotropic light collecting effects). The light rays exiting from the prism sheet 22 to the reflective type polarizing sheet 23 and specific polarized light rays (p-wave) are selectively passed to exit toward the liquid crystal panel 11. Different specific polarized light rays (s-wave) are selectively reflected to the rear side. The s-wave reflected by the reflective type polarizing sheet 23 or the light rays reflected to the rear side without light collecting effects by the prism sheet 22 or the micro lens sheet 21 are returned to the light guide plate 19. While transmitting through the light guide plate 19, the light rays are reflected again by the second reflection sheet 25 to exit again through the light exiting plate surface 19a to the front side.

As illustrated in FIGS. 4 and 5, the light rays transmitting through the light guide plate 19 include the retroreflected light rays that are reflected after exiting through the light exiting plate surface 19a and returned to the light guide plate 19. The number of reflection of the retroreflected light rays, that is, the number of times at which the retroreflected light rays pass through the wavelength conversion sheet 20 tends to be smaller in the peripheral portion of the light guide plate 19 than the center portion of the light guide plate 19. Therefore, the retroreflected light rays exiting from the peripheral portion of the light guide plate 19 (including the peripheral edge surfaces) tend to be bluish that is closer to the color of the blue light from the LEDs 17 (the primary light) in comparison to the retroreflected light exiting from the center portion of the light guide plate 19. Some of the blue light rays emitted by the LEDs 17 and transmitting through the light guide plate 19 (primary light) may not exit through the light exiting plate surface 19a and may exit the light guide plate 19 through the non-light-entering end surfaces 19d of the peripheral surfaces. In the backlight device 12 according to this embodiment, the color exhibit member 30 mounted on the peripheral portion of the wavelength conversion sheet 20 exhibits yellow or the similar color to yellow that is same as a color of light rays converted by the phosphors contained in the wavelength conversion sheet 20 (the secondary light). The retroreflected light rays at a smaller number of times of retrorefelction that are in the peripheral portion of the backlight device 12 are bluish light rays and light rays exiting a peripheral edge surface of the light guide plate 19 are bluish (light rays of the color same as or similar to the primary light). Such bluish light rays are tinged with yellow or a similar color to yellow by the color exhibit member 30. Specifically, the color exhibit member 30 has a higher absorption rate of the light rays of blue that is same color as the light rays form the LEDs 17 (the primary light rays) than an absorption rate of the light rays of yellow or a similar color to yellow that is same color as the color of light rays having a wavelength converted through the wavelength conversion sheet 20 (the secondary light rays). Accordingly, the color exhibit member 30 absorbs a greater amount of blue light rays among the light rays in the peripheral portion of the backlight device 12 such as the retroreflected light rays at a smaller number of times of retrorefelction and the light rays exiting from the peripheral edge of the light guide plate 19, and a greater amount of yellow light rays exit through the color exhibit member 30. Thus, the bluish light rays are tinged with yellow or the similar color to yellow by the color exhibit member 30 to have a color close to white. Therefore, a color of the exit light rays exiting the peripheral portion of the backlight device 12 is less likely to be bluish and closer to a color of the exit light rays exiting from the center portion thereof (substantially white light rays). Accordingly, difference in color (tint) between the light exiting from the center portion of the backlight device 12 and the light exiting from the peripheral portion of the backlight device 12 is less likely to occur and the color unevenness in the exit light rays is less likely to be caused.

As illustrated in FIG. 7, the color exhibit member 30 extends along an entire periphery of the peripheral portion of the wavelength conversion sheet 20 and the color exhibit effects can be exerted evenly on the light rays in the peripheral portion of the backlight device 12. Therefore, this configuration is preferable for reducing the color unevenness. Further, as illustrated in FIG. 8, the color exhibit member 30 extending along the entire periphery of the peripheral portion of the wavelength conversion sheet 20 is disposed to collectively hold the peripheral edge portions of the wavelength conversion layer 20a and the pair of protection layers 20b included in the wavelength conversion sheet 20. Therefore, the wavelength conversion layer 20a is closed at an entire periphery thereof and the phosphors contained in the wavelength conversion layer 20a are less likely to be deteriorated due to the moisture absorption. Further, as illustrated in FIGS. 4 and 5, the color exhibit member 30 extends inward from the frame portion 16a and the extended portion overlaps the effective light exit area of the light exiting plate surface 19a, in the plan view, through which the light rays exit. According to such a configuration, the color exhibiting effects can be surely exerted on the exit light rays exiting the light guide plate 19 through the light exiting plate surface 19a by the color exhibit member 30 and this configuration is preferable for reducing the color unevenness.

As described before, the backlight device (the lighting device) 12 according to this embodiment includes the LEDs (the light source) 17, the light guide plate 19 including the light entering end surface 19b and the light exiting plate surface 19a, the wavelength conversion sheet (the wavelength converting member) 20, and the color exhibit member 30. The light entering end surface 19b is a part of peripheral edge surface of the light guide plate 19 and the light rays from the LEDs 17 enter through the light entering end surface 19b. The light exiting plate surface 19a is one of a pair of plate surfaces of the light guide plate 19 and the light rays exit trough the light exiting plate surface 19a. The wavelength conversion sheet 20 is disposed to overlap the light exiting plate surface 19a of the light guide plate 19 and contains the phosphors that convert the wavelengths of the light rays from the LEDs 17. The color exhibit member 30 is disposed at least a part of the peripheral portion of the wavelength conversion sheet 20 and exhibits a color same as or similar to the color of light rays that are converted by the phosphors contained in the wave conversion sheet 20.

According to such a configuration, the light rays emitted by the LEDs 17 enter the light guide plate 19 through the light entering end surface 19b of the peripheral edge surfaces of the light guide plate 19 and transmit through the light guide plate and exit through the light exiting plate surface 19a. The light rays exiting through the light exiting plate surface 19a are converted to light rays with other wavelengths by the phosphors contained in the wavelength conversion sheet 20 overlapping the light exiting plate surface 19a. Some of light rays exiting from the light guide plate 19 through the light exiting plate surface 19a are not converted to light rays with other wavelengths by the wavelength conversion sheet 20 and such light rays may not be included in exiting light from the backlight device 12. The light rays may be retroreflected and returned to the light guide plate 19, and then included in the exiting light from the backlight device 12. The number of times at which the retroreflected light rays are reflected tends to be smaller in the outer area than the center portion of the backlight device 12, and the number of times at which the retroreflected light rays pass through the wavelength conversion sheet 20 tends to be smaller. Therefore, the retroreflected light rays are less likely to be converted to light rays with other wavelengths by the wavelength conversion sheet 20. Some light rays transmitting through the light guide plate 19 may not exit through the light exiting plate surface 19a. Some light rays may exit through the peripheral edge surface of the light guide plate 19.

The color exhibit member 30 is disposed on at least a part of the peripheral portion of the wavelength conversion sheet 20, and the color exhibit member 30 exhibits the color same as or similar to the color of light rays converted by the phosphors contained in the wavelength conversion sheet 20 with wavelength conversion. Therefore, the color exhibiting effects are exerted by the color exhibit member 30 on the retroreflected light rays at a smaller number of times of retrorefelction and the light rays exiting from the peripheral edge of the light guide plate 19 that are in the peripheral portion of the backlight device 12 to have the color same as or similar to the color of the light rays converted by the phosphors contained in the wavelength conversion sheet 20. Accordingly, the difference in color (tint) between the light exiting from the center portion of the backlight device 12 and the light exiting from the peripheral portion of the backlight device 12 is less likely to occur and the color unevenness in the exit light rays is less likely to be caused.

The color exhibit member 30 has a higher absorption rate of the light having a color same as or similar to the color that makes a complementary color pair with a color of the light that is converted by the phosphors through the wavelength conversion sheet 20 than an absorption rate of the light of a color same as or similar to the color of the light that is converted by the phosphors through the wavelength conversion sheet 20. Accordingly, among the retroreflected light rays at a smaller number of times of retrorefelction and the light rays exiting from the peripheral edge of the light guide plate 19 in the peripheral portion of the backlight device 12, a greater amount of the light rays having a color same as or similar to the color that makes a complementary color pair with a color of the light rays that are converted by the phosphors through the wavelength conversion sheet 20 is absorbed by the color exhibit member 30 than that of the light rays having a color same as or similar to the light rays that are converted by the phosphors through the wavelength conversion sheet 20. Therefore, the color exhibiting effects are exerted by the color exhibit member 30 on the retroreflected light rays at a smaller number of times of retrorefelction and the light rays exiting from the peripheral edge of the light guide plate 19 in the peripheral portion of the backlight device 12 to have the color same as or similar to the color of the light rays converted by the phosphors contained in the wavelength conversion sheet 20.

The LEDs 17 emit blue light and the wavelength conversion sheet 20 contains at least the green phosphors and the red phosphors or the yellow phosphors as the phosphors. The green phosphors convert the blue light into the green light with wavelength conversion and the red phosphors convert the blue light into the red light with wavelength conversion. The yellow phosphors convert the blue light into the yellow light with wavelength conversion. The color exhibit member 30 is configured to exhibit yellow or a similar color to yellow. According to such a configuration, the blue light emitted by the LEDs 17 is converted into the green light and the red light through the wavelength conversion sheet 20 containing the green phosphors and the red phosphors, or converted into the yellow light through the wavelength conversion sheet 20 containing the yellow phosphors with wavelength conversion. The retroreflected light rays at a smaller number of times of retrorefelction and the light rays exiting from the peripheral edge of the light guide plate 19 in the peripheral portion of the backlight device 12 include a great amount of the light rays having a color same as or similar to the blue light rays emitted by the LEDs 17. Therefore, if the great amount of such light rays is included in the exit light rays exiting the backlight device 12, the exit light rays may be more bluish in the peripheral portion than in the center portion. The color exhibiting effects are exerted by the color exhibit member 30 on the retroreflected light rays at a smaller number of times of retrorefelction and the light rays exiting from the peripheral edge of the light guide plate 19 that are in the peripheral portion of the backlight device 12 to have the color same as or similar to the color of the light rays converted by the phosphors contained in the wavelength conversion sheet 20, that is yellow or a similar color to yellow. Therefore, the ratio of the amount of the blue light rays or the light rays of a similar color to blue to the amount of the exit light rays exiting the peripheral portion of the backlight device 12 is reduced and the color unevenness is preferably reduced.

The frame 16 includes the frame portion 16a that supports the respective peripheral portions of the light guide plate 19 and the wavelength conversion sheet 20. The color exhibit member 30 is disposed such that the inner edge thereof is on an inner side than the inner edge of the frame portion 16a. According to such a configuration, the respective peripheral edge portions of the light guide plate 19 and the wavelength conversion sheet 20 are supported by the frame portion 16a of the frame 16. The color exhibit member 30 is disposed on at least a part of the peripheral portion of the wavelength conversion sheet 20 such that the inner edge thereof is on an inner side than the inner edge of the frame portion 16a and therefore, the light rays on which the color exhibiting effects are exerted or to be exerted by the color exhibit member 30 are less likely to be obstructed by the frame portion 16a of the frame 16. Therefore, this configuration is more preferable for reducing the color unevenness.

The color exhibit member 30 is disposed to extend over an entire peripheral portion of the wavelength conversion sheet 20. According to such a configuration, the color exhibiting effects are evenly exerted on the light rays that are in the peripheral portion of the backlight device 12 by the color exhibit member 30 extending along the entire peripheral portion of the wavelength conversion sheet 20. This configuration is more preferable for reducing the color unevenness.

The wavelength conversion sheet 20 includes the wavelength conversion layer 20a containing the phosphors, and the pair of protection layers 20b sandwiching the wavelength conversion layer 20a therebetween and protect it. The color exhibit member 30 is disposed to hold collectively the peripheral edge portions of the wavelength conversion layer 20a and the protection layers 20b. According to such a configuration, the wavelength conversion layer 20a is closed by the color exhibit member 30 extending along the entire peripheral portion of the wavelength conversion sheet 20 and therefore, the phosphors contained in the wavelength conversion layer 20a are less likely to be deteriorated due to the moisture absorption.

The wavelength conversion sheet 20 contains the quantum dot phosphors as the phosphors. According to such a configuration, the wavelength conversion efficiency of light rays through the wavelength conversion sheet 20 is increased and the purity of the light converted through with wavelength conversion is higher.

The liquid crystal display device 10 according to this embodiment includes the above backlight device 12, and the liquid crystal panel (the display panel) 11 that displays images with using light supplied by the backlight device 12. According to the liquid crystal display device 10 having the above structure, unevenness in color of the exit light from the backlight device 12 is less likely to be caused and display with good display quality can be achieved.

The television device 10TV according to this embodiment includes the above display device 10. According to the television device 10TV, display quality of the liquid crystal display device 10 is good and display with good display quality can be achieved.

Second Embodiment

A second embodiment of the present invention will be described with reference to FIG. 9 and FIG. 10. A color exhibit member 130 has a function of positioning a wavelength conversion sheet 120. Configurations, operations, and effects similar to those of the first embodiment will not be described.

Figure 9:
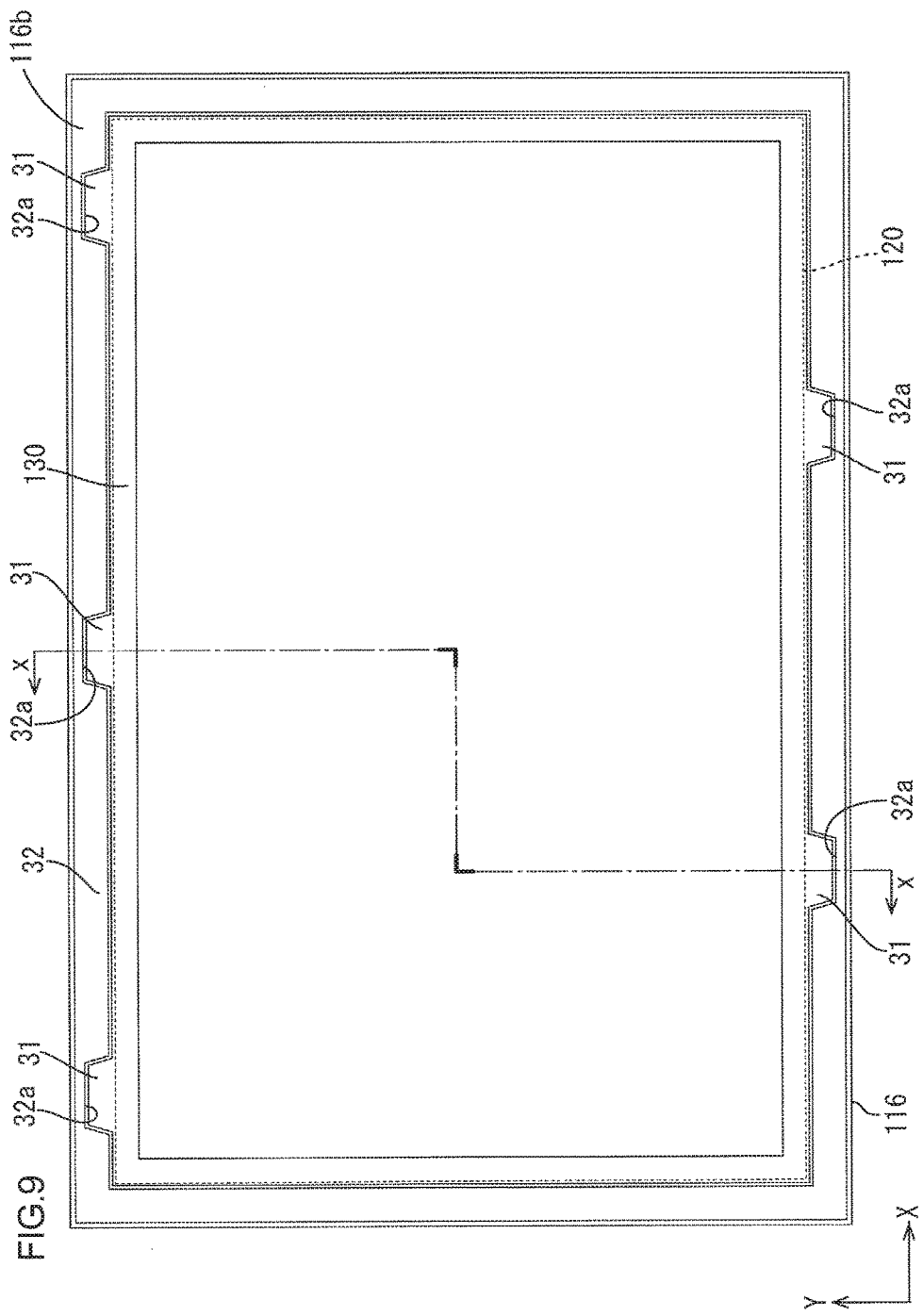
FIG. 9 is a plan view illustrating a frame and a wavelength conversion sheet according to a second embodiment of the present invention.
Figure 10:
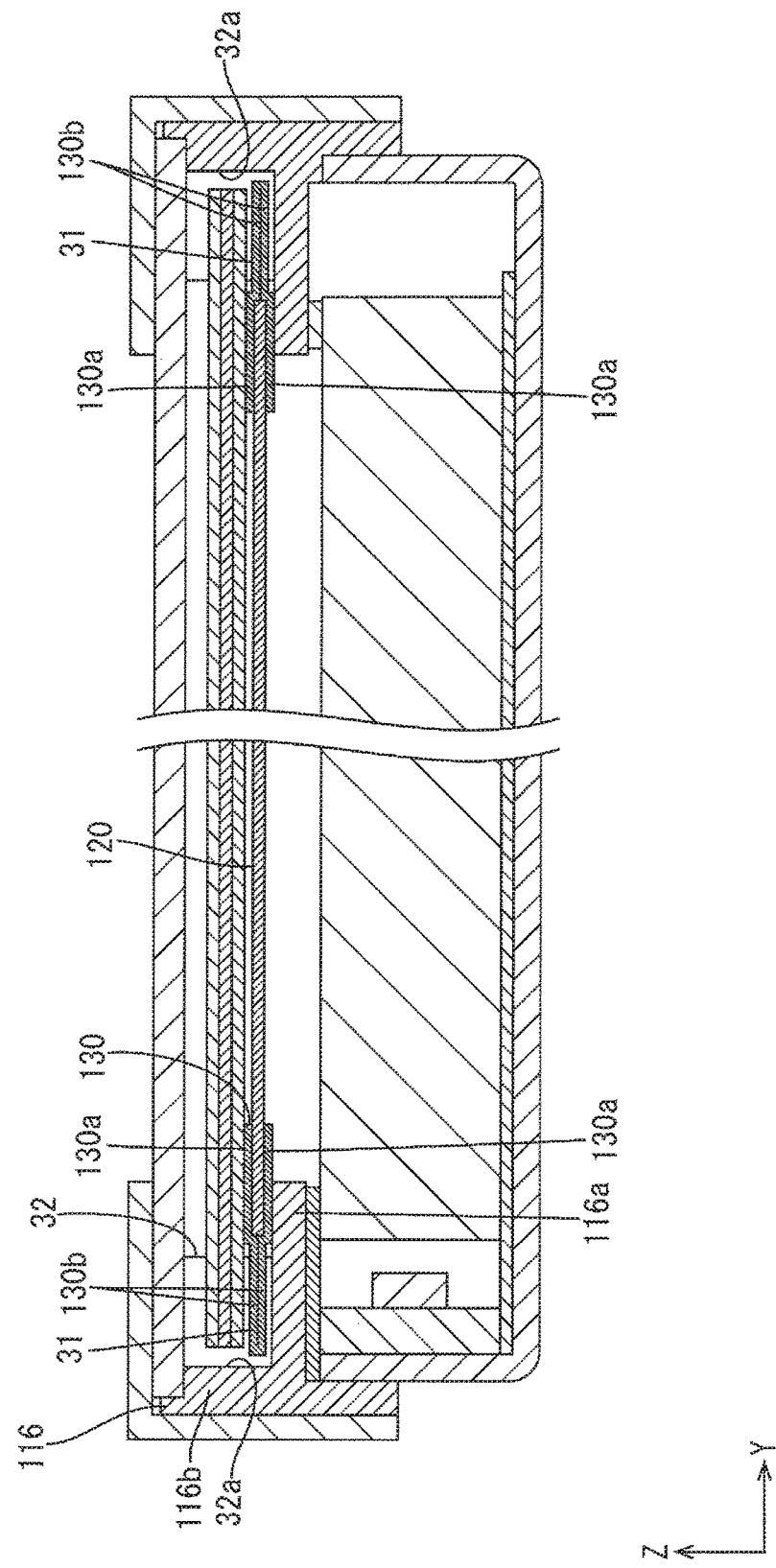
FIG. 10 is a cross-sectional view taken along x-x line in FIG. 9.

As illustrated in FIGS. 9 and 10, the color exhibit member 130 according to this embodiment includes positioning projections 31 projecting from a peripheral edge of the wavelength conversion sheet 120. A frame 116 that supports the peripheral edge portion of the wavelength conversion sheet 120 from the rear side has a positioning member 32. The positioning member 32 is in contact with the positioning projections 31 such that the wavelength conversion sheet 120 having the color exhibit member 130 thereon is positioned with respect to a direction along a plate surface thereof (along an X-Y plane). In FIG. 9, an outer shape of the wavelength conversion sheet 120 is illustrated with a dotted line.

Each of the positioning projections 31 is integrally formed with the color exhibit member 130 by projecting a part of the color exhibit member 130 with respect to a circumferential direction thereof toward an outer side in the plan view. The color exhibit member 130 has a horizontally elongated frame shape. Specifically, the positioning projection 31 is configured by extending a part of an edge surface overlapping portion 130b of the color exhibit member 130 with respect to a circumferential direction thereof toward an outer side along plate surface overlapping portions 130a to be folded (especially referring FIG. 10). Multiple positioning projections 31 are included on each of long side portions of the color exhibit member 130 and specifically, an upper long side portion in FIG. 9 includes three positioning projections 31 and a lower long side portion includes two positioning projections 31. The positioning projections 31 are provided at intervals with respect to the X-axis direction. The five positioning projections 31 are provided asymmetrically with respect to an up-down direction in FIG. 9. According to such a configuration, if the wavelength conversion sheet 120 is to be placed on a frame portion 116a of the frame 116 upside down or with the surfaces thereof being reversed, the positioning projections 31 do not fit in the positioning member 32 and the wavelength conversion sheet 120 may not be mounted on the frame correctly.

The positioning member 32 is formed continuous from each of the frame portion 116a and a liquid crystal panel support portion 116b of the frame 116 and surrounds the entire periphery of the color exhibit member 130 from the outer side. The positioning member 32 has a horizontally elongated frame shape larger than a shape of the color exhibit member and has a plan-view shape such that an inner surface thereof extends along an outer surface of the color exhibit member 130. Therefore, the positioning member 32 includes positioning recess portions 32a on the inner surface thereof to receive the respective positioning projections 31 and the planar arrangements of the positioning recess portions 32a and the positioning projections 31 match each other. When the positioning projections 31 are fit in the positioning recess portions 32a, respectively, the outer surface of each positioning projection is in contact with the inner surface of each positioning recess portion 32a such that the color exhibit member 130 and the wavelength conversion sheet 120 are less likely to be displaced from each other with respect to the X-axis direction and the Y-axis direction.

According to such a configuration, the wavelength conversion sheet 120 is supported by the frame portion 116a of the frame 116 from the rear side and the positioning projections 31 of the color exhibit member 130 partially projecting from the peripheral edge of the wavelength conversion sheet 120 are in contact with the positioning member 32 of the frame 116. Thus, the wavelength conversion sheet 120 is correctly positioned. Namely, the wavelength conversion sheet 120 is positioned by using the color exhibit member 130 that is mounted on at least a part of the peripheral portion of the wavelength conversion sheet 120 and therefore, the wavelength conversion sheet 120 does not necessarily include a specific positioning structure. If a positioning member is mounted on the wavelength conversion sheet, a wavelength conversion sheet having a specific outer shape with projections is necessarily prepared. However, according to this embodiment, such a wavelength conversion sheet having the specific outer shape is not necessarily used. Therefore, in this embodiment, a general wavelength conversion sheet having a square outer shape without having partial projections can be used and this configuration is preferable for reducing a cost.

As described before, according to this embodiment, the frame (a support member) 116 includes the positioning member 32 that positions the wavelength conversion sheet 120 and the frame 116 supports the wavelength conversion sheet 120. The color exhibit member 130 includes the positioning projections 31 that project partially from the peripheral edge of the wavelength conversion sheet 120 and are in contact with the positioning member 32. According to such a configuration, the wavelength conversion sheet 120 is supported by the frame 116 and the positioning projections 31 of the color exhibit member 130 projecting partially from the peripheral edge of the wavelength conversion sheet 120 are in contact with the positioning member 32 of the frame 116 and thus, the wavelength conversion sheet 120 is correctly positioned. Namely, the wavelength conversion sheet 120 is correctly positioned with using the color exhibit member that is mounted on at least a part of the peripheral portion of the wavelength conversion sheet 120 and therefore, the wavelength conversion sheet 120 does not necessarily include a specific positioning configuration. Accordingly, a general wavelength conversion sheet 120 can be used and this configuration is preferable for reducing a cost.

Third Embodiment

A third embodiment of the present invention will be described with reference to FIGS. 11 to 15. In the third embodiment, a backlight device 212 differs from that in the first embodiment and the backlight device 212 is a direct-type backlight device. Configurations, operations, and effects similar to those of the first embodiment will not be described.

Figure 11:
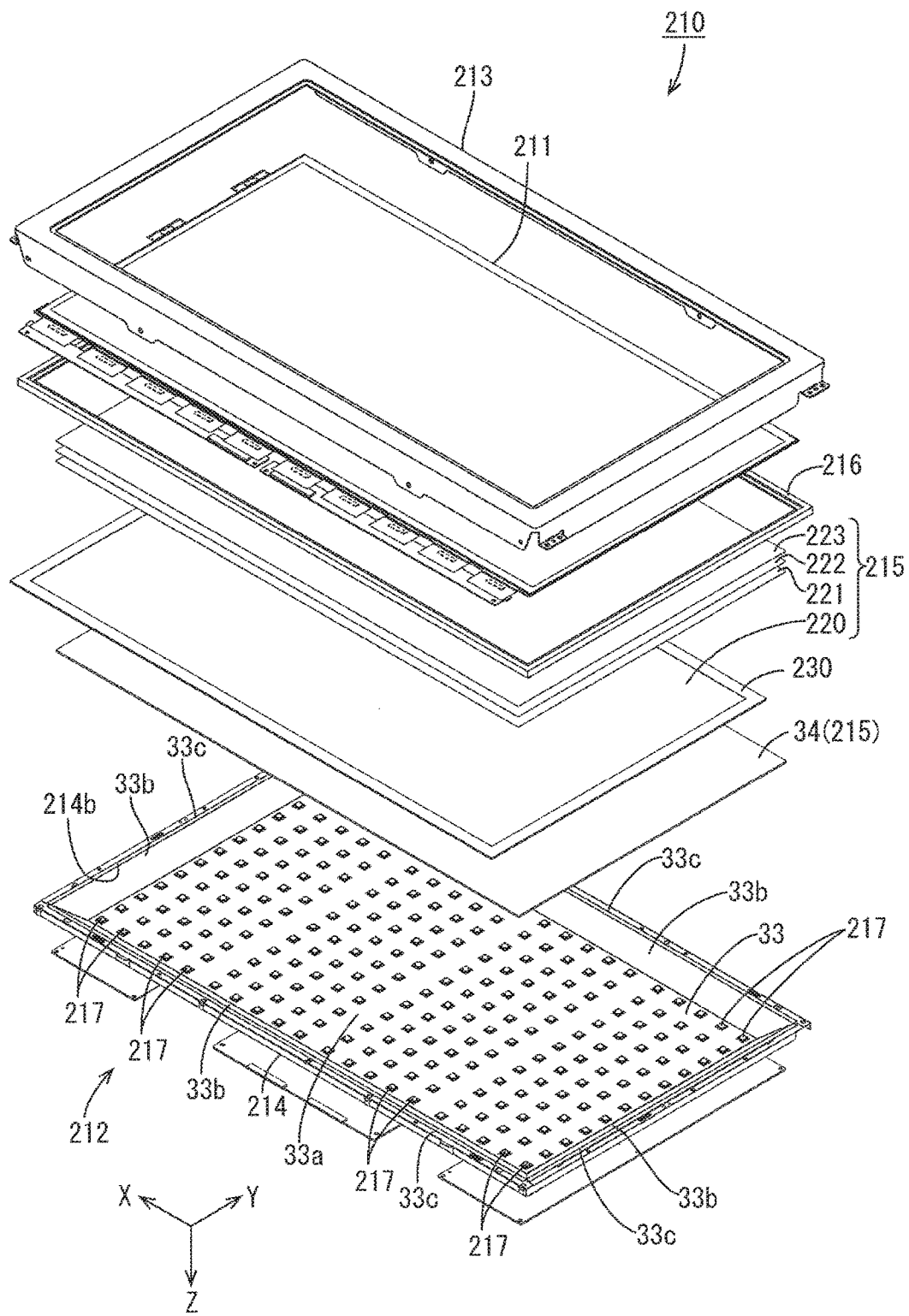
FIG. 11 is an exploded perspective view illustrating a general configuration of a liquid crystal display device according to a third embodiment of the present invention.

As illustrated in FIG. 11, a liquid crystal display device 210 according to this embodiment includes a liquid crystal panel 211 and a direct-type backlight device 212 that are integrally provided with a bezel 213. A configuration of the liquid crystal panel 211 is similar to that of the first embodiment and a same configuration will not be described. The configuration of the direct-type backlight device 212 will be described.

Figure 12:
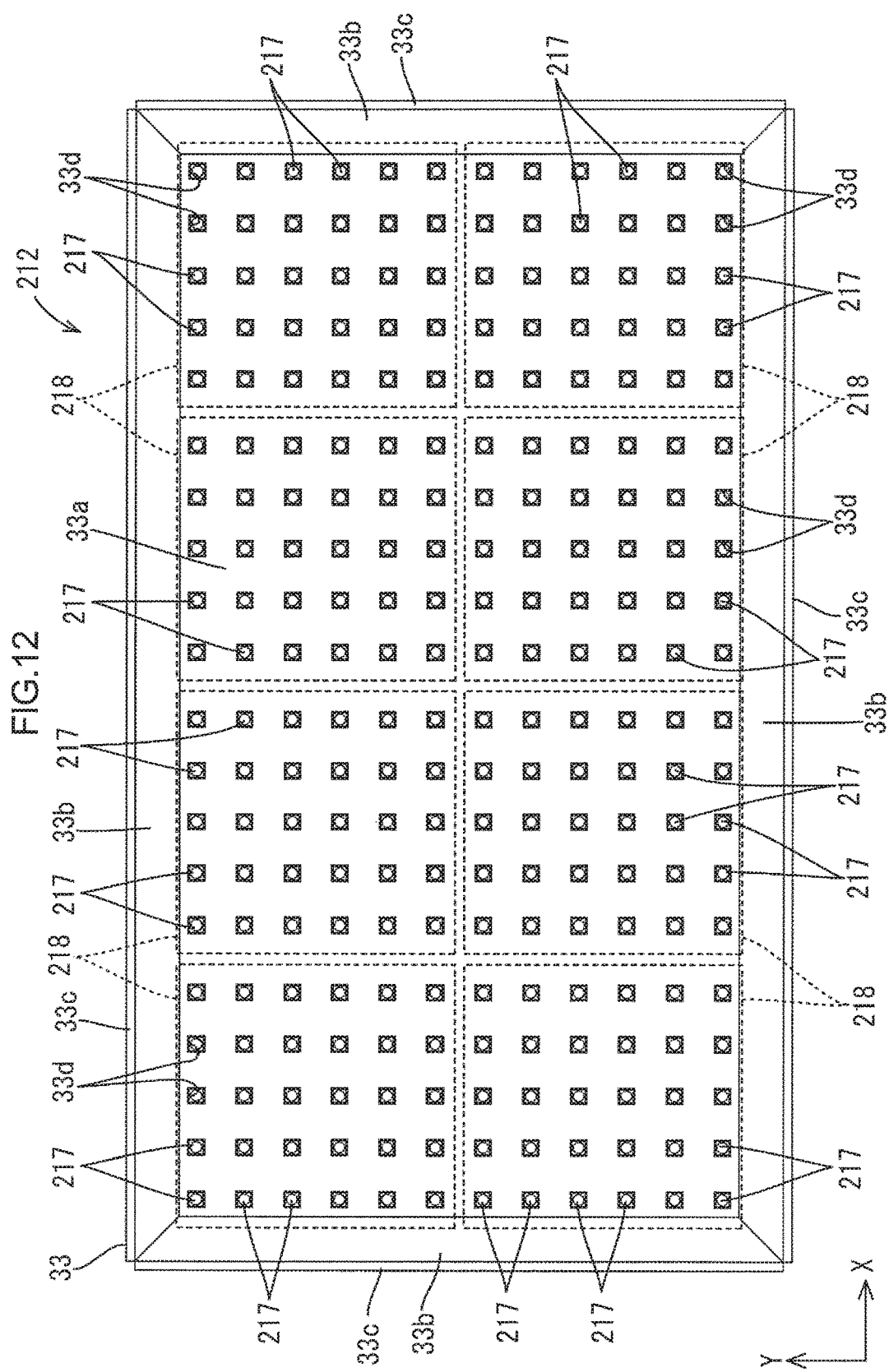
FIG. 12 is a plan view illustrating a backlight device included in the liquid crystal display device.

As illustrated in FIG. 12, the backlight device 212 includes a chassis 214, an optical member 215, and a frame 216. The chassis 214 has a substantially box-shape and has alight exit portion 214b that is open toward the light exit side (a liquid crystal panel 211 side). The light exit portion 214b of the chassis 214 is covered with the optical member 215. The frame 216 extends along an outer edge portion of the chassis 214 and holds an outer edge portion of the optical member 215 between the frame 216 and the chassis 214. LEDs 217 are arranged within the chassis 14 directly below the optical member 215 (the liquid crystal panel 211) to be opposite the optical member 215 and an LED board 218 where the LEDs 217 are mounted is arranged within the chassis 214. A reflection sheet 33 that reflects light within the chassis 214 is arranged in the chassis 214. The backlight device 212 according to this embodiment is a direct-type backlight device and does not include the light guide plate 19 included in the edge-light type backlight device 12 (see FIG. 4). The frame 216 has a configuration different from that of the first embodiment in that the first reflection sheet 24 (see FIG. 4) is not included. Hereinafter, components of the backlight devices 212 will be described.

Figure 13:
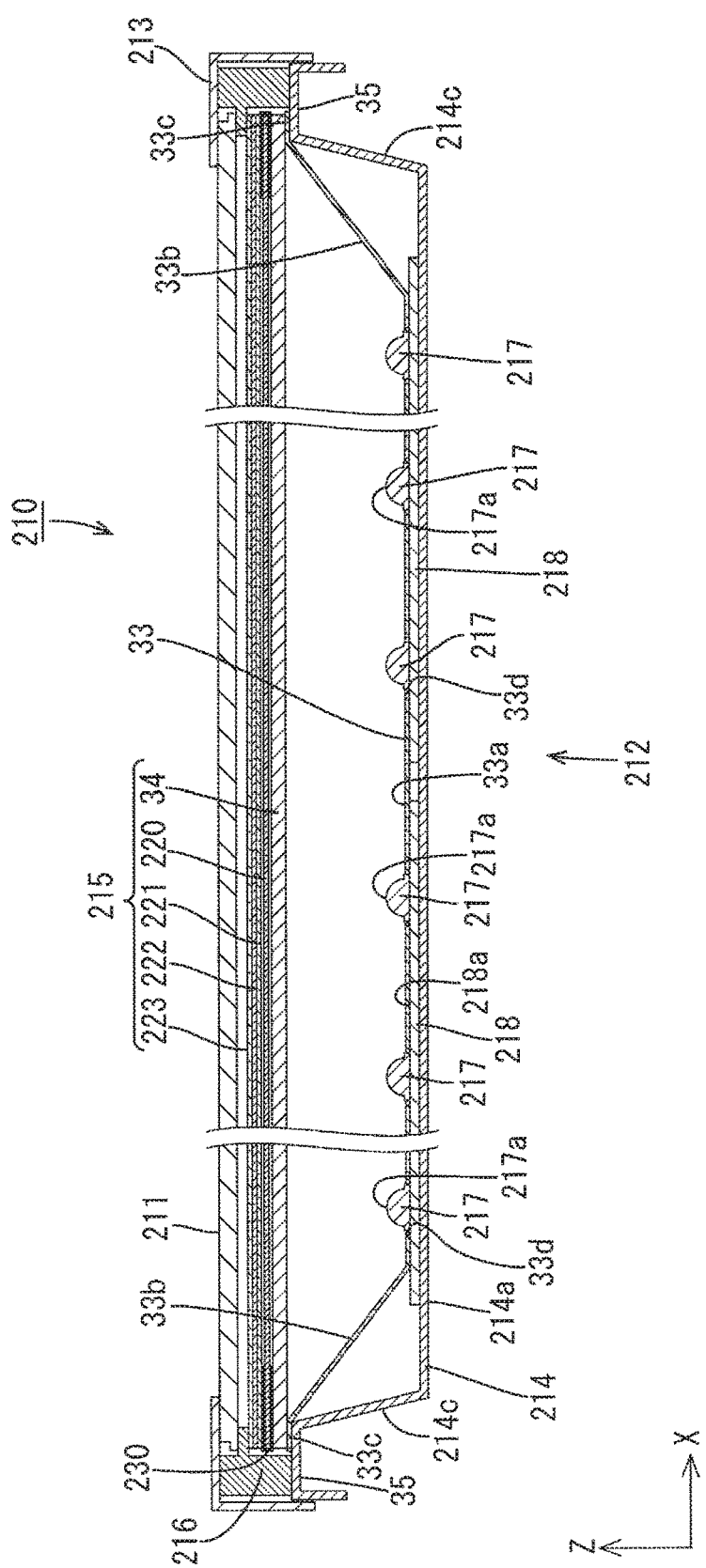
FIG. 13 is a cross-sectional view illustrating a cross-sectional configuration taken in a long-side direction of the liquid crystal display device.
Figure 14:
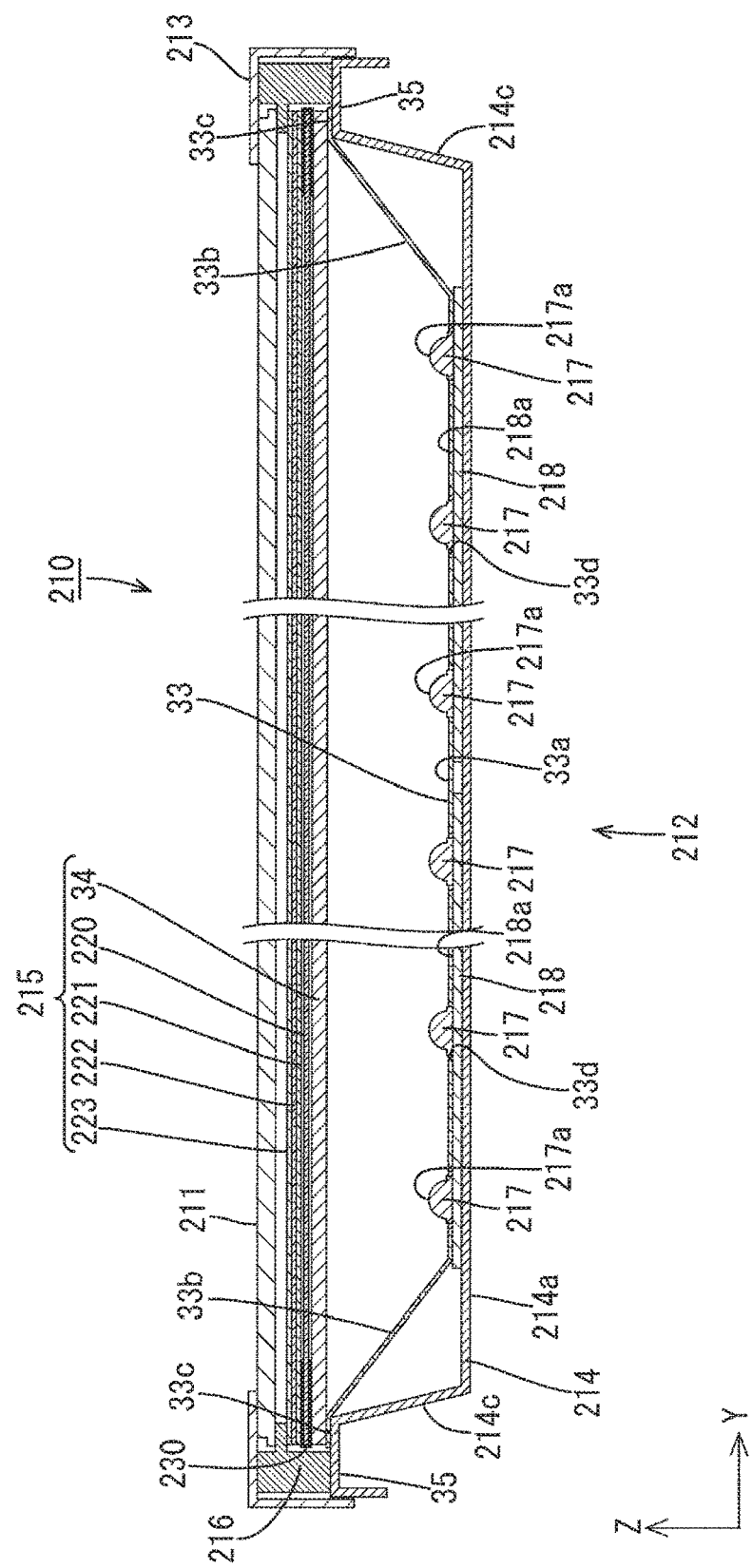
FIG. 14 is a cross-sectional view illustrating a cross-sectional configuration taken in a short-side direction of the liquid crystal display device.

The chassis 214 is made of metal. As illustrated in FIGS. 12 to 14, the chassis 214 includes a bottom portion 214a that has an elongated rectangular plan view shape similar to that of the liquid crystal panel 211, side plates 214c each of which extends from an outer edge of each side of the bottom portion 214a toward the front side (the light exit side), and a receiver portion 35 that extends outwardly from an extended end of each of the side plates 214c. The chassis 214 has substantially a shallow box shape that opens frontward. In the chassis 214, a long-side direction matches the X-axis direction and a short-side direction matches the Y-axis direction (the vertical direction). The frame 216 and the optical member 215 can be placed on each of the receiver portions 35 of the chassis 214 from the front side. The frame 216 is fixed on each of the receiver portions 35.

As illustrated in FIGS. 13 and 14, the optical member 215 includes a diffuser plate 34 in addition to a wavelength conversion sheet 220, a micro lens sheet 221, a prism sheet 222, and a reflective-type polarizing sheet 223 as described in the first embodiment. The diffuser plate 34 has a plate thickness greater than that of each of the optical members 220 to 223 and is disposed on the outermost side on the rear side, that is, closest to the LEDs 217. The diffuser plate 34 is arranged such that peripheral edge portion thereof is directly disposed on the receiver portion 35 of the chassis 214.

Next, the LED board 218 where the LEDs 217 are mounted will be described. As illustrated in FIGS. 12 to 14, the LED board 218 has a vertically elongated rectangular shape (a square shape, a rectangular shape) and is arranged in the chassis 214 along the bottom portion 214a such that a long-side direction thereof matches the Y-axis direction and a short-side direction hereof matches the X-axis direction. The above-structured LEDs 217 are surface-mounted on a plate surface of the LED board 18 facing the front side (the plate surface facing the optical member 215), and the plate surface is the mounting surface 218a. The LEDs 217 are arranged in rows and columns (in a matrix) within a plane surface area of the mounting surface 218a of the LED board 218 and are electrically connected to each other through tracing patterns formed within the plane surface area of the mounting surface 218a. Specifically, on the mounting surface 218a of the LED board 218, five (a relatively small number of) LEDs 217 are arranged in the short-side direction (the X-axis direction) and six (a relatively great number of) LEDs 217 are arranged in the long-side direction (the Y-axis direction). Thus, the LEDs 217 are arranged in rows and columns. Intervals between the LEDs 217 on the LED board 218 are substantially same and specifically, the LEDs 217 are arranged at equal intervals in the X-axis direction (a row direction) and in the Y-axis direction (a column direction).

As illustrated in FIG. 12, the LED boards 218 each having the above structure are arranged in the X-axis direction and the Y-axis direction within the chassis 214 such that the short sides thereof are aligned with each other and the long sides thereof are aligned with each other. Specifically, four (a relatively great number of) LED boards 218 are arranged in the X-axis direction and two (a relatively small number of) LED boards 218 are arranged in the Y-axis direction within the chassis 214. The arrangement directions of the LED boards 218 match the X-axis direction and the Y-axis direction, respectively. The LED boards 218 are arranged at equal intervals in the X-axis direction and the Y-axis direction. The LEDs 217 are arranged at equal intervals in a matrix with respect to the X-axis direction (the row direction) and the Y-axis direction (the column direction) in a plane surface of the bottom portion 214a of the chassis 214. Specifically, twenty LEDs 217 are arranged in the long-side direction (the X-axis direction) and twelve LEDs 217 are arranged in the short-side direction (the Y-axis direction) in a matrix in a plane surface of the bottom portion 214a of the chassis 214. The optical member 215 is disposed to cover the light exit portion 214b of the chassis 214 and is opposite light emission surfaces 217a of all the LEDs 217 with having a certain distance therebetween. Each of the LED boards 218 includes a connector portion to which traces (not illustrated) are connected and driving power is supplied from an LED driving board (a light source driving board), which is not illustrated, to each of the LED boards 218 through the traces.

The reflection sheet 33 is made of synthetic resin and has a white surface having good light reflectivity. As illustrated in FIGS. 11 to 14, the reflection sheet 33 has a size that covers a substantially entire area of an inner surface of the chassis 214 or that collectively covers all the LED boards 218 that are planarly arranged along the bottom portion 214a. The reflection sheet 33 reflects light rays within the chassis 214 toward the front side (the light exit side, the optical member 215 side). The reflection sheet 33 has a substantially shallow box shape as a whole and includes a bottom reflection portion 33a, four extended reflection portions 33b, and outer extended portions (outer edge portions) 33c. The bottom reflection portion 33a extends along the LED boards 218 and the bottom portion 214a and has a size that collectively covers a substantially entire area of the LED boards 218. Each of the extended reflection portions 33b extends from each of outer edges of the bottom reflection portion 33a toward the front side to be inclined with respect to the bottom refection portion 33a. Each of the outer extended portions 33c extends outwardly from an outer end of each extended reflection portion 33b and is placed on each of the receiver portions 35 of the chassis 214.

As illustrated in FIGS. 12 to 14, the reflection sheet 33 is placed on the front surfaces of the LED boards 218 such that the bottom reflection portion 33a overlaps the mounting surfaces 218a of the LED boards 218 on the front side. Since the bottom reflection portion 33a extends parallel to plate surfaces of the bottom portion 213a of the chassis 214 and the optical member 215, a distance between the bottom reflection portion 33a and the optical member 215 with respect to the Z-axis direction is substantially constant over an entire surface area. The bottom reflection portion 33a of the reflection sheet 33 has LED insertion holes (light source insertion holes) 33d at positions overlapping the LEDs 217 in a plan view such that each of the LEDs 217 is separately inserted through each LED insertion hole 33d. The LED insertion holes 33d are arranged in a matrix with respect to the X-axis direction and the Y-axis direction corresponding to the arrangement of the LEDs 217. Thus, the bottom reflection portion 33a is overlapped with the LEDs 217 in the plan view and is an LED arrangement area (a light source arrangement area) in the reflection sheet 33. Each of the extended reflection portions 33b is inclined with respect to plate surfaces of the bottom reflection portion 33a and the optical member 215 so as to extend straight from an extending basal end to an extending distal end thereof. According to such a configuration, a distance between the extended reflection portion 33b and the optical member 215 with respect to the Z-axis direction is continuously and gradually decreased as is closer to the extending distal end from the extending basal end and is greatest (is substantially equal to a distance between the bottom reflection portion 33a and the optical member 215 with respect to the Z-axis direction) at the extending basal end and smallest at the extending distal end. Each extended reflection portion 33b is not overlapped with the LEDs 217 and is an LED non-arrangement area (a light source non-arrangement area) of the reflection sheet 33.

As illustrated in FIGS. 13 and 14, in the direct-type backlight device 212 in this embodiment, some of light rays reflecting off the reflection sheet 33 are not converted to light rays with other wavelengths by the plate surface wavelength converting sheet 220 and such light rays may not be included in exiting light from the backlight device 212. The light rays may be retroreflected and returned to the reflection sheet 33, and then included in the exiting light from the backlight device 212. The number of times at which the retroreflected light rays are reflected tends to be greater in the outer portion than the center portion of the reflection sheet 33 having a substantially shallow box shape, since the outer portion of the reflection sheet 33 has a light path shorter than that of the center portion. Namely, the number of times at which the retroreflected light rays pass through the wavelength conversion sheet 220 tends to be greater in the outer portion than the center portion. Therefore, the retroreflected light rays are more likely to be converted to light rays with other wavelengths by the wavelength conversion sheet 220. The color of the retroreflected light rays reflecting off the peripheral portion of the reflection sheet 33 is closer to the color of the light rays converted through the wavelength conversion sheet 220 with wavelength conversion, that is, yellow in comparison to the retroreflected light rays reflecting off the center portion of the reflection sheet 33. The density of the LEDs 217 is higher in the center portion in the backlight device 212 than the peripheral portion. Therefore, the amount of blue light rays emitted by the LEDs 217 (the primary light rays) in the backlight device 212 tends to be greater in the middle portion and smaller in the peripheral portion. Therefore, the color of the light rays in the peripheral portion of the backlight device 212 tends to be yellowish. Namely, the color of the light exiting from the peripheral portion of the backlight device 212 and the color of the light exiting from the center portion of the backlight device 212 tend to be different.

As illustrated in FIGS. 13 and 14, in the backlight device 212 according to this embodiment, a color exhibit member 230 is disposed on at least a part of a peripheral portion of the wavelength conversion sheet 220. The color exhibit member 230 exhibits a color that makes a complementary color pair with light rays converted by the phosphors contained in the wavelength conversion sheet 220 with wavelength conversion or a similar color to the color that makes the complementary color pair. According to such a configuration, the color exhibiting effects are exerted by the color exhibit member 230 that is disposed on at least the peripheral portion of the wavelength conversion sheet 220 on the retroreflected light rays at a greater number of times of retrorefelction that are in the peripheral portion of the backlight device 212 to be tinged with the color that makes a complementary color pair with light rays converted by the phosphors contained in the wavelength conversion sheet 220 with wavelength conversion or a similar color to the color that makes the complementary color pair. Accordingly, difference in color between the light exiting from the center portion of the backlight device 212 and the light exiting from the peripheral portion of the backlight device 212 is less likely to occur even if the amount of the light rays emitted by the LEDs 217 (the primary light rays) is smaller in the peripheral portion of the backlight device 212 than in the center portion thereof. This configuration is preferable for reducing the color unevenness.

Specifically, the color exhibit member 230 preferably exhibits blue that makes a complementary color pair with yellow light that is green light rays and red light rays obtained with wavelength conversion by the green phosphors and the red phosphors contained in the wavelength conversion sheet 220. The color exhibited by the color exhibit member 230 is not necessarily blue but may be a similar color to blue, for example, blue tinged with green (cyan) or blue tinged with red (magenta). The "similar color" in this specification is referred to as "a color that is next to or close to a specific color (blue in this embodiment) on the color wheel". The color exhibit member 230 includes a metal thin film (such as an aluminum thin film) and coating material (including pigment or dye) that exhibits blue or a similar color to blue is applied on a surface of the metal thin film with coating. The coating material contained in the color exhibit member 230 and exhibiting blue or the similar color to blue has an absorption rate of yellow light rays that are converted through the wavelength conversion sheet 220, that is, a color that makes a complementary color pair with light rays emitted by the LEDs 217 (the primary light rays), and the absorption rate of yellow light rays is relatively higher than an absorption rate of blue light or light of the similar color to blue that are converted through the wavelength conversion sheet 220. The "complementary color" in this specification is referred to as "a color that is opposite from a specific color on the color wheel" and may be referred to as "an opposite color". The "yellow light" in this specification include light rays in a wavelength range of yellow light (about 570 nm to about 600 nm) and also include combined light rays of green light rays in a wavelength range of green light (green light rays exiting the green phosphors) and red light rays in a wavelength range of red (red light rays exiting the red phosphors). The color exhibit member 230 absorbs a relatively great amount of blue light rays and exits a relatively great amount of blue light rays or light rays of the similar color to blue. Thus, the color exhibit member 230 has a function for selectively absorbing light rays with certain wavelength and tinges the light rays with blue.

As illustrated in FIG. 11, the color exhibit member 230 extends along an entire periphery of the peripheral portion of the wavelength conversion sheet 220 and has a horizontally elongated plan view frame shape that is similar to that of the wavelength conversion sheet 220. Namely, the color exhibit member 230 is mounted on the peripheral portion of the wavelength conversion sheet 220 to extend along the four extended reflection portions 33b of the reflection sheet 33. Accordingly, color exhibiting effects are exerted by the color exhibit member 230 on the yellowish light rays due to the multi reflection between the extended reflection portions 33b and the optical member 215 to be tinged with blue or the similar color to blue. Thus, the color exhibiting effects are exerted on the yellowish light rays at a greater number of retroreflection that are in the peripheral portion of the backlight device 212 by the color exhibit member 230 and the color exhibiting effects are exerted evenly over an entire periphery of the backlight device 212. Therefore, this configuration is preferable for reducing the color unevenness. The color exhibit member 230 is disposed to collectively hold peripheral edge portions of the wavelength conversion layer and the protection layers of the wavelength conversion sheet 220 similarly to the first embodiment such that an entire periphery of the wavelength conversion layer is sealed with the color exhibit member 230 (see FIG. 8).

Figure 15:
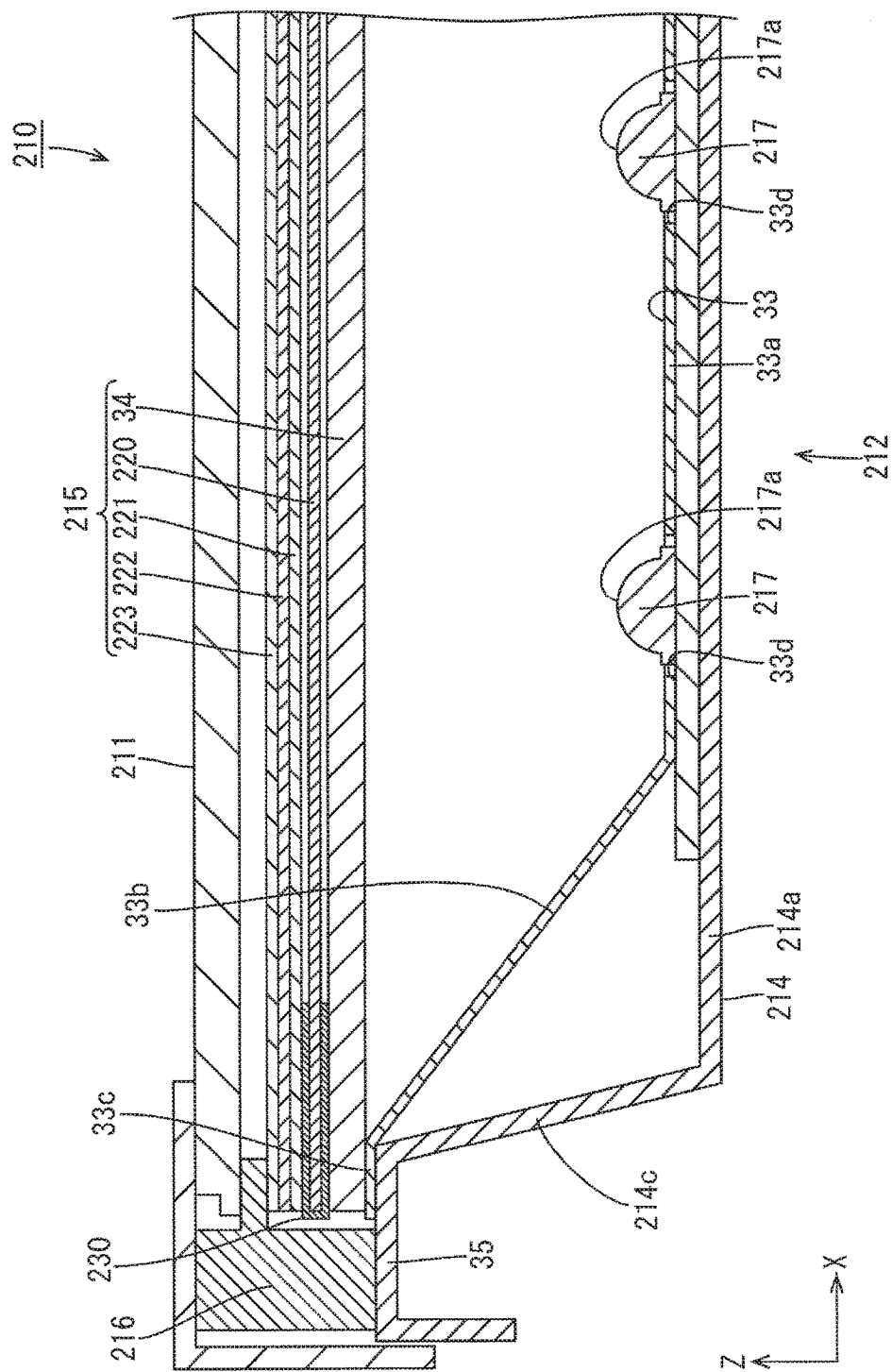
FIG. 15 is a magnified cross-sectional view illustrating an edge portion of the liquid crystal display device.

As illustrated in FIG. 15, the color exhibit member 230 is disposed to overlap the extended reflection portions 33b of the reflection sheet 33. Specifically, the color exhibit member 30 overlaps portions of the wavelength conversion sheet 220 overlapping the extended reflection portions 33b and the outer extended portions 33c in the plan view. The color exhibit member 230 overlaps an entire area of each of the outer extended portions 33c that are peripheral edge portions of the reflection sheet 33 and overlaps the outer portion of each of the extended reflection portions 33b that is on an inner side than the outer extended portions 33c, specifically, an extending distal end portion of the extended reflection portion 33b. According to such a configuration, the color exhibiting effects are effectively exerted by the color exhibit member 230 on the light rays reflecting off the extended reflection portions 33b and the outer extended portions 33c toward the front side, that is, toward the wavelength conversion sheet 220. Therefore, this configuration is preferable for reducing the color unevenness.

Next, functions of this embodiment having the above configuration will be described. When the liquid crystal display device 210 having the configuration described above is turned on, the driving of the liquid crystal panel 211 is controlled by the panel controller circuit on the control circuit board, which is not illustrated. The LED driver circuit on the LED driver circuit board, which is not illustrated, supplies driving power to the LEDs 217 on the LED boards 218 to control the driving of the LEDs 217. As illustrated in FIGS. 13 and 14, the light from the LEDs 217 that are lighted are directly supplied to the optical member 215 or reflected by the reflection sheet 33 and indirectly supplied to the optical member 215. Predefined optical effects are exerted on the light rays through the optical member 215 and the light rays are supplied to the liquid crystal panel 211 to be used for displaying images in the display area of the liquid crystal panel 211. Functions of the backlight device 212 will be described in detail.

As illustrated in FIGS. 13 and 14, after the diffusing effects are exerted on the blue light rays emitted by the LEDs 217 (the primary light rays) through the diffuser plate 34 included in the optical member 215, some of the light rays are converted into the green light rays and the red light rays (the secondary light rays) through the wavelength conversion sheet 220. With the green light rays and the red light rays obtained through the wavelength conversion (the secondary light rays) and the blue light rays from the LEDs 217 (the primary light rays), light rays in substantially white are obtained. Light collecting effects are isotropically exerted on the blue light rays (the primary light) from the LEDs 217 and the green light rays and the red light rays obtained through the wavelength conversion (the secondary light) with respect to the X-axis direction and the Y-axis direction (isotropic light collecting effects) by the micro lens sheet 221. Then, light collecting effects are selectively exerted on the light rays with respect to the Y-axis direction by the prism sheet 222 (anisotropic light collecting effects). The light rays exiting from the prism sheet 222 to the reflective type polarizing sheet 223 and specific polarized light rays (p-wave) are selectively passed to exit toward the liquid crystal panel 211. Different specific polarized light rays (s-wave) are selectively reflected to the rear side. The s-wave reflected by the reflective type polarizing sheet 223 or the light rays reflected to the rear side without light collecting effects by the prism sheet 222 or the micro lens sheet 221 are reflected by the reflection sheet 33 again and directed toward the front side.

Next, optical effects of the reflection sheet 33 and the color exhibit member 230 will be described in detail. As illustrated in FIGS. 13 and 14, the blue light rays emitted by the LEDs 217 (the primary light rays) and the light rays returned to the rear side by the optical member 215 (the primary light rays and the secondary light rays) are reflected toward the front side by the bottom reflection portion 33*a* and the extended reflection portions 33*b*. A light path length by which the light rays reflecting off the bottom reflection portion 33*a* reach the optical member 215 is longer than a light path length by which the light rays reflecting off the extended reflection portion 33*b* reach the optical member 215. The light path between the extended reflection portion 33*b* and the optical member 215 tends to be continuously and gradually decreased as is closer to the extending distal end from the extending basal end of the extended reflection portion 33*b*. The number of times at which the reflected light rays reflected by the extended reflection portion 33*b* are reflected repeatedly between the extended reflection portion 33*b* and the optical member 215 is relatively greater than the number of times at which the reflected light rays reflected by the bottom reflection portion 33*a* are reflected repeatedly between the bottom reflection portion 33*a* and the optical member 215. Accordingly, the number of times at which the reflected light rays reflecting off the extended reflection portion 33*b* pass through the wavelength conversion sheet 220 tends to be greater than the number of times at which the reflected light rays reflecting off the bottom reflection portion 33*a*, and the reflected light rays reflecting off the extended reflection portion 33*b* are likely to be yellowish. The amount of blue light rays that are emitted by the LEDs 217 (the primary light rays) and within the chassis 214 is greater in the LED arrangement area near the bottom reflection portion 33*a* and smaller in the LED non-arrangement area near the extended reflection portions 33*b*.

As illustrated in FIGS. 13 and 14, in the backlight device 212 according to this embodiment, the color exhibit member 230 that is disposed on the peripheral portion of the wavelength conversion sheet 220 exhibits blue or similar color to blue that makes a complementary color pair with a color of the light rays that are converted by the phosphors contained in the wavelength conversion sheet 220 with the wavelength conversion (the secondary light rays). Therefore, the yellowish retroreflected light rays at a greater number of times of retrorefelction that are in the peripheral portion of the backlight device 212 are tinged to exhibit blue or similar color to blue by the color exhibit member 230. Specifically, in the color exhibit member 230, an absorption rate of yellow light rays that are converted by the phosphors through the wavelength conversion sheet 220 is higher than an absorption rate of light rays of blue that is a same color as that of the light rays emitted by the LEDs 217 (the primary light rays) or a similar color to blue. Therefore, the color exhibit member 230 absorbs a greater amount of yellow light rays among the retroreflected light rays at a greater number of times of retrorefelction that are in the peripheral portion of the backlight device 212 and exits a greater amount of blue light rays. Thus, the color exhibiting effects are exerted on the yellowish light rays by the color exhibit member 230 such that the yellowish light rays are tinged with blue or a similar color to blue and the color of the light rays is close to white. Accordingly, the light rays exiting from the peripheral portion of the backlight device 212 are less likely to be yellowish and likely to be a color similar to that of the exit light rays exiting the center portion of the backlight device 212 (substantially white light), even if the amount of the light rays emitted by the LEDs 217 (the primary light rays) is smaller in the peripheral portion of the backlight device 212 that is the LED non-arrangement area (near the extended reflection portions 33*b*) than in the center portion thereof (near the bottom reflection portion 33*a*). This configuration is preferable for reducing the color unevenness. Accordingly, the difference in color is less likely to be caused between the center portion of the backlight device 212 and the peripheral portion thereof and the color unevenness is less likely to be caused in the exit light rays.

As illustrated in FIG. 11, the color exhibit member 230 extends along an entire periphery of the peripheral portion of the wavelength conversion sheet 220 and therefore, the color exhibiting effects are evenly exerted on the light rays in the peripheral portion of the backlight device 212. Therefore, this configuration is preferable for reducing the color unevenness. The color exhibit member 230 extending over an entire periphery of the peripheral portion of the wavelength conversion sheet 220 is disposed to collectively hold peripheral edge portions of the wavelength conversion layer and the protection layers of the wavelength conversion sheet 220. Therefore, an entire periphery of the wavelength conversion layer is sealed with the color exhibit member 230 and the phosphors contained in the wavelength conversion layer are less likely to be deteriorated due to moisture absorption (see FIG. 8). Further, as illustrated in FIG. 15, the color exhibit member 320 is disposed to overlap each extended reflection portion 33*b* of the reflection sheet 33 and therefore, the color exhibiting effects are effectively exerted by the color exhibit member 320 on the reflected light rays reflected by the extended reflection portions 33*b* toward the front side, that is, toward the wavelength conversion sheet 220. This configuration is preferable for reducing the color unevenness.

As described before, this embodiment includes the LEDs 217, the chassis 214, the wavelength conversion sheet 220, the reflection sheet (the reflecting member) 33, and the color exhibit member 230. The chassis 214 includes the bottom portion 214a that is opposite from the light emission surfaces 217a of the LEDs 217 with respect to the LEDs 217 and the LEDs 217 are arranged in the chassis 214. The wavelength conversion sheet 220 is disposed opposite the light emission surfaces 217a of the LEDs 217 and away from the light emission surfaces 217a on the light exit side. The wavelength conversion sheet 220 contains the phosphors that convert the light rays from the LEDs 217 to the light rays with other wavelengths. The reflection sheet (the reflecting member) 33 is configured to reflect the light rays from the LEDs 217 toward the wavelength conversion sheet 220. The reflection sheet 33 includes at least the bottom reflection portion 33a disposed along the bottom portion 214a and the extended reflection portions 33b extending from the bottom reflection portion 33a toward the wavelength conversion sheet 220. The color exhibit member 230 is disposed on at least a part of the peripheral portion of the wavelength conversion sheet 220 and configured to exhibit a color that makes a complementary color pair with a color or a similar color of light that is converted by the phosphors through the wavelength conversion sheet 220 with wavelength conversion.

Accordingly, the light rays emitted by the LEDs 217 are reflected by the bottom reflection portion 33a and the extended reflection portions 33b included in the reflection sheet 33 and converted by the phosphors with wavelength conversion through the wavelength conversion sheet 220 that is disposed opposite the light emission surfaces 217a of the LEDs 217 and away from the light emission surfaces 217a on the light exit side. Some of the light rays transmitting through the wavelength conversion sheet 220 may not be included in exiting light from the backlight device 212. The light rays may be retroreflected and returned to the reflection sheet 33, and then included in the exiting light from the backlight device 212. The number of times at which the retroreflected light rays are reflected tends to be greater in the peripheral portion of the backlight device 212 including the extended reflection portions 33b than in the center portion thereof including the bottom reflection portion 33 of the reflection sheet 33, namely, the number of times at which the retroreflected light rays pass through the wavelength conversion sheet 220 tends to be greater. Therefore, the retroreflected light rays are likely to transmit through the wavelength conversion sheet 220 and also likely to be converted to light rays with other wavelengths by the wavelength conversion sheet 220. The amount of rays of light that are emitted by the LEDs 217 and within the chassis 214 tends to be greater in the center portion and smaller in the peripheral portion.

Specifically, the color exhibit member 230 is disposed on at least a part of the peripheral portion of the wavelength conversion sheet 220. The color exhibit member 230 exhibits a color that makes a complementary color pair with a color that is converted to light rays with another wavelengths by the phosphors contained in the wavelength conversion sheet 220 or a similar color to the complementary color pair. Therefore, the color exhibiting effects are exerted by the color exhibit member 230 on the retroreflected light rays at a greater number of retroreflection times that are in the peripheral portion of the backlight device 212 to be tinged with a color or similar color that makes a complementary color pair with a color of the light rays that are converted by the phosphors through the wavelength conversion sheet 220. Accordingly, the difference in color is less likely to be caused between the center portion of the backlight device 212 and the peripheral portion thereof, even if the amount of light rays emitted by the LEDs 217 is smaller in the peripheral portion of the backlight device 212 than in the center portion thereof. Therefore, the color unevenness is preferably reduced.

The color exhibit member 30 has a higher absorption rate of the light having a color same as or similar to the color of light that is converted by the phosphors through the wavelength conversion sheet 20 than an absorption rate of the light of a color same as or similar to the color that makes a complementary color pair with a color of the light that is converted by the phosphors through the wavelength conversion sheet 20. Accordingly, among the retroreflected light rays at a greater number of times of retrorefelction that are in the peripheral portion of the backlight device 212, a relatively greater amount of light rays having a color same as or similar to the color of the light that is converted by the phosphors through the wavelength conversion sheet 220 is absorbed by the color exhibit member 230 than that of the light rays of a color or similar color that makes a complementary color pair with a color of the light rays that are converted by the phosphors through the wavelength conversion sheet 220. Therefore, the color exhibiting effects are exerted by the color exhibit member 230 on the retroreflected light rays at a greater number of times of retrorefelction that are in the peripheral portion of the backlight device 212 to have the color or similar color that makes a complementary color pair with the color of the light rays converted by the phosphors contained in the wavelength conversion sheet 220.

The LEDs 217 are configured to emit blue light and the wavelength conversion sheet 220 contains at least the green phosphors and the red phosphors, or the yellow phosphors as the phosphors. The green phosphors convert the blue light into the green light with wavelength conversion and the red phosphors convert the blue light into the red light with wavelength conversion. The yellow phosphors convert the blue light into the yellow light with wavelength conversion. The color exhibit member 230 is configured to exhibit blue or a similar color to blue. According to such a configuration, the blue light emitted by the LEDs 217 is converted into the green light and the red light through the wavelength conversion sheet 220 containing the green phosphors and the red phosphors, and converted into the yellow light through the wavelength conversion sheet 220 containing the yellow phosphors with wavelength conversion. The retroreflected light rays at a greater number of times of retrorefelction that are in the peripheral portion of the backlight device 212 include a great amount of the light rays having a color or similar color that makes a complementary color pair with the blue light rays emitted by the LEDs 217. Therefore, if the great amount of such light rays is included in the exit light rays exiting the backlight device 212, the exit light rays may be more yellowish in the peripheral portion than in the center portion. The color exhibiting effects are exerted by the color exhibit member 230 on the retroreflected light rays at a smaller number of times of retrorefelction that are in the peripheral portion of the backlight device 212 to have the color or similar color that makes a complementary color pair with the color of the light rays converted by the phosphors contained in the wavelength conversion sheet 220, that is, blue or similar color to blue. Therefore, the ratio of the amount of the yellow light rays or the light rays of a similar color to yellow to the amount of the exit light rays exiting the peripheral portion of the backlight device 212 is reduced and the color unevenness is preferably reduced.

The color exhibit member 230 is overlapped with the extended reflection portions 33b. According to such a configuration, the color exhibit member 230 that is disposed at least a part of the peripheral portion of the wavelength conversion sheet 220 is overlapped with the extended reflection portion 33b of the reflection sheet 33. Therefore, the color exhibiting effects are exerted on the light rays reflecting off the extended reflection portions 33b toward the wavelength conversion sheet 220 effectively by the color exhibit member 230. This configuration is preferable for reducing the color unevenness.

Fourth Embodiment

A fourth embodiment of the present invention will be described with reference to FIGS. 16 and 17. In the fourth embodiment, LEDs 317, a wavelength conversion sheet 320, and a color exhibit member 330 differ from those in the first embodiment. Configurations, operations, and effects similar to those of the first embodiment will not be described.

Figure 16:
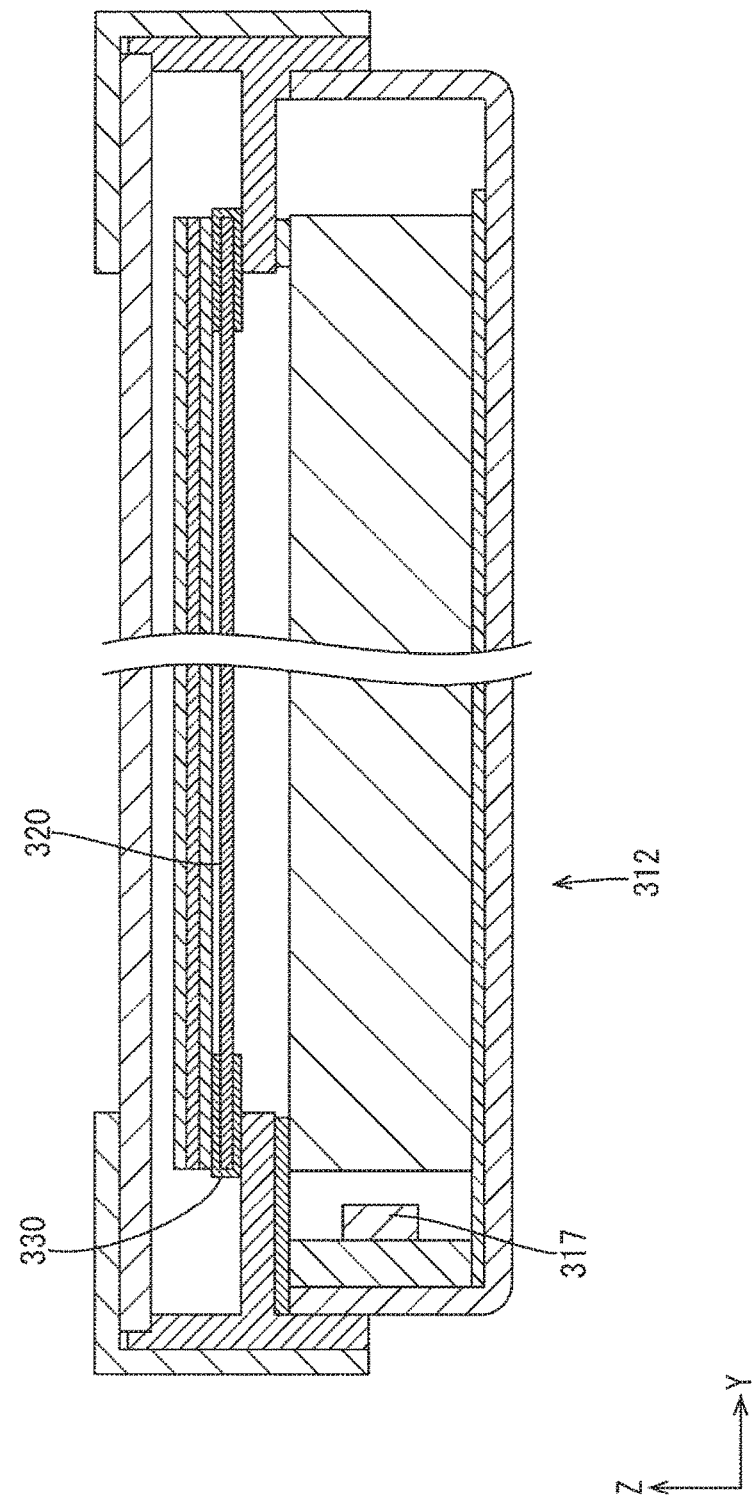
FIG. 16 is a cross-sectional view illustrating a liquid crystal display device according to a fourth embodiment of the present invention and taken in a short-side direction.
Figure 17:
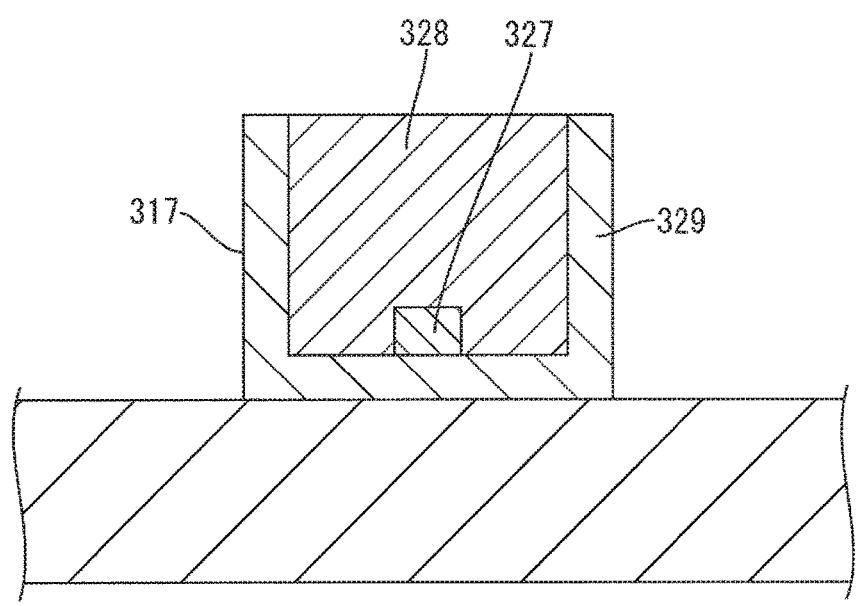
FIG. 17 is a cross-sectional view of an LED and an LED board.

As illustrated in FIGS. 16 and 17, the LEDs 317 are configured to emit magenta light. Specifically, each of the LEDs 317 includes a blue LED component 327 that is a light emitting source and emits blue light, a sealing member 328, and a case 329. The sealing member 328 seals the blue LED component 327. The case 329 holds the blue LED component 327 and the sealing member 328 therein. Red phosphors are dispersedly contained in the sealing member 328 and the red phosphors emit red light (visible light in a specific wavelength range of red light) when excited by the blue light from the blue LED component 327. (Ca, Sr, Ba)$_2$SiO$_5$N$_8$:Eu$^{2+}$, CaAlSiN$_3$:Eu$^{2+}$, or a complex fluoride fluorescent material (e.g., manganese-activated potassium fluorosilicate (K$_2$TiF$_6$)) may be used for the red phosphors contained in the sealing member 328. Some of the blue light rays emitted by the blue LED component 327 are converted to red light rays by the red phosphors contained in the sealing member 328 with the wavelength conversion and therefore, light rays emitted by the LEDs 317 are magenta light rays. The configurations of the blue LED component 327 and the case 329 are same as those in the first embodiment.

As illustrated in FIG. 16, the wavelength conversion sheet 320 includes a wavelength converting layer in which green phosphors are dispersed. The green phosphors emit green light (visible light in a specific wavelength range of green light) when excited by the blue light included in the magenta light from the LEDs 317. Therefore, the wavelength conversion sheet 320 performs the wavelength conversion on a part of the light rays emitted by the LEDs 317 (the magenta light rays, the primary light rays) into secondary light rays (green light rays) which exhibits a color (green) which makes a complementary color pair with the color of light rays emitted by the LEDs 317 (magenta). Thus, according to this embodiment, the magenta light rays emitted by the LEDs 317 and green light rays having converted wavelengths are mixed with additive color mixture such that substantially white light exits the backlight device 312. The wavelength conversion layer of the wavelength conversion sheet 320 includes abase (a phosphor base) made of a substantially transparent synthetic resin film and a phosphor layer containing the green phosphors dispersed therein applied to the base with coating. The green phosphors contained in the wavelength conversion layer are quantum dot phosphors similarly to the first embodiment.

As illustrated in FIG. 16, the color exhibit member 330 disposed on the peripheral portion of the wavelength conversion sheet 320 preferably exhibits green that is a same color as green light rays that are converted with wavelength conversion by the green phosphors contained in the wavelength conversion sheet 320. The color exhibited by the color exhibit member 330 is not necessarily green but may be a similar color to green, for example, green tinged with yellow (yellowish green) or green tinged with blue (cyan). The "similar color" in this specification is referred to as "a color that is next to or close to a specific color (green in this embodiment) on the color wheel". The color exhibit member 330 includes a metal thin film (such as an aluminum thin film) and coating material (including pigment or dye) that exhibits green or a similar color to green is applied on a surface of the metal thin film with coating. The coating material contained in the color exhibit member 330 and exhibiting green or the similar color to green has an absorption rate of magenta light that makes a complementary color pair with green light that is converted through the wavelength conversion sheet 320, that is, an absorption rate of the light rays emitted by the LEDs 317 (the primary light rays) relatively higher than an absorption rate of green light or light of the similar color to green that are converted through the wavelength conversion sheet 320. The color exhibit member 330 absorbs a relatively great amount of magenta light rays and exits a relatively great amount of green light rays or light rays of the similar color to green. Thus, the color exhibit member 30 has a function for selectively absorbing light rays with certain wavelength and tinges the light rays with green.

As illustrated in FIG. 16, the color exhibit member 330 having such a configuration is disposed on the peripheral portion of the wavelength conversion sheet 320. Therefore, the color exhibiting effects are exerted on the light rays tinged with magenta that are in the peripheral portion of the backlight device 321 to be tinged with green or a similar color to green. As a result, the color of the light rays is close to white. Therefore, a color of the exit light rays exiting the peripheral portion of the backlight device 312 is less likely to be tinged with magenta and is closer to a color of the exit light rays exiting the center portion thereof (substantially white light rays). Accordingly, difference in color (tint) between the light exiting from the center portion of the backlight device 312 and the light exiting from the peripheral portion of the backlight device 312 is less likely to occur and the color unevenness in the exit light rays is less likely to be caused.

Fifth Embodiment

A fifth embodiment of the present invention will be described with reference to FIG. 18. In the fifth embodiment, LEDs 417 and a wavelength conversion sheet 420 similar to those of the fourth embodiment are combined with the configuration of the third embodiment. Configurations, operations, and effects similar to those of the third and fourth embodiments will not be described.

Figure 18:
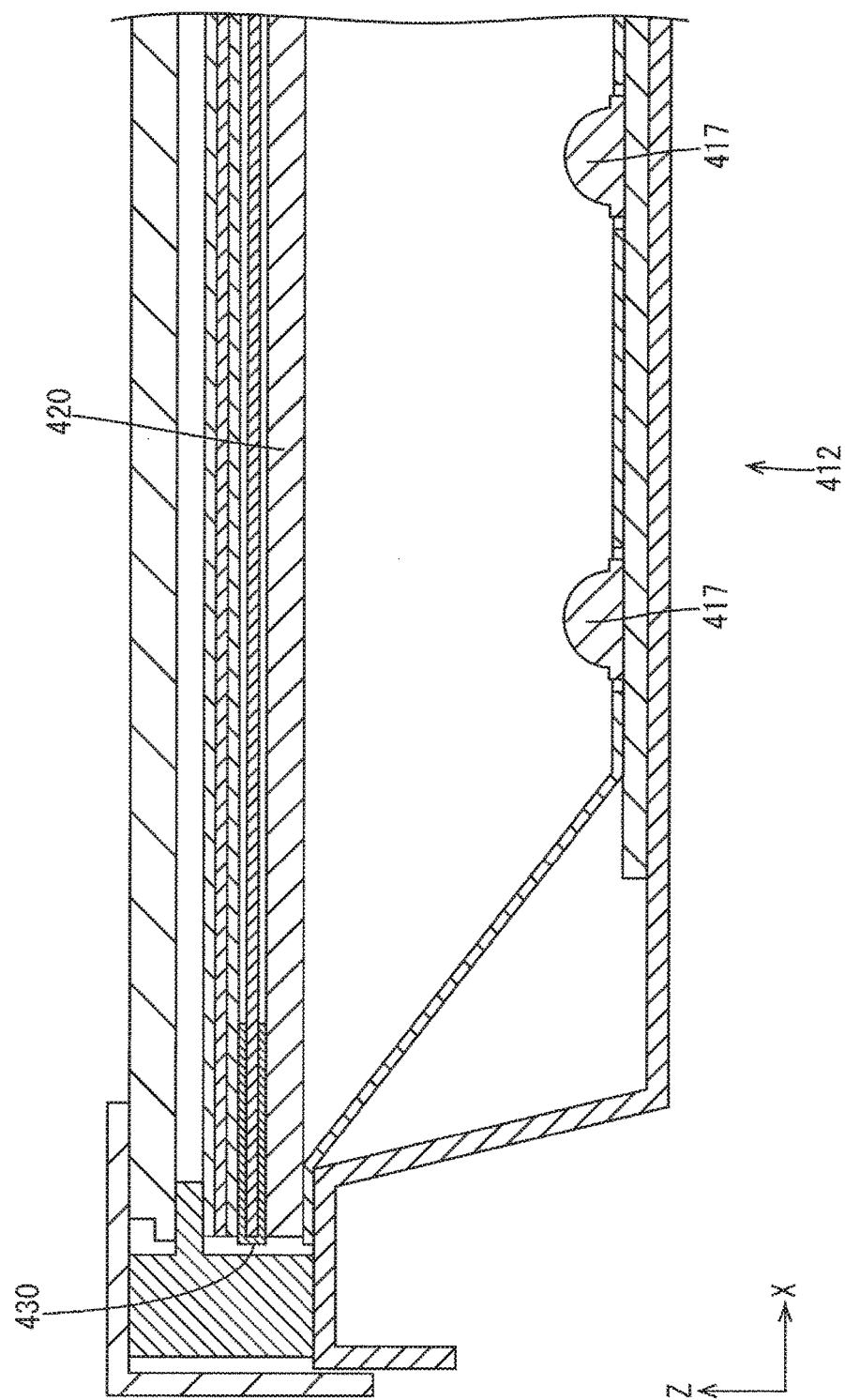
FIG. 18 is a magnified cross-sectional view illustrating an edge portion of a liquid crystal display device according to a fifth embodiment of the present invention.

As illustrated in FIG. 18, the LEDs 417 are configured to emit magenta light and the configuration thereof is similar to that of the fourth embodiment. The wavelength conversion sheet 420 includes a wavelength conversion layer and green phosphors are dispersed in the wavelength conversion layer. The green phosphors emit green light when excited by blue light included in the magenta light from the LEDs 417. The configuration of the wavelength conversion sheet 420 is similar to that of the fourth embodiment. A color exhibit member 430 preferably exhibits magenta that makes a complementary color pair with green light that is converted by the green phosphors contained in the wavelength conversion sheet 420. The color exhibited by the color exhibit member 430 is not necessarily magenta but may be a similar color to magenta, for example, magenta tinged with red or magenta tinged with blue. The "similar color" in this specification is referred to as "a color that is next to or close to a specific color (magenta in this embodiment) on the color wheel". The color exhibit member 430 includes a metal thin film (such as an aluminum thin film) and coating material (including pigment or dye) that exhibits magenta or a similar color to magenta is applied on a surface of the metal thin film with coating. The coating material contained in the color exhibit member 430 and exhibiting magenta or the similar color to magenta has an absorption rate of green light that is a same color of the light rays converted through the wavelength conversion sheet 420, that is, light rays that makes a complementary color pair with the light emitted by the LEDs 417 (the primary light rays), and such an absorption rate of green light is relatively higher than an absorption rate of light rays of magenta or a similar color to magenta that makes a complementary color pair with a color of the light rays converted through the wavelength conversion sheet 420. The color exhibit member 430 absorbs a relatively great amount of green light rays and exits a relatively great amount of light rays of magenta or a similar color to magenta. Thus, the color exhibit member 30 has such a function for selectively absorbing light rays with certain wavelength and tinges the light rays with magenta.

The color exhibit member 430 having such a configuration is disposed on the peripheral portion of the wavelength conversion sheet 420. Therefore, the color exhibiting effects are exerted by the color exhibit member 430 on the greenish light rays in the peripheral portion of the backlight device 421 with magenta or a similar color to green. As a result, the color of the light rays is close to white. Therefore, a color of the exit light rays exiting the peripheral portion of the backlight device 412 is less likely to be greenish and is closer to a color of the exit light rays exiting the center portion thereof (substantially white light rays). Accordingly, difference in color (tint) between the light exiting from the center portion of the backlight device 412 and the light exiting from the peripheral portion of the backlight device 412 is less likely to occur and the color unevenness in the exit light rays is less likely to be caused.

Sixth Embodiment

A sixth embodiment of the present invention will be described with reference to FIG. 19. In the sixth embodiment, a color exhibit member 530 has a configuration different from that of the first embodiment. Configurations, operations, and effects similar to those of the first embodiment will not be described.

Figure 19:
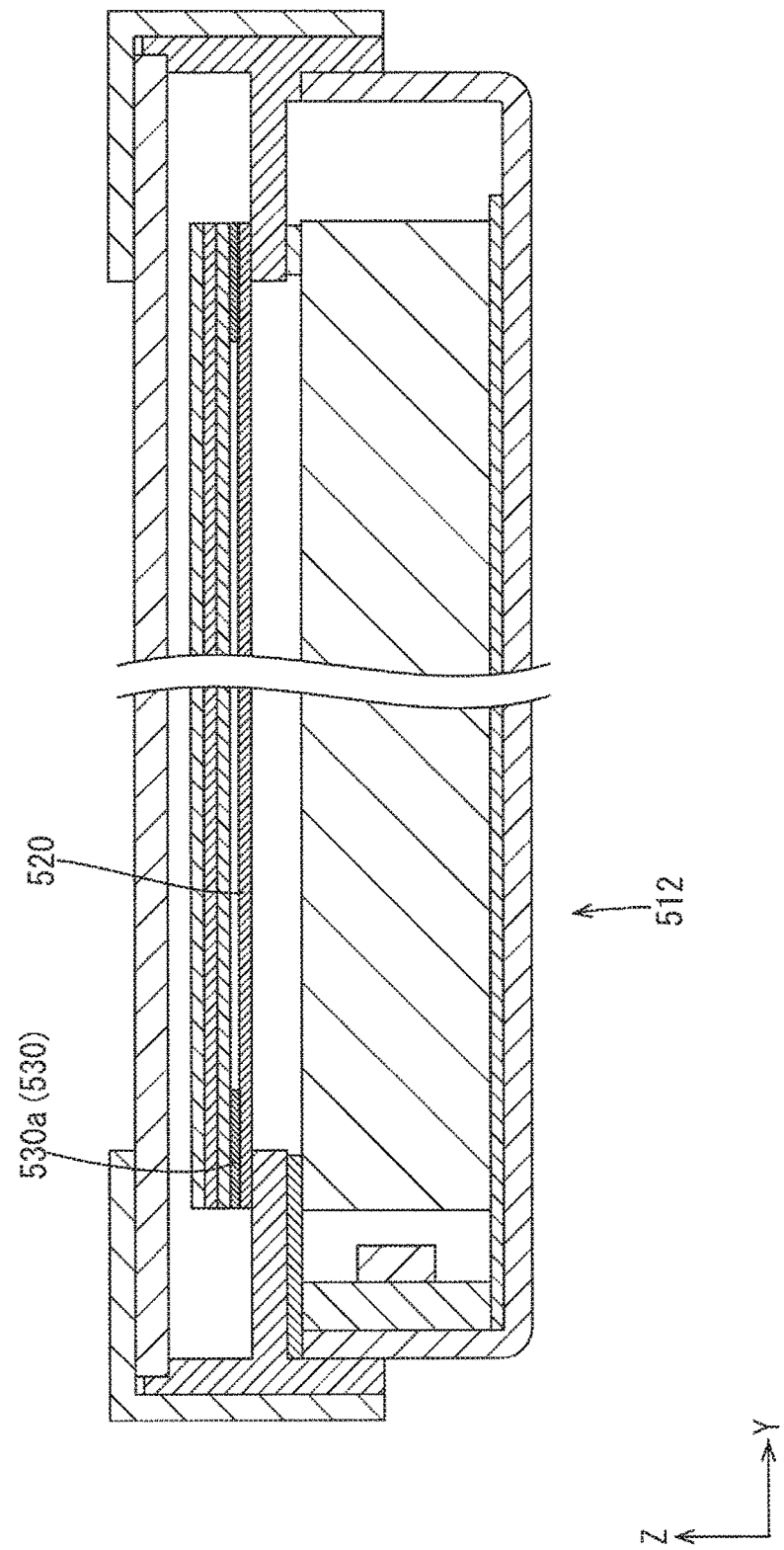
FIG. 19 is a cross-sectional view illustrating a liquid crystal display device according to a sixth embodiment of the present invention and taken in a short-side direction.

As illustrated in FIG. 19, the color exhibit member 530 is disposed on a front surface of a wavelength conversion sheet 520 and overlapped with a peripheral portion of the wavelength conversion sheet 520 on a front side thereof. Namely, the color exhibit member 530 includes only a plate surface overlapping portion 530*a* that is overlapped with a front plate surface of the peripheral portion of the wavelength conversion sheet 520. With such a configuration, the color exhibiting effects are exerted on the bluish light rays in the peripheral portion of a backlight device 512 by the color exhibit member 530 and the bluish light rays may be whitened.

Seventh Embodiment

A seventh embodiment of the present invention will be described with reference to FIG. 20. In the seventh embodiment, a color exhibit member 630 has a configuration different from that of the first embodiment. Configurations, operations, and effects similar to those of the first embodiment will not be described.

Figure 20:
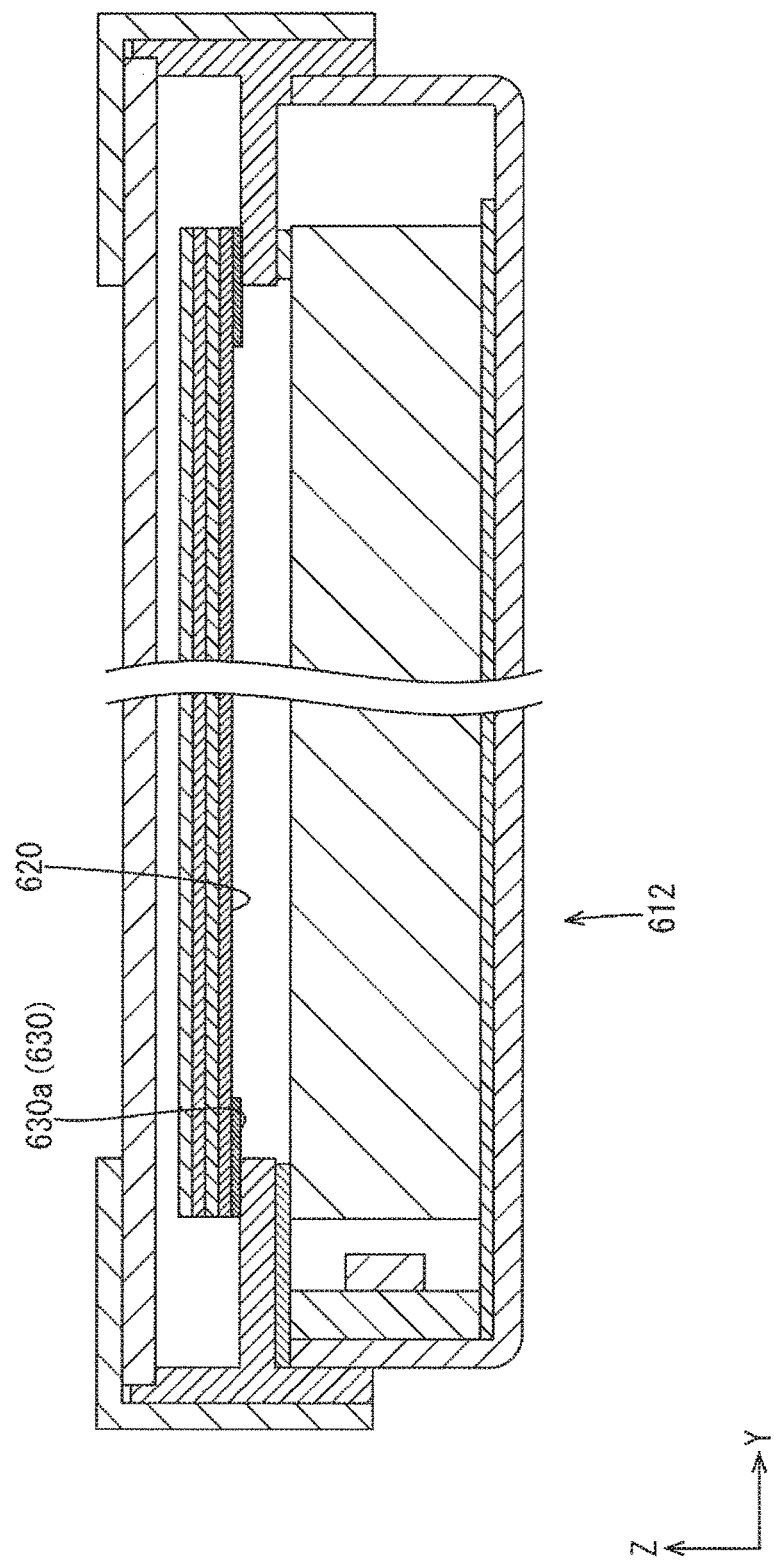
FIG. 20 is a cross-sectional view illustrating a liquid crystal display device according to a seventh embodiment of the present invention and taken in a short-side direction.

As illustrated in FIG. 20, the color exhibit member 630 is disposed on a rear surface of a wavelength conversion sheet 620 and overlapped with a peripheral portion of the wavelength conversion sheet 620 on a rear side thereof. Namely, the color exhibit member 630 includes only a plate surface overlapping portion 630*a* that is overlapped with a rear plate surface of the peripheral portion of the wavelength conversion sheet 620. With such a configuration, the color exhibiting effects are exerted on the bluish light rays in the peripheral portion of a backlight device 612 by the color exhibit member 630 and the bluish light rays may be whitened.

Eighth Embodiment

An eighth embodiment of the present invention will be described with reference to FIG. 21. In the eighth embodiment, a forming area of a color exhibit member 730 differs from that of the sixth embodiment. Configurations, operations, and effects similar to those of the sixth embodiment will not be described.

As illustrated in FIG. 21, a color exhibit member 730 according to this embodiment is disposed on a long-side portion that is on an opposite side (another side) from LED 717 side and a pair of short-side portions among peripheral portions of a wavelength conversion sheet 720. Namely, the color exhibit member 730 is selectively disposed along non-light-entering end surfaces of a light guide plate (not illustrated) among the peripheral portions of a wavelength conversion sheet 720. Therefore, color exhibiting effects are exerted on bluish light rays exiting the light guide plate through the non-light-entering end surfaces of peripheral edge surfaces by the color exhibit member 730 such that the bluish light rays are tinged with yellow or a similar color to yellow. An amount of bluish light rays exiting through the non-light-entering end surfaces of the light guide plate tends to be greater than the amount of bluish light rays exiting through a light entering end surface. With the above arrangement of the color exhibit member 730, color unevenness is less likely to be caused. The LEDs 717 and an LED board 718 are illustrated with two-dot chain lines in FIG. 21.

Ninth Embodiment

A ninth embodiment of the present invention will be described with reference to FIG. 22. In the ninth embodiment, a forming area of a color exhibit member 830 differs from that of the sixth embodiment. Configurations, operations, and effects similar to those of the sixth embodiment will not be described.

As illustrated in FIG. 22, a color exhibit member 830 according to this embodiment is disposed on a pair of short-side portions among peripheral portions of a wavelength conversion sheet 820. Namely, the color exhibit member 830 is selectively disposed along non-light-entering end surfaces of a light guide plate (not illustrated) among the peripheral portions of a wavelength conversion sheet 820. Therefore, color exhibiting effects are exerted on bluish light rays exiting the light guide plate through the non-light-entering end surfaces of peripheral edge surfaces by the color exhibit member 830 such that the bluish light rays are tinged with yellow or a similar color to yellow. An amount of bluish light rays exiting through the non-light-entering end surfaces of the light guide plate tends to be greater than the amount of bluish light rays exiting through a light entering end surface. With the above arrangement of the color exhibit member 830, color unevenness is less likely to be caused. LEDs 817 and an LED board 818 are illustrated with two-dot chain lines in FIG. 22.

Tenth Embodiment

A tenth embodiment of the present invention will be described with reference to FIG. 23. In the tenth embodiment, a forming area of a color exhibit member 930 differs from that of the sixth embodiment. Configurations, operations, and effects similar to those of the sixth embodiment will not be described.

As illustrated in FIG. 23, a color exhibit member 930 according to this embodiment is disposed on a long-side portion that is on an opposite side (another side) from LED 917 side among peripheral portions of a wavelength conversion sheet 920. Namely, the color exhibit member 930 is selectively disposed along a non-light-entering end surface of a light guide plate (not illustrated) among the peripheral portions of a wavelength conversion sheet 920. Therefore, color exhibiting effects are exerted on bluish light rays exiting the light guide plate through the non-light-entering end surface of peripheral edge surfaces by the color exhibit member 930 such that the bluish light rays are tinged with yellow or a similar color to yellow. The LEDs 917 and an LED board 918 are illustrated with two-dot chain lines in FIG. 23.

Other Embodiments

The present invention is not limited to the embodiments, which have been described using the foregoing descriptions and the drawings. For example, embodiments described below are also included in the technical scope of the present invention.

(1) In each of the above embodiments, the LEDs emitting light rays of a single color of blue or magenta light rays are used as the light source. However, LEDs emitting light rays of a color other than blue or magenta may be used as the light source, and a color emitted by the phosphors contained in the wavelength conversion sheet or a color exhibited by the color exhibit member may be altered according to the color of light rays emitted by the LEDs. For example, in a configuration including LEDs emitting purple light, green phosphors and the yellow phosphors may be used for the phosphors contained in the wavelength conversion sheet to exhibit yellowish green light that makes a complementary color pair with purple light such that illumination light (exit light) from the backlight device can be whitened. The LED emitting purple light at least includes a purple LED component emitting light of a single color of purple. The edge-light type backlight device may include a color exhibit member that exhibits yellowish green or a similar color to yellowish green that is a same color as that of light rays converted with wavelength conversion by the phosphors contained in the wavelength conversion sheet. The direct-type backlight device may include a color exhibit member that exhibits purple or a similar color to purple that makes a complementary color pair with a color of light rays converted with wavelength conversion by the phosphors contained in the wavelength conversion sheet.

(2) Other than the above embodiment (1), for example, LEDs emitting cyan light may be used. In such a configuration, the red phosphors that exhibit red light that makes a complementary color pair with cyan light may be used as the phosphor to be contained in the wavelength conversion sheet such that illumination light (exit light) from the backlight device can be whitened. The LED emitting cyan light at least includes a blue LED component, and a sealing member dispersedly contains green phosphors that emit green light when excited by the light of a single color of blue emitted by the blue LED component. The edge-light type backlight device may include a color exhibit member that exhibits red or a similar color to red that is a same color as that of light rays converted with wavelength conversion by the phosphors contained in the wavelength conversion sheet. The direct-type backlight device may include a color exhibit member that exhibits cyan or a similar color to cyan that makes a complementary color pair with a color of light rays converted with wavelength conversion by the phosphors contained in the wavelength conversion sheet.

(3) In each of the above embodiments, the color exhibit members are provided by coating a surface of the metal thin film with the coloring material. The color exhibit member may be configured by a substrate having light transmissivity such as a semitransparent or transparent substrate and coloring agent selectively absorbing light rays in a specific wavelength region contained in the substrate at a certain density. Specifically, the material of the substrate of such a color exhibit member may be cellophane or synthetic resin.

(4) In the first embodiment, the color exhibit member is disposed such that the inner peripheral edge of the color exhibit member is on an inner side than the inner peripheral edge of the frame portion of the frame. However, the inner peripheral edge of the color exhibit member may be on a same plane as the inner peripheral edge of the frame portion of the frame or the inner peripheral edge of the color exhibit member may be on an outer side than the inner peripheral edge of the frame portion of the frame. A specific distance between the inner peripheral edge of the color exhibit member and the inner peripheral edge of the frame portion of the frame (a projecting dimension of the color exhibit member from the frame portion) may be altered as appropriate.

(5) In the second embodiment, five positioning projections and five positioning recess portions are included. However, a specific number, planar arrangement, a planar size of the respective positioning projections and the positioning recess portions may be altered as appropriate. For example, the positioning projections and the positioning recess portions may be included in short-side portions of the wavelength conversion sheet and the frame. The positioning projections and the positioning recess portions may be included symmetrically with each other in the wavelength conversion sheet and the frame.

(6) In the third embodiment and the fifth embodiment, the color exhibit member is disposed to overlap a part of the extended reflection portion of the reflection sheet. However, the color exhibit member may be disposed to overlap an entire area of the extended reflection portion. Further, a specific overlapping area of the color exhibit member with respect to the extended reflection portion may be altered as appropriate.

(7) In the third embodiment and the fifth embodiment, the reflection sheet is configured such that the extended reflection portion extends from the bottom reflection portion with being inclined with respect to the bottom reflection portion. However, a specific configuration of the extended reflection portion (for example, an inclination angle of each extended reflection portion with respect to the bottom reflection portion, a plan view width dimension of each extended reflection portion, and etc.) may be altered as appropriate.

(8) The backlight device in the first embodiment and some embodiments is a one-edge lighting type backlight device that includes another long-side end surface of the light guide plate as the non-light-entering end surface. However, the present invention may be applied to a one-edge lighting type backlight device that includes one long-side end surface of the light guide plate as the non-light-entering end surface. The present invention may be applied to a one-edge lighting type backlight device that includes one or another short-side end surface of the light guide plate as the non-light-entering end surface.

(9) Other than the above embodiment (8), the present invention may be applied to a two-edge lighting type backlight device that includes two long-side end surfaces or two short-side end surfaces of the light guide plate as the light-entering end surfaces. The present invention may be applied to a triple-edge lighting type backlight device that includes any three end surfaces of peripheral end surfaces of the light guide plate as the light-entering end surfaces. The present invention may be applied to a four-edge lighting type backlight device that includes four end surfaces of peripheral end surfaces of the light guide plate as the light-entering end surfaces.

(10) The configuration described in the second embodiment may be combined with the configuration described in each of the third to tenth embodiments. In combination of the second embodiment and the third embodiment, it is preferable that the diffuser plate or the frame includes the positioning member. However, a positioning member may be included separately from the diffuser plate and the frame.

(11) The configuration described in the third embodiment may be combined with the configuration of each of the sixth to tenth embodiments.

(12) The configuration described in the fourth embodiment may be combined with the configuration of each of the sixth to tenth embodiments.

(13) The configuration described in the fifth embodiment may be combined with the configuration of each of the sixth to tenth embodiments.

(14) The configuration described in the sixth embodiment may be combined with the configuration of the seventh embodiment. Namely, the color exhibit member may not include an edge surface overlapping portion but may include a pair of plate surface overlapping portions.

(15) The configuration described in the seventh embodiment may be combined with the configuration of each of the eighth to tenth embodiments.

(16) In the first embodiment and some embodiments, four optical sheets are included in the edge-light type backlight device. However, the number of the optical sheets may be three or less or five or more in the edge-light type backlight device. Similarly, in the third embodiment and some embodiments, five optical sheets are included in the direct-type backlight device. However, the number of the optical sheets may be four or less or six or more in the direct-type backlight device. Kinds of the optical sheets other than the wavelength conversion sheet may be altered in the edge-light type or the direct-type backlight device, and for example, a diffuser sheet may be used. The specific order in which the optical sheets other than the wavelength conversion sheet are layered may be altered.

(17) In the first embodiment and some embodiments, the wavelength conversion sheet and other optical sheets are disposed on a front side with respect to the frame in the edge-light-type backlight device. However, the wavelength conversion sheet may be directly on the front side with respect to the light guide plate in the edge-light-type backlight device. In such a configuration, peripheral edge portions of the wavelength conversion sheet and the light guide plate are supported by the frame portion of the frame from the front side. Other optical sheet or optical sheets (such as a micro lens sheet, a prism sheet, a reflective type polarizing sheet) may be layered between the light guide plate and the wavelength conversion sheet.

(18) In the third embodiment and some embodiments, the wavelength conversion sheet is disposed on a front side with respect to the diffuser plate in the direct-type backlight device. However, a specific order in which the wavelength conversion sheet and the optical sheets other than the diffuser plate may be altered, if necessary.

(19) In each of the above embodiments (except for the fourth and fifth embodiments), the wavelength conversion sheet contains the green phosphors and the red phosphors. However, the wavelength conversion sheet may contain only the yellow phosphors or may contain the red phosphors or the green phosphors in addition to the yellow phosphors.

(20) In each of the above embodiments, the quantum dot phosphors used for the phosphors contained in the wavelength conversion sheet are the core-shell type quantum dot phosphors including CdSe and ZnS. However, core type quantum dot phosphors each having a single internal composition may be used. For example, a material (CdSe, CdS, ZnS) prepared by combining Zn, Cd, Hg, or Pb that could be a divalent cation with O, S, Se, or Te that could be a dianion may be singly used. A material (indium phosphide (InP), gallium arsenide (GaAs)) prepared by combining Ga or In that could be a tervalent cation with P, As, or Sb that could be a tervalent anion or chalcopyrite type compounds ($CuInSe_2$) may be singly used. Other than the core-shell type quantum dot phosphors and the core type quantum dot phosphors, alloy type quantum dot phosphors may be used. Furthermore, quantum dot phosphors that do not contain cadmium may be used.

(21) In each of the above embodiments, the quantum dot phosphors used for the phosphors contained in the wavelength conversion sheet are the core-shell type quantum dot phosphors including CdSe and ZnS. However, core-shell type quantum dot phosphors including a combination of other materials may be used.

(22) In each of the above embodiments, the quantum dot phosphors are contained in the wavelength conversion sheet. Other types of phosphors may be contained in the wavelength conversion sheet. For example, sulfide phosphors may be used for the phosphors contained in the wavelength conversion sheet. Specifically, $SrGa_2S_4:Eu^{2+}$ may be used for the green phosphors and $(Ca, Sr, Ba)S:Eu^{2+}$ may be used for the red phosphors.

(23) Other than the above (22), $(Ca, Sr, Ba)_3SiO_4:Eu^{2+}$, $\beta$-SiAlON:$Eu^{2+}$, or $Ca_3Sc_2Si_3O_{12}:Ce^{3+}$ may be used for the green phosphors contained in the wavelength conversion sheet. $(Ca, Sr, Ba)_2SiO_5N_8:Eu^{2+}$, or $CaAlSiN_3:Eu^{2+}$ may be used for the red phosphors contained in the wavelength converting sheet. $(Y, Gd)_3(Al, Ga)_5O_{12}:Ce^{3+}$ (so-called YAG:$Ce^{3+}$), $\alpha$-SiAlON:$Eu^{2+}$, or $(Ca, Sr, Br)_3SiO_4:Eu^{2+}$ may be used for the yellow phosphors contained in the wavelength conversion sheet. Further, a complex fluoride fluorescent material (e.g., manganese-activated potassium fluorosilicate ($K_2TiF_6$)) may be used for the phosphors contained in the wavelength conversion sheet.

(24) Other than the above (22) and (23), organic phosphors may be used for the phosphors contained in the wavelength conversion sheet. The organic phosphors may be low molecular organic phosphors including triazole or oxadiazole as a basic skeleton.

(25) Other than the above (22), (23), and (24), phosphors configured to perform wavelength conversion through energy transfer via dressed photons (near-field light) may be used for the phosphors contained in the wavelength conversion sheet. Preferable phosphors of this kind may be phosphors including zinc oxide quantum dots (ZnO-QD) with diameters from 3 nm to 5 nm (preferably about 4 nm) and DCM pigments dispersed in the zinc oxide quantum dots.

(26) Other than the fourth and fifth embodiments, specific kinds of the green phosphors contained in the sealing member of the LED may be altered as appropriate similarly to the green phosphors contained in the wavelength conversion sheet.

(27) Other than each of the above embodiments, the emission spectrum of the LEDs (peak wavelengths, half width of each peak) and the emission spectrum of the phosphors contained in the phosphor layer (peak wavelengths, half width of each peak) may be altered as appropriate.

(28) In each of the above embodiments, InGaN is used for the material of the LED components in the LEDs. However, GaN, AlGaN, GaP, ZnSe, ZnO, or AlGaInP may be used for the material of the LED components.

(29) In each of the above embodiments, the chassis is made of metal. However, the chassis may be made of synthetic resin.

(30) In each of the above embodiments (except for the third and fifth embodiments), the optical member is disposed on the front side with respect to the frame portion of the frame and spaced from the light guide plate. However, the optical member may be directly disposed on a front side with respect to the light guide plate. In such a configuration, it is preferable that the optical member that is closest to the front side is pressed by the frame portion of the frame from the front side. However, the configuration is not necessarily limited thereto.

(31) In each of the above embodiments, the LEDs are used as the light source. However, other light sources such as an organic EL may be used.

(32) In each of the above embodiments, the liquid crystal panel and the chassis are arranged in a vertical position such that the short-side direction thereof matches the vertical direction. However, the liquid crystal panel and the chassis may be arranged in a vertical position such that the long-side direction thereof matches the vertical direction.

(33) In each of the above embodiments, the TFTs are used as switching components of the liquid crystal display device. However, switching components other than the TFTs (such as thin film diodes (TFDs)) may be included in the scope of the present invention. Furthermore, a liquid crystal display device configured to display black and white images other than the liquid crystal display device configured to display color images.

(34) In each of the above embodiments, the transmissive-type liquid crystal display device is described. However, a reflection-type liquid crystal display device and a semi-transmissive type liquid crystal display device may be included in the scope of the present invention.

(35) In each of the above embodiments, the liquid crystal display device including the liquid crystal panel as the display panel is used. The present invention may be applied to display devices including other type of display panel.

(36) In each of the above embodiments, the television device including the tuner is included. However, a display device without including a tuner may be included in the scope of the present invention. Specifically, the present invention may be applied to liquid crystal display devices used as digital signage or an electronic blackboard.

EXPLANATION OF SYMBOLS 10, 210: liquid crystal display device (display device), 10TV: television device, 11, 211: liquid crystal panel (display panel), 12, 212, 312, 412, 512, 612: backlight device (lighting device), 14, 214: chassis, 14a, 214a: bottom portion, 16, 116, 216: frame (support member), 16a, 116a: frame portion, 17, 217, 317, 417, 717, 817, 917: LED (light source), 17a, 217a: light emission surface, 19: light guide plate, 19a: light exiting plate surface, 19b: light entering end surface, 20, 120, 220, 320, 420, 520, 620, 720, 820, 920: wavelength conversion sheet (wavelength conversion member), 20a: wavelength conversion layer, 20b: protection layer, 30, 130, 230, 330, 430, 530, 630, 730, 830, 930: color exhibit member, 31: positioning projection, 32: positioning member, 33: reflection sheet (reflecting member), 33a: bottom reflection portion, 33b: extended reflection portion

The invention claimed is:

1. A lighting device comprising:
   a light source emitting a first light;
   a light guide plate having a light entering end surface that is a part of peripheral edge surfaces and through which the first light from the light source enters and a light exiting plate surface that is one of a pair of plate surfaces and through which the first light exits;
   a wavelength conversion member overlapping the light exiting plate surface of the light guide plate and containing phosphors that convert the first light from the light source to a second light with other wavelengths; and
   a color exhibit member disposed on at least a part of a peripheral portion of the wavelength conversion member and exhibiting a color same as or similar to a color of the second light converted by the phosphors contained in the wavelength conversion member.

2. The lighting device according to claim 1, wherein the color exhibit member has a higher absorption rate of light having a color same as or similar to a color that makes a complementary color pair with the color of the second light that is converted by the phosphors through the wavelength conversion member than an absorption rate of the light having a color same as or similar to the color of the second light that is converted by the phosphors through the wavelength conversion member.

3. The lighting device according to claim 1, wherein
   the light source is configured to emit blue light,
   the wavelength conversion member includes at least green phosphors and red phosphors, or yellow phosphors as the phosphors,
   the green phosphors convert the blue light into green light with wavelength conversion and the red phosphors convert the blue light into red light with wavelength conversion, and the yellow phosphors convert the blue light into yellow light with wavelength conversion, and
   the color exhibit member is configured to exhibit yellow or a similar color to yellow.

4. The lighting device according to claim 1, further comprising a frame including a frame portion that is between and supports peripheral portions of the light guide plate and the wavelength conversion member, wherein
   the color exhibit member extends inward farther than the frame portion extends.

5. The lighting device according to claim 1, wherein the color exhibit member extends along an entire periphery of the peripheral portion of the wavelength conversion member.

6. The lighting device according to claim 5, wherein
the wavelength conversion member includes a wavelength conversion layer containing the phosphors, and a pair of protection layers having the wavelength conversion layer therebetween and protecting the wavelength conversion layer, and
the color exhibit member is configured to collectively hold peripheral portions of the wavelength conversion layer and the protection layers.

7. The lighting device according to claim 1, further comprising a support member supporting the wavelength conversion member and having a positioning member positioning the wavelength conversion member, wherein
the color exhibit member includes a positioning projection that partially projects from the peripheral portion of the wavelength conversion member and is in contact with the positioning member.

8. The lighting device according to claim 1, wherein the wavelength conversion member contains quantum dot phosphors as the phosphors.

9. A display device comprising:
the lighting device according to claim 1; and
a display panel displaying images using light from the lighting device.

10. A television device comprising the display device according to claim 9.

11. The lighting device according to claim 1, wherein the wavelength conversion member is a wavelength conversion sheet having a sheet surface that overlaps and is opposite the light exiting plate surface.

12. The lighting device according to claim 1, wherein the color exhibit member is configured to hold the peripheral portion of the wavelength conversion member.

13. The lighting device according to claim 12, wherein:
the wavelength conversion member includes:
    a wavelength conversion layer containing the phosphors, and
    a pair of protection layers having the wavelength conversion layer therebetween and protecting the wavelength conversion layer, and
the color exhibit member is configured to collectively hold peripheral portions of the wavelength conversion layer and the protection layers.

14. A lighting device comprising:
a light source emitting a first light;
a chassis in which the light source is arranged and that includes a bottom portion on an opposite side from a light emission surface side of the light source;
a wavelength conversion member disposed opposite the light emission surface and away from the light emission surface on a light exit side and containing phosphors that convert the first light from the light source to a second light with other wavelengths;
a reflecting member configured to reflect the first light from the light source toward the wavelength conversion member and at least including a bottom reflection portion disposed along the bottom portion and an extended reflection portion extending from the bottom reflection portion toward the wavelength conversion member; and
a color exhibit member disposed on at least a part of a peripheral portion of the wavelength conversion member and exhibiting a color same as or similar to a color that makes a complementary color pair with a color of the second light that is converted by the phosphors through the wavelength conversion member.

15. The lighting device according to claim 14, wherein the color exhibit member has a higher absorption rate of light having a color same as or similar to the color of the second light converted by the phosphors through the wavelength conversion member than an absorption rate of light having a color same as or similar to a color that makes a complementary color pair with the color of the second light converted by the phosphors through the wavelength conversion member.

16. The lighting device according to claim 14, wherein
the light source is configured to emit blue light,
the wavelength conversion member includes at least green phosphors and red phosphors, or yellow phosphors as the phosphors,
the green phosphors convert the blue light into green light with wavelength conversion and the red phosphors convert the blue light into red light with wavelength conversion, and the yellow phosphors convert the blue light into yellow light with wavelength conversion, and
the color exhibit member is configured to exhibit blue or a similar color to blue.

17. The lighting device according to claim 14, wherein the color exhibit member is disposed to overlap the extended reflection portion.

18. The lighting device according to claim 14, wherein the color exhibit member extends along an entire periphery of the peripheral portion of the wavelength conversion member.

19. The lighting device according to claim 14, wherein the wavelength conversion member is a wavelength conversion sheet.

20. The lighting device according to claim 14, further comprising a support member supporting the wavelength conversion member and having a positioning member positioning the wavelength conversion member, wherein
the color exhibit member includes a positioning projection that partially projects from the peripheral portion of the wavelength conversion member and is in contact with the positioning member.

21. The lighting device according to claim 14, wherein:
the light source includes a plurality of light sources; and
no light source is disposed on a section of the bottom portion overlapping the extended reflection portion.

22. The lighting device according to claim 21, wherein the extended reflection portion extends from an entire periphery of an outer edge of the bottom reflection portion.

23. The lighting device according to claim 14, wherein the extended reflection portion extends while being inclined with respect to the bottom reflection portion and the wavelength conversion member, and a distance between the wavelength conversion member and the extended reflection portion is greatest at an extended basal end of the extended reflection portion and is smallest at an extended distal end.

* * * * *